(12) United States Patent
Yamamoto et al.

(10) Patent No.: US 7,909,060 B2
(45) Date of Patent: Mar. 22, 2011

(54) PRESSURE CONTROL VALVE

(75) Inventors: Haruki Yamamoto, Aichi-ken (JP);
Kazunori Ishikawa, Aichi-ken (JP);
Takahiro Kokubu, Aichi-ken (JP)

(73) Assignee: Aisin Aw Co., Ltd., Tokyo (JP)

( * ) Notice: Subject to any disclaimer, the term of this patent is extended or adjusted under 35 U.S.C. 154(b) by 241 days.

(21) Appl. No.: 12/365,595

(22) Filed: Feb. 4, 2009

(65) Prior Publication Data
US 2009/0140192 A1   Jun. 4, 2009

Related U.S. Application Data

(62) Division of application No. 11/709,827, filed on Feb. 23, 2007, now abandoned, which is a division of application No. 10/952,415, filed on Sep. 29, 2004, now abandoned.

(30) Foreign Application Priority Data

Sep. 29, 2003  (JP) .................................. 2003-338291
Nov. 5, 2003   (JP) .................................. 2003-376246
Apr. 12, 2004  (JP) .................................. 2004-116955

(51) Int. Cl.
*G05D 16/20* (2006.01)
(52) U.S. Cl. ............ 137/625.6; 137/625.68; 137/625.69
(58) Field of Classification Search ............. 251/129.15, 251/337; 137/625.64, 625.65, 625.66, 625.68, 137/625.69, 625.6, 625.25
See application file for complete search history.

(56) References Cited

U.S. PATENT DOCUMENTS

| 4,201,116 | A |   | 5/1980  | Martin |
| 4,238,112 | A | * | 12/1980 | Derozier .................. 137/625.65 |
| 4,605,197 | A |   | 8/1986  | Caseu et al. |
| 4,655,254 | A |   | 4/1987  | Hafner et al. |
| 4,683,915 | A | * | 8/1987  | Sloate ........................ 137/625.6 |
| 4,779,648 | A |   | 10/1988 | Sloate |
| 4,791,956 | A |   | 12/1988 | Kominami et al. |
| 4,821,774 | A |   | 4/1989  | Chorkey |
| 4,873,948 | A |   | 10/1989 | Richeson et al. |
| 4,966,195 | A |   | 10/1990 | McCabe |
| 5,174,338 | A |   | 12/1992 | Yokota et al. |
| 5,197,507 | A |   | 3/1993  | Miki et al. |
| 5,259,414 | A |   | 11/1993 | Suzuki |
| 5,404,791 | A |   | 4/1995  | Kervagoret |

(Continued)

FOREIGN PATENT DOCUMENTS

JP   2002-130514   5/2002

(Continued)

*Primary Examiner* — John Bastianelli
(74) *Attorney, Agent, or Firm* — Sughrue Mion, PLLC

(57) ABSTRACT

A pressure control valve includes a sleeve on which an input port, an output port, and drain ports are formed; and a linear solenoid portion for generating thrust. The pressure control valve further includes a first spool, which advances and retreats within the sleeve, for receiving the thrust, regulating input pressure input to the input port, and outputting the regulated output pressure from the output port; and a second spool, which advances and retreats within the sleeve, for receiving the thrust, and selectively applying output pressure to the first spool. The output pressure is selectively applied to the first spool, thereby doing away with the need for a control valve or the like. This simplifies the oil pressure circuit for generating control pressure, and allows control pressure to be generated in a stable manner, and the size of the pressure control valve to be reduced.

20 Claims, 36 Drawing Sheets

U.S. PATENT DOCUMENTS

| | | |
|---|---|---|
| 5,497,804 A | 3/1996 | Codina et al. |
| 5,868,167 A | 2/1999 | Miki et al. |
| 5,947,155 A | 9/1999 | Miki et al. |
| 6,179,107 B1 | 1/2001 | Hall, III |
| 6,273,396 B1 | 8/2001 | Kato |
| 6,371,441 B1 | 4/2002 | Mattes |
| 6,378,557 B2 | 4/2002 | Kawamura et al. |
| 6,453,947 B1 | 9/2002 | Inoue et al. |
| 6,607,176 B1 | 8/2003 | Mayr et al. |
| 6,634,381 B2 | 10/2003 | Matsusake et al. |
| 6,776,391 B1 | 8/2004 | Goossens et al. |
| 7,059,581 B2 | 6/2006 | Invernizzi |
| 2003/0131896 A1 | 7/2003 | Yajima et al. |

FOREIGN PATENT DOCUMENTS

| | | |
|---|---|---|
| JP | 2003-074733 | 3/2003 |
| JP | 2003-134781 | 5/2003 |

* cited by examiner

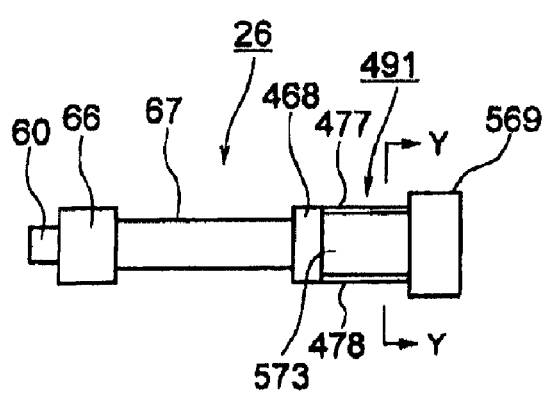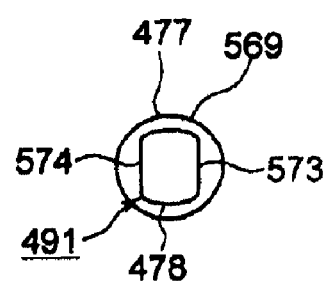
FIG. 17(a)
FIG. 17(b)

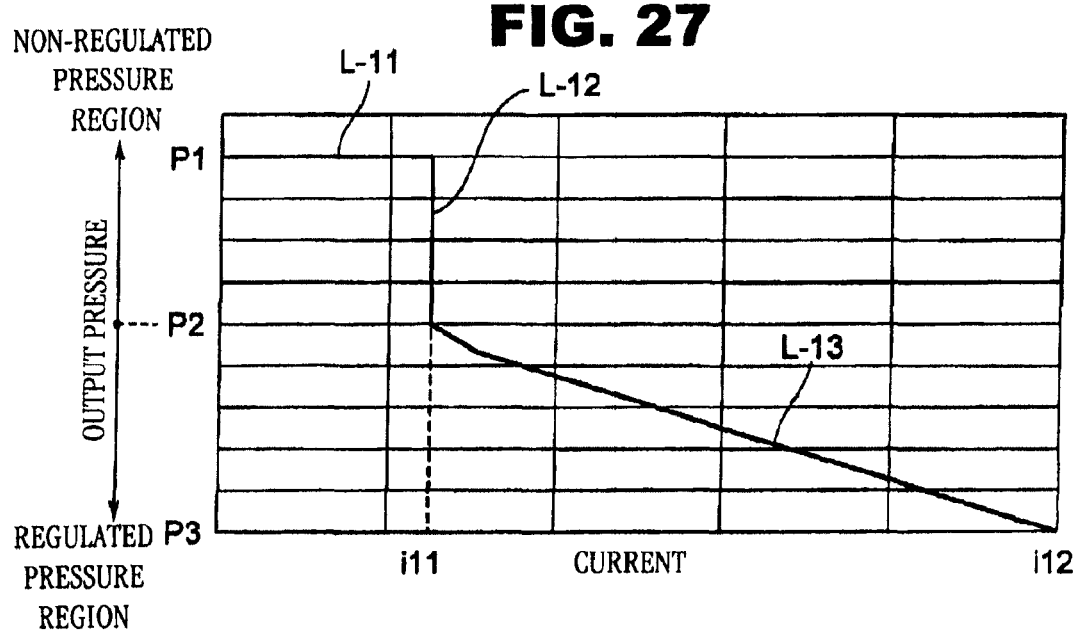
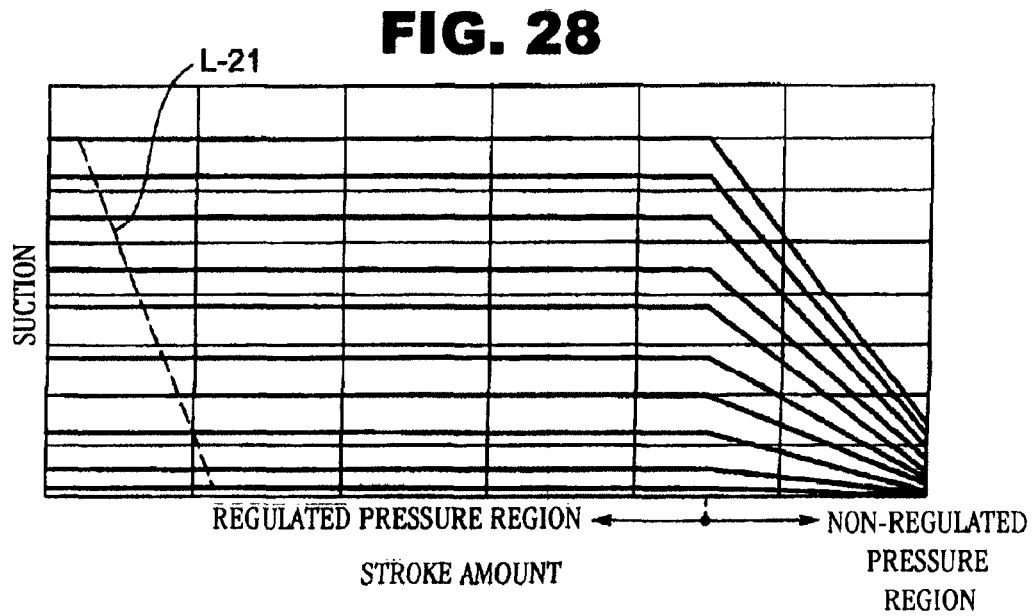

NON-REGULATED PRESSURE REGION

P1
OUTPUT PRESSURE
P2

REGULATED P3
PRESSURE REGION

CURRENT

L-22

SUCTION

STROKE AMOUNT

PRESSURE CONTROL VALVE

CROSS REFERENCE TO RELATED APPLICATIONS

This is a divisional application of U.S. application Ser. No. 11/709,827 filed Feb. 23, 2007, which is a divisional application of U.S. application Ser. No. 10/952,415, filed Sep. 29, 2004, which claims priority from Japanese Patent Application Nos. 2004-116955, 2003-376246 and 2003-338291 filed respectively on Apr. 12, 2004, Nov. 5, 2003 and Sep. 29, 2003, the disclosures of which are incorporated herein by reference in their entirety.

BACKGROUND OF THE INVENTION

1. Field of the Invention

Apparatuses consistent with the present invention relate to a pressure control valve.

2. Description of the Related Art

Conventionally, in an oil pressure circuit of an automatic transmission for example, the oil pressure generated by an oil pump has been regulated by a regulator valve so as to be regulator pressure, and the regulator pressure has been supplied to each portion of the oil pressure circuit. Moreover, various types of pressure control valves are disposed in the oil pressure circuit, such as a linear solenoid valve that includes a linear solenoid portion and a regulating pressure valve unit that receives modulator pressure which is obtained by a modulator valve depressurizing the regulator pressure, as input pressure, and actuates the regulating pressure control valve by supplying a current to a coil of the linear solenoid portion so as to regulate the oil pressure, and generates the regulated oil pressure as output pressure.

FIG. 2 is a diagram illustrating principal components of a conventional oil pressure circuit. In the drawing, reference symbol C denotes a clutch as a friction engagement element, and reference numeral 91 denotes a linear solenoid valve including a linear solenoid portion 92 and a regulating pressure valve unit 93. The linear solenoid valve 91 receives the modulator pressure which is obtained by a modulator valve 94 depressurizing the regulator pressure which is regulated by an unshown regulator valve, as input pressure, actuates the regulating pressure valve unit 93 by supplying a current from a control device 95 to an unshown coil of the linear solenoid portion 92, so as to regulate oil pressure, and generates the regulated oil pressure as output pressure.

A control valve 96 receives the oil pressure which is generated by a oil pump 97 as input pressure (original pressure), and also receives the output pressure which is transmitted from the linear solenoid valve 91, as signal oil pressure, generates control pressure, and supplies the control pressure to an unshown oil servo of the clutch C. In this case, the control pressure is supplied to the oil servo in a predetermined oil pressure pattern, and the clutch C is engaged or disengaged based on the oil pressure pattern (for example, see Japanese Examined Patent Application Publication No. 2003-74733). Note that an arrangement may be made wherein a brake is employed as the friction engagement element instead of the clutch C, and the brake is engaged or disengaged based on the oil pressure pattern of the control pressure.

However, in the conventional oil pressure circuit, the linear solenoid valve 91 and the control valve 96 are required for generating control pressure, resulting in not only increasing the number of parts but also complicating the oil pressure circuit.

Consequently, while there is the possibility that control pressure is generated by the linear solenoid valve 91 alone, in this case, when obtaining the control pressure with the maximal oil pressure which is required for engaging with the clutch C, the value of a current supplied to the coil sometimes varies, and consequently, the control pressure cannot be generated in a stable manner.

Great thrust is required in the linear solenoid portion in order to increase the control pressure, and accordingly, the linear solenoid portion 92 is increased in size so as to obtain the great thrust, and consequently, the linear solenoid valve 91 is also increased in size.

SUMMARY OF THE INVENTION

Accordingly, an exemplary feature of the present invention is to provide a pressure control valve wherein the problems of the conventional oil pressure circuit are solved, the oil pressure circuit for generating control pressure can be simplified, the control pressure can be generated in a stable manner, and the pressure control valve can be reduced in size.

According to an exemplary aspect of the present invention, a pressure control valve comprises: a sleeve in which an input port, an output port, and a drain port are formed; and a linear solenoid portion for generating thrust; wherein the sleeve includes a first spool, which is disposed within the sleeve so as to advance and retreat, for receiving transmission of the thrust thereto and regulating input pressure input to the input port and outputting output pressure from the output port, and a second spool, which is disposed within the sleeve so as to advance and retreat, for receiving transmission of the thrust thereto and selectively applying the output pressure as feedback pressure on the first spool.

According to a further exemplary aspect of the present invention, a pressure control valve comprises: a sleeve on which an input port, an output port, and a drain port are formed; and a linear solenoid portion for generating thrust; wherein the sleeve includes a first spool, which is disposed within the sleeve so as to advance and retreat, for receiving transmission of the thrust thereto and regulating input pressure input to the input port and outputting output pressure from the output port, and a second spool, which is disposed within the sleeve so as to advance and retreat, with the position relative to the first spool being changed, and selectively applying the output pressure as feedback pressure on the first spool.

The linear solenoid portion may further comprise a current-supplied portion for receiving supply of a current and generating thrust, and a moving portion which is moved by the thrust. The thrust may be directly transmitted from the moving portion to the second spool, and transmitted to the first spool by way of the second spool and a pressing member for pressing the second spool toward the opposite side of the linear solenoid portion. Also, the thrust may be directly transmitted from the moving portion to the first spool.

The second spool may have a symmetrical shape in the axial direction.

The pressure control valve may further comprise a pressing member for pressing the first spool toward the linear solenoid portion side, wherein pressing force owing to the pressing member, and feedback force owing to the thrust and the feedback pressure, oppose one another. Or, the pressure control valve may further comprise a pressing member for pressing the first spool toward the linear solenoid portion side, wherein feedback force owing to pressing force by the pressing member and the feedback pressure, and the thrust, oppose one another.

The second spool may be disposed on the inside of the first spool in the radial direction, with the first and second spools disposed so as to move relatively to each other.

A feedback pressure acting portion for applying feedback pressure on the first spool may be formed on the sleeve, with a feedback oil channel formed between the first and second spools communicating with the feedback pressure acting portion.

The relative position of the first and second spools may be changed by the linear solenoid portion changing the thrust, and a communicating state of the feedback oil channel is switched. Also, a pressing force adjustment member for adjusting pressing force owing to a pressing member for pressing the first spool toward the linear solenoid portion side may be disposed in the opposite side of the linear solenoid portion as to the sleeve. Further, another pressing member may be disposed between the first and second spools, and another pressing force adjustment member for adjusting pressing force owing to the other pressing member disposed on the opposite side of the linear solenoid portion in the sleeve, and on the inside of the pressing force adjustment member in the radial direction.

According to an additional exemplary aspect of the present invention, a pressure control valve comprises: a sleeve in which an input port, an output port, and a drain port are formed; a linear solenoid portion for generating thrust; a spool, which is disposed within the sleeve so as to advance and retreat, for receiving transmission of the thrust thereto, regulating input pressure input to the input port, and outputting output pressure from the output port; and a pressing member for pressing the spool toward the linear solenoid portion side; wherein, feedback pressure switching means which, in the event that the output pressure is applied to the spool as feedback pressure, switch between whether or not the feedback pressure is applied to the spool within the sleeve, are disposed in the pressure control valve, in which pressing force owing to the pressing member, and feedback force owing to the thrust and the feedback pressure, oppose one another.

The feedback pressure switching means may be made up of two pressing members, and the pressing members may be disposed on the edge portion opposite to the linear solenoid portion in the sleeve, and may have a different spring constant from each other. Also, the pressing members may be disposed serially in the axial direction, or may be disposed in parallel in the axial direction, and have a different length from each other.

According to an exemplary embodiment of the present invention configured as described above, a pressure control valve includes a sleeve in which an input port, an output port, and a drain port are formed, as well as a linear solenoid portion for generating thrust. Moreover, the sleeve includes a first spool, which is disposed within the sleeve so as to advance and retreat, for receiving transmission of the thrust thereto and regulating input pressure input to the input port and outputting output pressure from the output port, and a second spool, which is disposed within the sleeve so as to advance and retreat, for receiving transmission of the thrust thereto and selectively applying the output pressure as feedback pressure on the first spool.

In this case, a control valve and the like are not required because the output pressure is selectively applied on the first spool as feedback pressure. Accordingly, the number of parts in the oil pressure circuit can be reduced, thereby simplifying the oil pressure circuit.

Moreover, excessive thrust is not required because the output pressure can be generated in a state that feedback pressure is not applied to the first spool, thereby reducing the linear solenoid portion in size, resulting in reducing the pressure control valve.

Also, the linear solenoid portion being made up of a current-supplied portion for being supplied with a current and generating thrust, and a moving portion which is moved by the thrust, means that the output pressure can be generated in a state that feedback pressure is not applied to the first spool, and accordingly, when obtaining the control pressure with the maximal oil pressure, even if the value of a current supplied to the current-supplied portion sometimes varies, the control pressure can be generated in a stable manner.

Moreover, the second spool having a symmetrical shape in the axial direction not only protects the second spool from erroneous assembly, but also reduces assembly steps.

BRIEF DESCRIPTION OF THE DRAWINGS

FIGS. 17A and 17B are diagrams illustrating an inner spool according to the seventh embodiment of the present invention;

FIG. 27 is a diagram illustrating the output pressure properties of a linear solenoid valve according to the eleventh embodiment of the present invention;

FIG. 28 is a diagram illustrating the suction properties of a linear solenoid valve according to the eleventh embodiment of the present invention;

DESCRIPTION OF EXEMPLARY, NON-LIMITING EMBODIMENTS

Now, description will be made in detail regarding embodiments according to the present invention with reference to the drawings. In this case, with regard to pressure control valves, description will be made regarding a linear solenoid valve, for example.

First Embodiment

Figure 1:
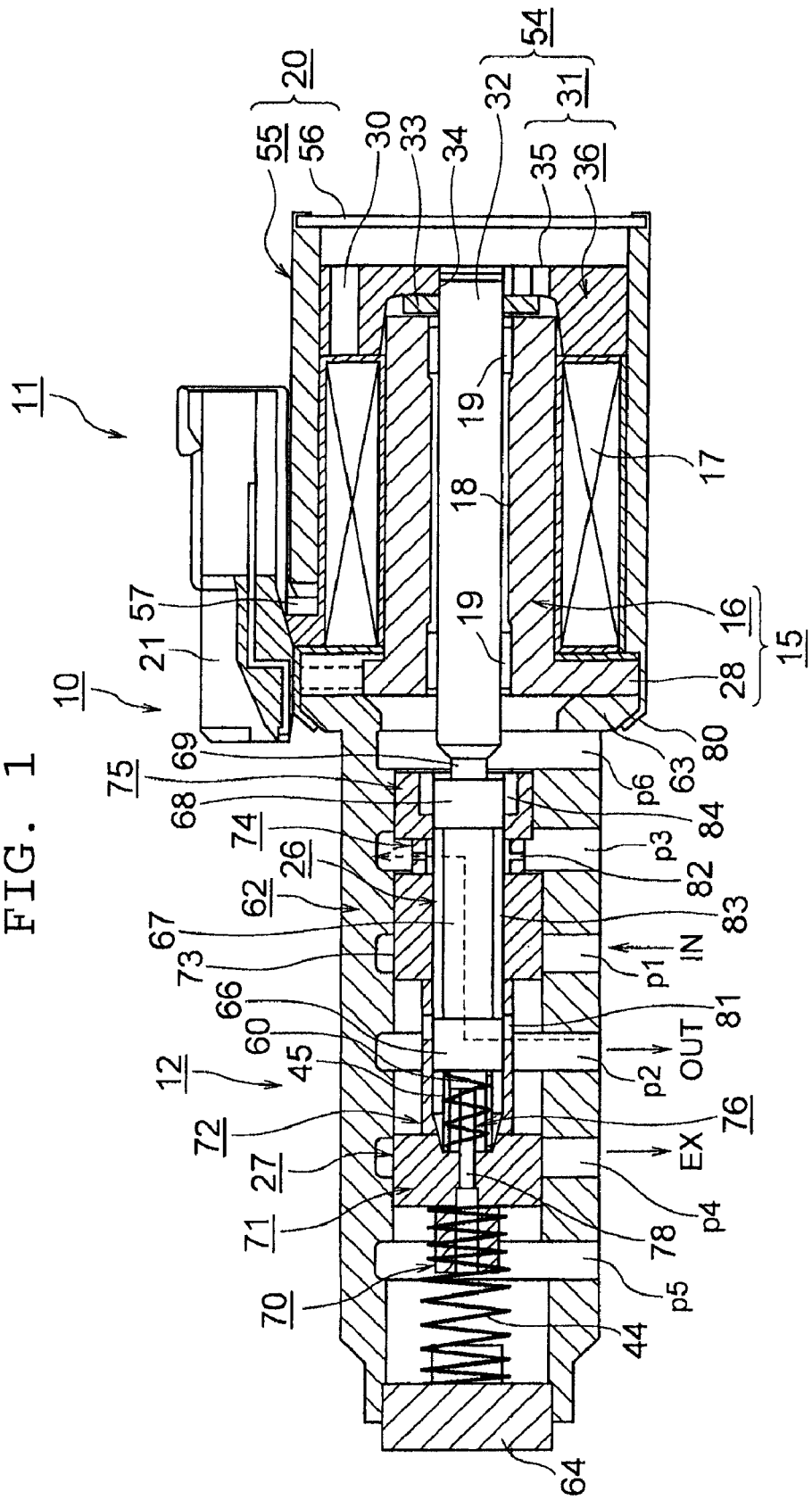
FIG. 1 is a diagram illustrating the working state of a linear solenoid valve according to a first exemplary embodiment of the present invention.
Figure 3:
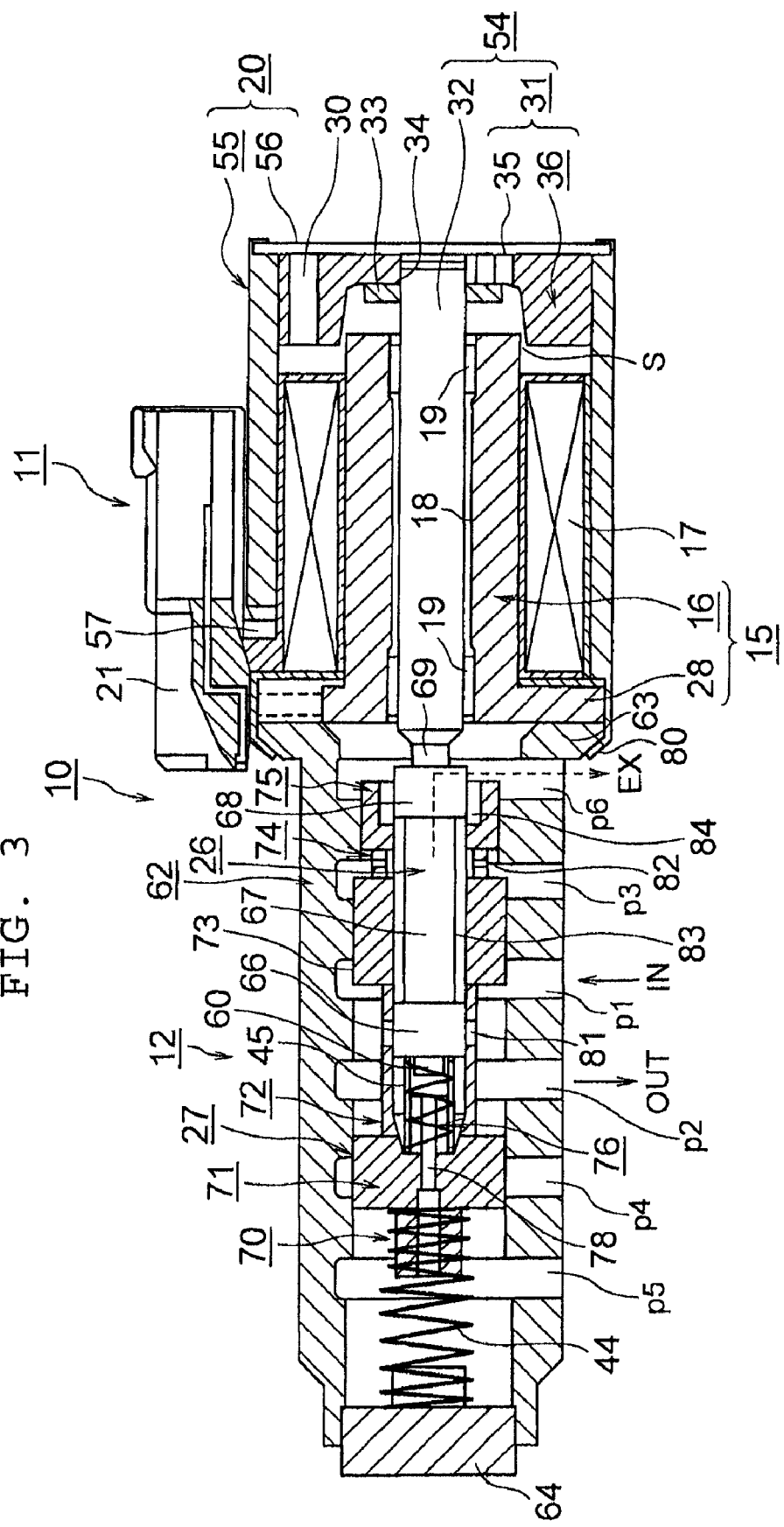
FIG. 3 is a diagram illustrating the initial state of a linear solenoid valve according to the first embodiment of the present invention.
Figure 4:
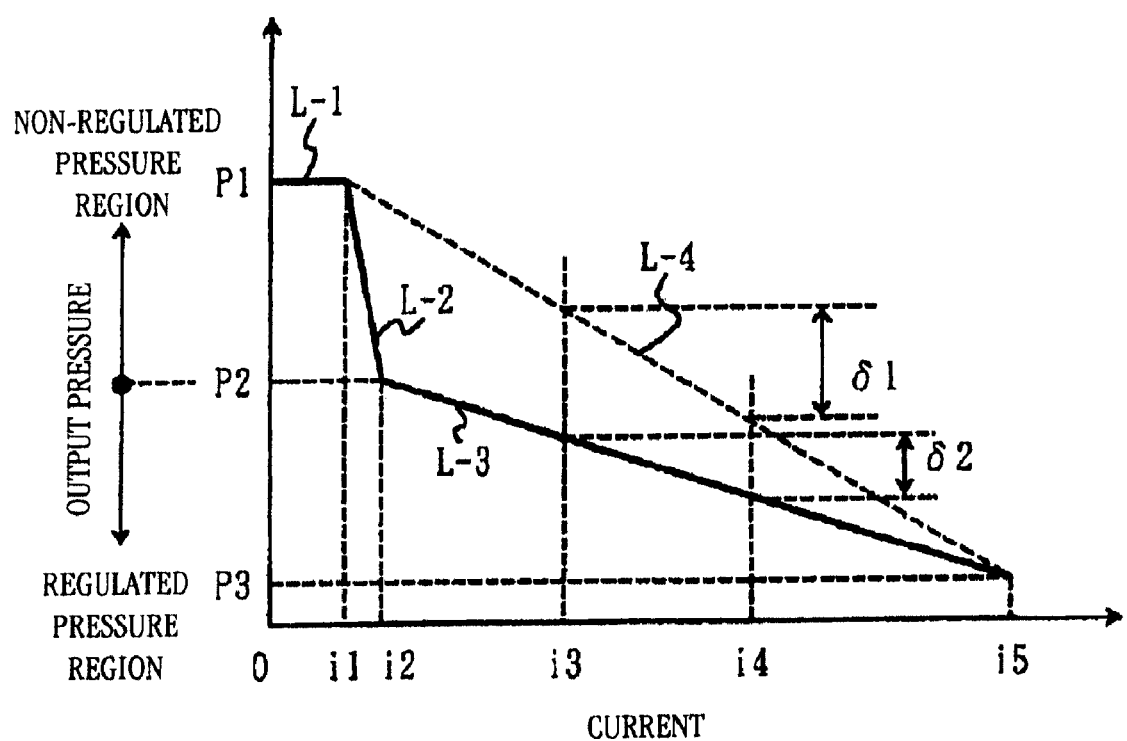
FIG. 4 is a property diagram of a linear solenoid valve according to the first embodiment of the present invention.

FIG. 1 is a diagram illustrating a working state of a linear solenoid valve according to a first exemplary embodiment of the present invention, FIG. 3 is a diagram illustrating a initial state of the linear solenoid valve according to the first embodiment of the present invention, and FIG. 4 is a diagram illustrating properties of the linear solenoid valve according to the first embodiment of the present invention. Note that, in FIG. 4, current values are assigned to the horizontal axis, and output pressure is assigned to the vertical axis.

Figure 2:
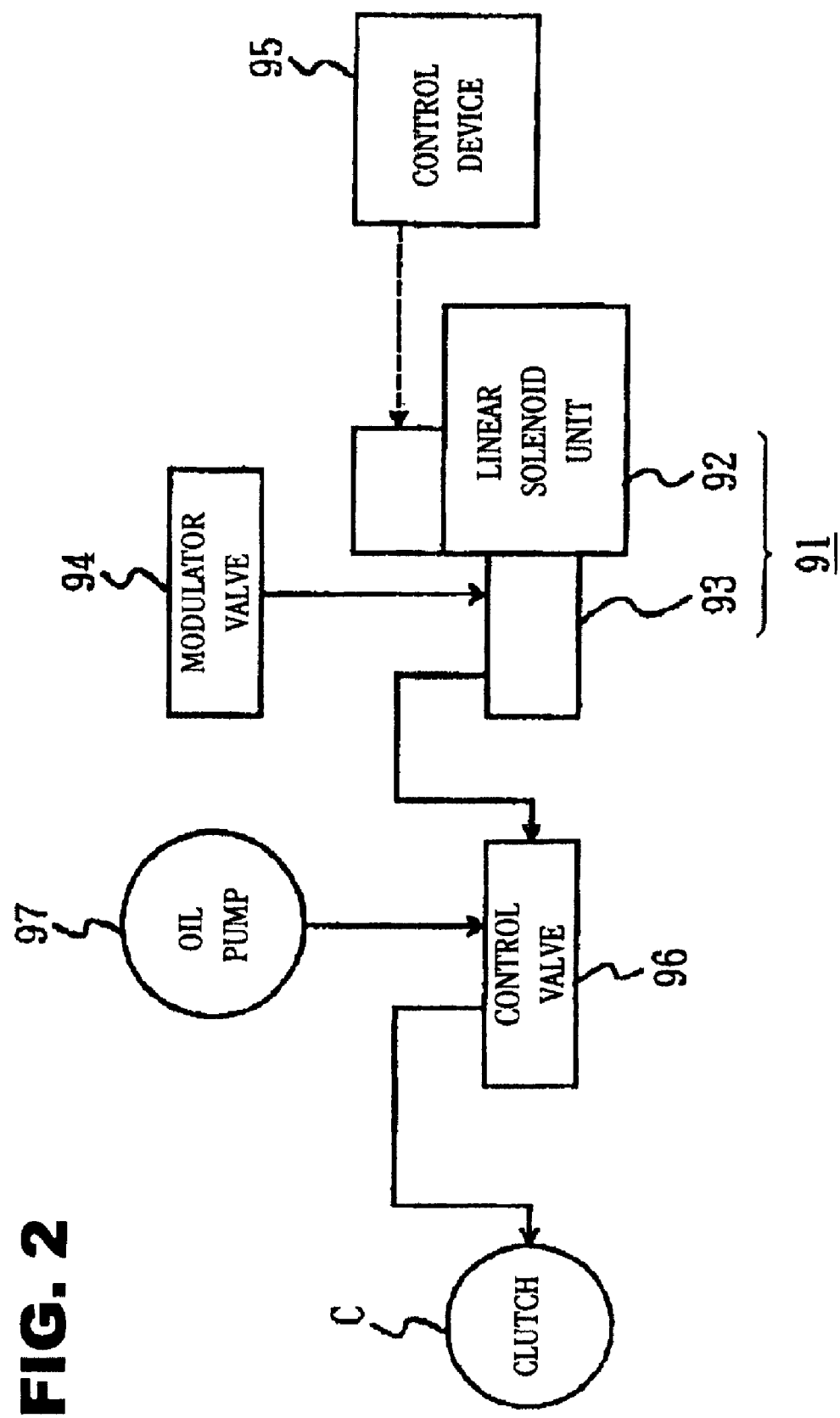
FIG. 2 is a diagram illustrating the principal components of a conventional oil pressure circuit.

In the drawings, reference numeral 10 denotes a linear solenoid valve, which is connected to a line pressure oil channel and so forth in the oil pressure circuit of an automatic transmission via an unshown regulator valve. The oil pressure generated in an oil pump is regulated by a regulator valve so as to be regulator pressure, and the regulator pressure is supplied to the linear solenoid valve 10 as input pressure. The linear solenoid valve 10 is then actuated based on a current supplied from the control device 95 (see FIG. 2). The linear solenoid valve 10 generates oil pressure corresponding to the supplied current as predetermined output pressure (pilot pressure), and supplies the output pressure to an unshown oil pressure servo as control pressure. The oil pressure servo is disposed for engaging or disengaging the clutch C serving as a friction engagement element. The control pressure is supplied to the oil pressure servo in a predetermined oil pressure pattern, and the clutch C is engaged or disengaged based on the oil pressure pattern. Note that in the present embodiment, while the clutch C is employed as the friction engagement element, a brake may be employed instead of the clutch C. An arrangement may be made wherein modulator pressure is generated by depressurizing the regulator pressure with a modulator valve, and then the modulator pressure is supplied to the linear solenoid valve 10.

Reference numeral 11 denotes a linear solenoid portion as a solenoid portion making up a solenoid driving device, and 12 denotes a regulating pressure valve unit as a valve unit, which is actuated by driving the linear solenoid portion 11. The linear solenoid valve 10 is mounted in an unshown automatic transmission case such that the linear solenoid portion 11 is disposed on the upper portion thereof, and the regulating pressure valve unit 12 is disposed on the lower portion thereof.

The linear solenoid portion 11 includes a ring-shaped core 15, a coil 17, which is wound to the core 15, serving as a current-supplied portion for receiving supply of a current and generating thrust, a moving iron core 54, which is disposed so as to advance and retreat (move in the horizontal direction in FIGS. 1 and 3) as to the coil 17, serving as a moving portion which is moved by the \ thrust, a terminal 21 for supplying a current to the coil 17, and a yoke 20 serving as a cylindrical chassis. The yoke 20 is disposed so as to surround the core 15, coil 17, and moving iron core 54.

The core 15 includes a cylindrical body 16, and a flange portion 28 which is formed, protruding outward in the radial direction, on the front edge (left edge in FIGS. 1 and 3) of the body 16. A through-hole 18 is formed in the body 16. The body 16 is longer than the coil 17 in the axial direction, and the rear edge (right edge in FIGS. 1 and 3) of the body 16 protrudes backward (rightward in FIGS. 1 and 3) of the rear edge of the coil 17 by a predetermined length.

The moving iron core 54 includes a ring-shaped plunger 31, and a shaft 32 which is fit into a hole 34 formed in the center of the plunger 31 and fixed, and is moved by supplying a current to the coil 17. The plunger 31 includes a discoid portion 35, and a cylindrical portion 36 which is formed, protruding forward (leftward in FIGS. 1 and 3) in the outer perimeter of the discoid portion 35. The shaft 32 extends through the through-hole 18, and is supported so as to advance and retreat slidably as to the core 15 via a bushing 19 which is disposed on the front edge and rear edge of the body 16. A ring-shaped plate 33 is mounted on the front edge face (left edge face in FIGS. 1 and 3) of the discoid portion 35 so as to surround the shaft 32, which is made up of a nonmagnetic member for isolating the core 15 from the plunger 31 magnetically.

The yoke 20 includes a bottom portion 56, which is made up of a bottomed cylindrical portion, having a cylindrical portion 55 and a circle shape. A notched portion 57 is formed on a predetermined portion in the circumferential direction of the front edge of the cylindrical portion 55, and the terminal 21 is mounted on the core 15 via the notched portion 57.

At the yoke 20, a crimping portion 80 is formed on the front edge of the cylindrical portion 55, the core 15, the coil 17, and the moving iron core 54 are fit into the yoke 20, a sleeve 62 of the regulating pressure valve unit 12 is set, following which the linear solenoid portion 11 and the regulating pressure valve unit 12 are integrally assembled by crimping the crimping portion 80 and a flange portion 63 formed on the rear edge of the sleeve 62. At this time, at the moving iron core 54, the rear edge of an inner spool 26 of the regulating pressure valve unit 12 comes into contact with the front edge face of the shaft 32.

The core 15, plunger 31, and yoke 20 are made up of a ferromagnetic substance, and soft magnetic iron may be employed as the ferromagnetic substance, for example. As for soft magnetic iron, pure iron of 95% or more, preferably, around 99% or more (99% or more after rounding off at the first decimal place), i.e., substantially, pure iron is employed. Also, the shaft 32 is made up of a nonmagnetic material, and as for a nonmagnetic material, stainless steel may be employed, for example.

The moving iron core 54 is disposed at the foremost position in a working state shown in FIG. 1, and is disposed at the hindmost position in an initial state shown in FIG. 3. In the working state, the plunger 31 comes into contact with the rear edge of the body 16 via the plate 33, and surrounds the rear edge portion (right edge portion in FIGS. 1 and 3) of the body 16. Also, in the initial state, the plunger 31 comes into contact with the yoke 20.

In the cylindrical portion 36, a hole 30 is formed, passing through in the axial direction, on a predetermined position in the circumferential direction, the forward side and backward side of the plunger 31 communicate via the hole 30. Accordingly, as the moving iron core 54 advances and retreats, the oil in front of the plunger 31 flows backward, and the oil behind the plunger 31 flows forward.

On the other hand, the regulating pressure valve unit 12 includes the inner spool 26, an outer spool 27, the sleeve 62, a slip-out-preventing end plate 64, which is fixed on the front edge of the sleeve 62, for preventing the outer spool 27 from slipping from the sleeve 62, a spring 44, which is disposed between the end plate 64 and the front edge of the outer spool 27, serving as a first pressing member for pressing the outer spool 27 toward the linear solenoid portion 11 side by spring load f1 serving as first pressing force, and a spring 45, which is disposed within the outer spool 27, serving as a second pressing member for pressing the inner spool 26 toward the linear solenoid portion 11 side by spring load f2 serving as second pressing force. Note that a first spool is made up of the outer spool 27, and a second spool is made up of the inner spool 26. Also, the end plate 64 makes up a pressing force adjustment member for adjusting the spring force f1.

The inner spool 26 is disposed on the inside of the outer spool 27 in the radial direction so as to advance and retreat, i.e., so as to move and also slide as to the outer spool 27. The inner spool 26 includes a spring washer 60 to be inserted into the spring 45, which is formed on the front edge, a great-diameter land 66 formed adjacent to the rear side of the spring washer 60, a middle-diameter groove 67 formed adjacent to the rear side of the land 66, a great-diameter land 68 formed adjacent to the rear side of the groove 67, and a small-diameter moving iron connect portion 69 formed adjacent to the rear side of the land 68.

Also, the outer spool 27 is disposed on the inside of the sleeve 62 in the radial direction so as to advance and retreat, and also so as to move and also slide as to the sleeve 62. The outer spool 27 includes a spring washer 70 to be inserted into the spring 44, which is formed on the front edge, a great-diameter land 71 formed adjacent to the rear side of the spring washer 70, a small-diameter groove 72 formed adjacent to the rear side of the land 71, a great-diameter land 73 formed adjacent to the rear side of the groove 72, a small-diameter groove 74 formed adjacent to the rear side of the land 73, and a middle-diameter land 75 formed adjacent to the rear side of the groove 74. A spring washer 76 to be inserted into the spring 45 is formed within the groove 72 so as to be adjacent to the rear edge face (right edge face in FIGS. 1 and 3) of the land 71, and also so as to face the spring washer 60. Note that a stopping portion for the inner spool 26 is made up of the spring washers 60 and 76.

A drain opening 78, passing through in the axial direction is formed in the axial centers of the spring washer 70, the land 71, and the spring washer 76, communicates a chamber formed in front of the inner spool 26 with the outside of the sleeve 62, in the outer spool 27.

Also, first and second feedback openings 81 and 82 passing through in the radial direction are formed on predetermined positions of the grooves 72 and 74 in the outer spool 27, and a cylindrical feedback oil channel 83 is formed between the inner spool 26 and the outer spool 27 along the outer circumferential face of the groove 67. A cylindrical drain oil channel 84 is formed along the outer circumferential face of the land 68 and the sleeve 62 such that the inner circumferential face on the inside of the land 75 in the radial direction serving as a processed portion is processed from the rear edge face forward, and the inner diameter is increased by a predetermined distance.

The sleeve 62 includes an input port p1 for receiving supply of input pressure, which is supplied (IN) from the regulator valve, an output port p2 for generating output pressure as control pressure, and outputting (OUT) the control pressure to the oil pressure servo, a feedback port p3 as a sealed feedback pressure acting portion, and drain ports p4 through p6. The feedback port p3 communicates with the output port p2 via the first and second feedback openings 81 and 82, and the feedback oil channel 83. The output pressure is supplied to the feedback port p3 as feedback pressure. The feedback port p3 generates pressing force corresponding to the area difference of the lands 73 and 75, and presses the outer spool 27 forward with the pressing force.

Accordingly, the outer spool 27 receives the thrust which is generated by the moving iron core 54, and is transmitted through the inner spool 26 and the spring 45, and the pressing force owing to the spring load f1 of the spring 44 and the feedback pressure, and integrally advances or retreats along with the moving iron core 54 in a state that the moving iron core contact portion 69 comes into contact the shaft 32.

Also, the inner spool 26 receives the thrust which is generated by the moving iron core 54, and is directly transmitted, and the spring load f2 of the spring 45, and selectively feeds the output pressure supplied via the feedback oil channel 83 back to the outer spool 27 so as to apply this to the outer spool 27. In connection with the thrust being changed, upon the inner spool 26 and the outer spool 27 being moved relatively, a communication state between the feedback oil channel 83, the input port p1, and the drain oil channel 84 is switched. The inner spool 26 makes up feedback pressure switching means for switching between whether or not the feedback pressure is applied to the spool 27 within the outer spool 27.

In an exemplary embodiment, while the feedback port p3 is formed as a feedback pressure acting portion, a pressure chamber may be formed for applying the feedback pressure on the outer spool 27 instead of the feedback port p3.

Next, description will be made regarding operation of the linear solenoid valve 10 having the above-described configuration. In this case, when the linear solenoid portion 11 is in the initial state, the input port p1 and the output port p2 are opened in the regulating pressure valve unit 12, so the linear solenoid valve 10 has a normal-open-type configuration.

First, in the initial state that a current is not supplied to the terminal 21 from the control device 95, as shown in FIG. 3, in the linear solenoid portion 11, the moving iron core 54 is disposed on the hindmost position, and the rear edge face of the moving iron core 54 comes into contact with the bottom portion 56. On the other hand, in the regulating pressure valve unit 12, the outer spool 27 is disposed on the hindmost position by the spring load f1 of the spring 44, and also the inner spool 26 is disposed on the hindmost position by the spring load f2 of the spring 45. At this time, the input port p1 and the output port p2 are opened, and the drain port p4 is closed by the land 71. Accordingly, the output pressure having the same value P1 as the input pressure is output from the output port p2. Also, the first feedback opening 81 is closed by the land 66, the output port p2 is sealed from the feedback oil channel 83, the feedback oil channel 83 communicates with the drain oil channel 84, and the oil within the feedback oil channel 83 is sent to the drain oil channel 84 so as to be discharged (EX) from the drain port p6.

Next, upon a current being supplied to the coil 17 from the control device 95 via the terminal 21, magnetic flux is generated, a magnetic path returning to the yoke 20 through the yoke 20, the plunger 31, and the core 15 is formed, and accordingly, a suction portion S is formed between the outer perimeter of the rear edge of the body 16 and the inner perimeter of the front edge of the cylindrical portion 36 in the magnetic path.

The coil 17 sucks in the moving iron core 54 with predetermined suction, and thrust in proportion to the current is generated at the moving iron core 54. As a result, the thrust is directly transmitted to the inner spool 26, the inner spool 26 is advanced (moved in the left direction in FIGS. 1 and 3) against the spring load f2, and then the spring 45 is compressed. At this time, while the same thrust is transmitted to the outer spool 27, the spring constant of the spring 44 is sufficiently increased in comparison with the spring constant of the spring 45, and accordingly, the outer spool 27 does not advance, and is disposed at almost the same hindmost position, the input port p1 and the output p2 are opened, the drain port p4 is closed by the land 71, and this state is maintained.

Accordingly, in FIG. 4, as shown with Line L-1, the value P1 of the output pressure output from the output port p2 does not change.

Subsequently, the current value reaches i1. Upon the spring washer 60 coming into contact with the spring washer 76, the first and second feedback openings 81 and 82 are opened, the output port p2 communicates with the feedback oil channel 83, further, the feedback oil channel 83 communicates with the feedback port p3, and the feedback oil channel 83 is sealed from the drain oil channel 84. In connection with this, the output pressure is supplied to the feedback port p3 via the first feedback opening 81, the feedback oil channel 83, and the second feedback opening 82, and the outer spool 27 is pressed forward by the feedback force.

As a result, the space between the input port p1 and output port p2 is narrowed down by the front edge of the land 73, as shown with Line L-2, the output pressure rapidly decreases, upon the current value reaching i2, the value of the output pressure reaches P2.

The thrust transmitted from the moving iron core 54 via the inner spool 26 and the spring 45, and the feedback force and the spring load f1 are applied to the outer spool 27, and the outer spool 27 is disposed at a position where the thrust, the feedback force, and the spring load f1 are balanced.

Subsequently, upon the current being increased from the value i2, the thrust to be applied to the outer spool 27 is increased, and the outer spool 27 is advanced. In connection with this, based on the stroke amount of the moving iron core 54, the outer spool 27 is advanced integrally with the inner spool 26 and the moving iron core 54, the space between the input port p1 and the output port p2 is narrowed down by the front edge of the land 73, as shown with Line L-3, the output pressure decreases in proportion to the current value. In this case, the ratio between the amount-of-change of the output pressure and the amount-of-change of the current is determined by spring constants of the springs 44 and 45, area difference of the lands 73 and 75, and the like. Upon the current value being set to i5, the thrust to be applied to the outer spool 27 reaches the maximum, and the output pressure reaches the minimal value P3.

On the other hand, in the working state, upon the current value being decreased from i5, the thrust applied to the outer spool 27 decreases, the outer spool 27 is retreated (moved in the right direction in FIGS. 1 and 3), and the output pressure increases in proportion to the current value. Upon the current value reaching i2, the spring washer 60 is separated from the spring washer 76, the first feedback opening 81 is closed by the land 66, the output port p2 is sealed from the feedback oil channel 83, and further the feedback oil channel 83 communicates with the drain oil channel 84. In connection with this, the output pressure is not supplied to the feedback port p3, the oil within the feedback oil channel 83 is drained, and consequently, the feedback force is eliminated.

As a result, the outer spool 27 is further retreated, the input port p1 and the output port p2 are opened, and the drain port p4 is closed by the land 71. Thus, the output pressure having the same value P1 as the input pressure is output from the output port p2.

Accordingly, in the linear solenoid valve 10, in accordance with the properties shown with Lines L-1 and L-2 in FIG. 4, the output pressure may be changed in a non-regulated pressure region, in accordance with the properties shown with Line L-3, the output pressure may be changed in a regulated pressure region. Note that Line L-4 indicates the properties of the linear solenoid valve 10 when the output pressure is generated without forming the non-regulated pressure region.

Thus, the output pressure is selectively applied to the outer spool 27 as the feedback pressure, and accordingly, only disposing the linear solenoid valve 10 enables the output pressure to be generated in the non-regulated pressure region and the regulated pressure region as the control pressure. Accordingly, the control valve and the like are not required. As a result, the number of parts in the oil pressure circuit can be reduced, thereby simplifying the oil pressure circuit.

Also, the maximal output pressure can be generated in the non-regulated pressure region, thereby reducing the thrust generated in the regulated pressure region by the moving iron core 54. Accordingly, the linear solenoid portion 11 can be reduced in size. In the non-regulated region, the output pressure can be generated in a state that the feedback pressure is not applied to the outer spool 27, and accordingly, excessive thrust is not required, thereby further reducing the linear solenoid portion 11 in size. Consequently, the linear solenoid valve 10 can be reduced in size.

Further, in the non-regulated pressure region, the feedback pressure is not applied to the outer spool 27, and accordingly, in the event of increasing the output pressure to the maximal oil pressure, even if the current values supplied to the coil 17 vary, the output pressure of the value P1 can be generated in a stable manner.

Also, in the regulated pressure region, the inclination of Line L-3 is smaller than that of Line L-4, thereby reducing the amount-of-change of the output pressure as to the amount-of-change of the current. Accordingly, even if the current values vary, the irregularities of the output pressure can be suppressed, whereby the properties of the linear solenoid valve 10 can be maintained in a stable manner. For example, when the current value is i3 or i4, while the irregularities of a value δ1 are generated on the output pressure in Line L-4, the irregularities of a value δ2 are generated on the output pressure in Line L-3.

Also, in order to change the output pressure in the regulated pressure region and the non-regulated pressure region, all that is necessary is to dispose the inner spool 26 so as to advance and retreat as to the outer spool 27, thereby simplifying the configuration of the linear solenoid valve 10.

The chamber formed forward of the inner spool 26 within the outer spool 27 communicates with the outside of the sleeve 62 via the drain opening 78, and accordingly, the thrust owing to the moving iron core 54 and the spring load f2 are only applied to the inner spool 26. Accordingly, in case that the first feedback opening 81 is opened, and the feedback oil channel 83 is sealed from the drain oil channel 84, and in case that the first feedback opening 81 is closed, and the feedback oil channel 83 communicates with the drain oil channel 84, the value of the output pressure as to the current value is the same in both the cases, thereby preventing hysteresis from occurring on Line L-2. Consequently, the properties of the linear solenoid valve 10 can be maintained in a stable manner.

Also, the spring washer 60 and moving iron core contact portion 69 are equal in the diameter and axial directional dimensions, the lands 66 and 68 are equal in the diameter and axial directional dimensions, and the inner spool 26 has a symmetrical shape in the axial direction, thereby not only protecting the inner spool 26 from erroneous assembly, but also reducing assembly steps.

Second Embodiment

Next, description will be made regarding a second exemplary embodiment of the present invention. Regarding the components having the same configurations as those of the first embodiment, the same reference numerals are applied thereto and description thereof omitted, and regarding the advantages owing to the same configurations as the first embodiment, the advantages of the first embodiment are applied to those of the present embodiment.

Figure 5:
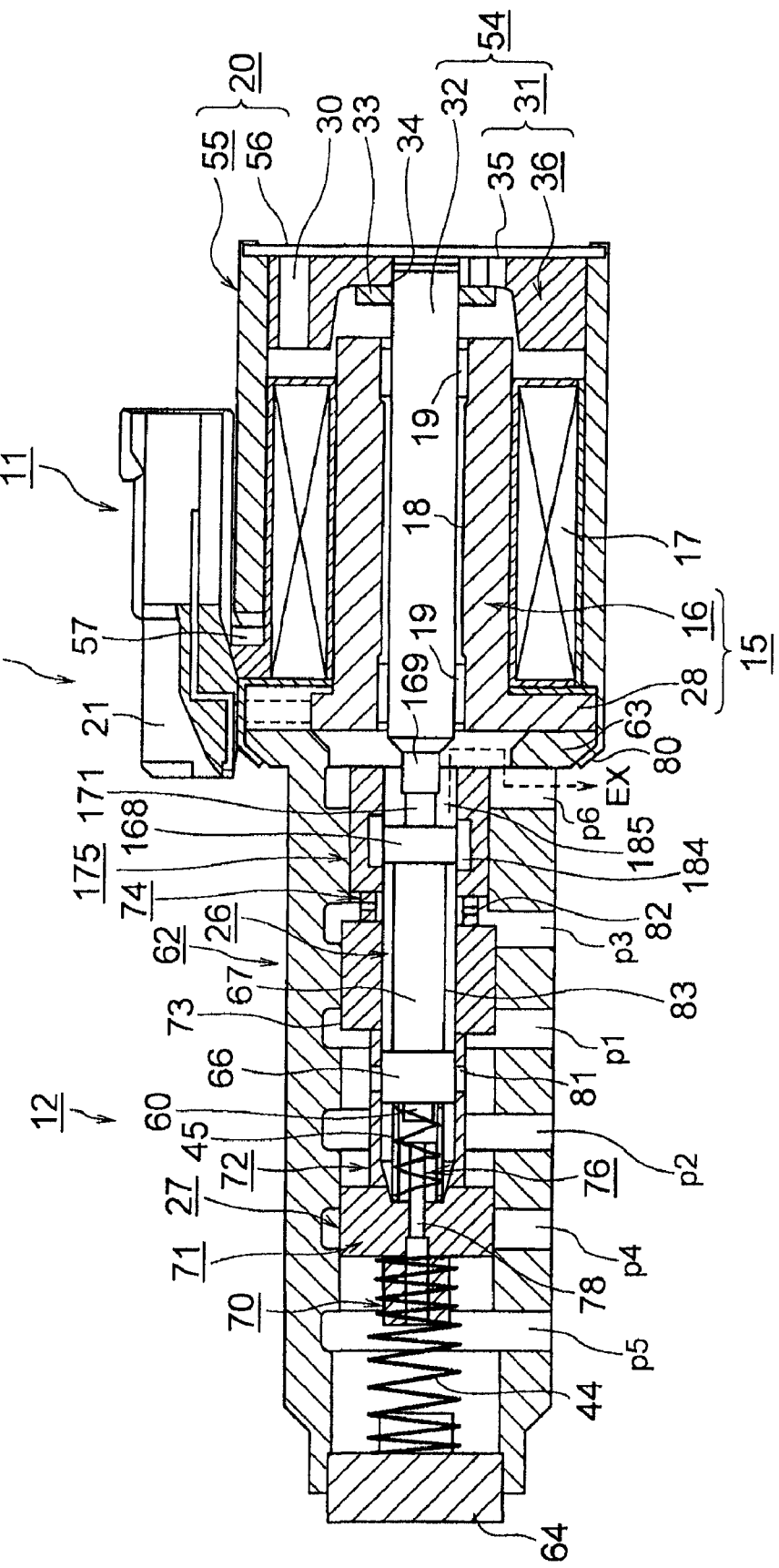
FIG. 5 is a diagram illustrating the initial state of a linear solenoid valve according to a second exemplary embodiment of the present invention.
Figure 6A:
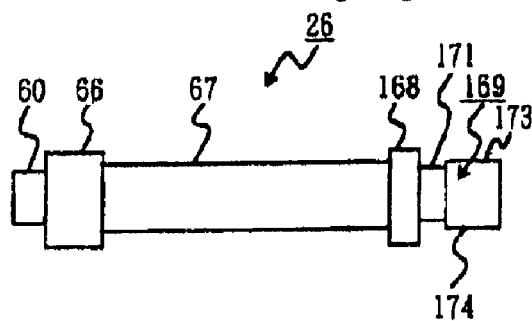
FIGS. 6A and 6B are diagrams illustrating an inner spool according to the second embodiment of the present invention.
Figure 6B:
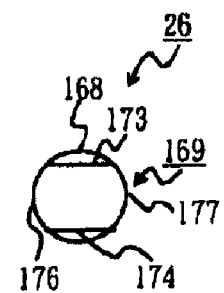

FIG. 5 is a diagram illustrating the initial state of a linear solenoid valve according to the second embodiment of the present invention, and FIGS. 6A and 6B are diagrams illustrating an inner spool according to the second embodiment of the present invention. Note that FIG. 6A is a front view of the inner spool 26, and FIG. 6B is a cross-sectional view of the inner spool 26.

In this case, the inner spool 26 serving as a second spool, and also as the feedback pressure switching means includes the spring washer 60 to be inserted into the spring 45 serving as a second pressing member, which is formed on the front edge (left edge in FIG. 5), the great-diameter land 66, which functions as a first supporting portion, formed adjacent to the rear side (rightward in FIG. 5) of the spring washer 60, the middle-diameter groove 67 formed adjacent to the rear side of the land 66, a great-diameter land 168 formed adjacent to the rear side of the groove 67, a small-diameter groove 171 formed adjacent to the rear side of the land 168, and a middle-diameter moving iron core contact portion 169, which functions as a second supporting portion, formed adjacent to the rear side of the groove 171. On the outer circumferential face of the moving iron core contact portion 169, flat portions 173 and 174 are formed in parallel as a processed portion on at least one place in the circumferential direction, and two places in the present embodiment.

Also, the outer spool 27 serving as a first spool includes the spring washer 70 to be inserted into the spring 44 serving as a first pressing member, which is formed on the front edge, the great-diameter land 71 formed adjacent to the rear side of the spring washer 70, the small-diameter groove 72 formed adjacent to the rear side of the land 71, the great-diameter land 73 formed adjacent to the rear side of the groove 72, the small-diameter groove 74 formed adjacent to the rear side of the land 73, and a middle-diameter land 175 formed adjacent to the rear side of the groove 74.

The moving iron core contact portion 169 is slid as to the outer spool 27 along with the inner spool 26 advancing or retreating (moving in the horizontal direction in FIG. 5). Because of this, the outer diameters of bow-shaped portions 176 and 177 other than the flat portions 173 and 174 in the moving iron core contact portion 169 are somewhat smaller than the inner diameter of the inner circumferential face of the land 175. Note that the supporting face is made up of the bow-shaped portions 176 and 177.

The cylindrical feedback oil channel 83 is formed between the inner spool 26 and outer spool 27 along the outer circumferential face of the groove 67, and a drain oil channel 185 is formed along the outer circumferential of the groove 171 and the moving iron core contact portion 169. Note that in the drain oil channel 185, the portion along the outer circumferential face of the groove 171 has a cylindrical shape, and the portion along the outer circumferential face of the moving iron core contact portion 169 is divided into two portions outward of the flat portions 173 and 174, which have a crescent shape made up of an arc-shaped portion and a bowstring portion.

The inner circumferential face of the land 175 serving as a processed portion is processed, the inner diameter thereof is increased by a predetermined amount, and a cylindrical drain oil channel 184 is formed along the outer circumferential face of the land 168.

In this case, with the initial state wherein a current is not supplied to the terminal 21 from the control device 95 (see FIG. 2), in the regulating pressure valve unit 12 serving as a valve unit, the outer spool 27 is disposed on the hindmost position by the spring load f1 of the spring 44, and also the inner spool 26 is disposed on the hindmost position by the spring load f2 of the spring 45. At this time, the input port p1 and the output port p2 are opened, and the drain port p4 is closed by the land 71. Accordingly, the output pressure having the same value P1 (see FIG. 4) as the input pressure is output from the output port p2. Also, the first feedback opening 81 is closed by the land 66, the output port p2 is sealed from the feedback oil channel 83, the feedback oil channel 83 communicates with the drain oil channels 184 and 185, and the oil within the feedback oil channel 83 is sent to the drain oil channels 184 and 185 so as to be discharged from the drain port p6.

Next, upon a current being supplied to the coil 17 from the control device 95 via the terminal 21, the coil 17 sucks in the moving iron core 54 with predetermined suction, and thrust in proportion to the current is generated in the moving iron core 54. As a result, the thrust is directly transmitted to the inner spool 26, and the inner spool 26 is advanced (moved in the left direction in FIG. 5) against the spring load f2. Upon the spring washer 60 coming into contact with the spring washer 76, the first and second feedback openings 81 and 82 are opened, the output port p2 communicates with the feedback oil channel 83, further, the feedback oil channel 83 communicates with the feedback port p3 serving as a feedback pressure acting portion, and the feedback oil channel 83 is sealed from the drain oil channel 184. In connection with this, the output pressure is supplied to the feedback port p3 via the first feedback opening 81, the feedback oil channel 83, and the second feedback opening 82, and the outer spool 27 is pressed forward (leftward in FIG. 5) by the feedback force. Note that a stopping portion for the inner spool 26 is made up of the spring washers 60 and 76.

Incidentally, in a state that the feedback oil channel 83 communicates with the drain oil channel 184, while the land 168 is completely separated from the inner circumferential face of the outer spool 27 so as not to be supported by the outer spool 27, the moving iron core contact portion 169 is retained by the outer spool 27 in the bow-shaped portions 176 and 177. Accordingly, the inner spool 26 is supported in a sure manner by the outer spool 27 via the land 66 and the moving iron core contact portion 169, thereby smoothly advancing or retreating the inner spool 26.

Third Embodiment

Next, description will be made regarding a third exemplary embodiment of the present invention. Regarding the components having the same configurations as those of the first embodiment, the same reference numerals are applied thereto and description thereof omitted, and regarding the advantages owing to the same configurations as the first embodiment, the advantages of the first embodiment are applied to those of the present embodiment.

Figure 7:
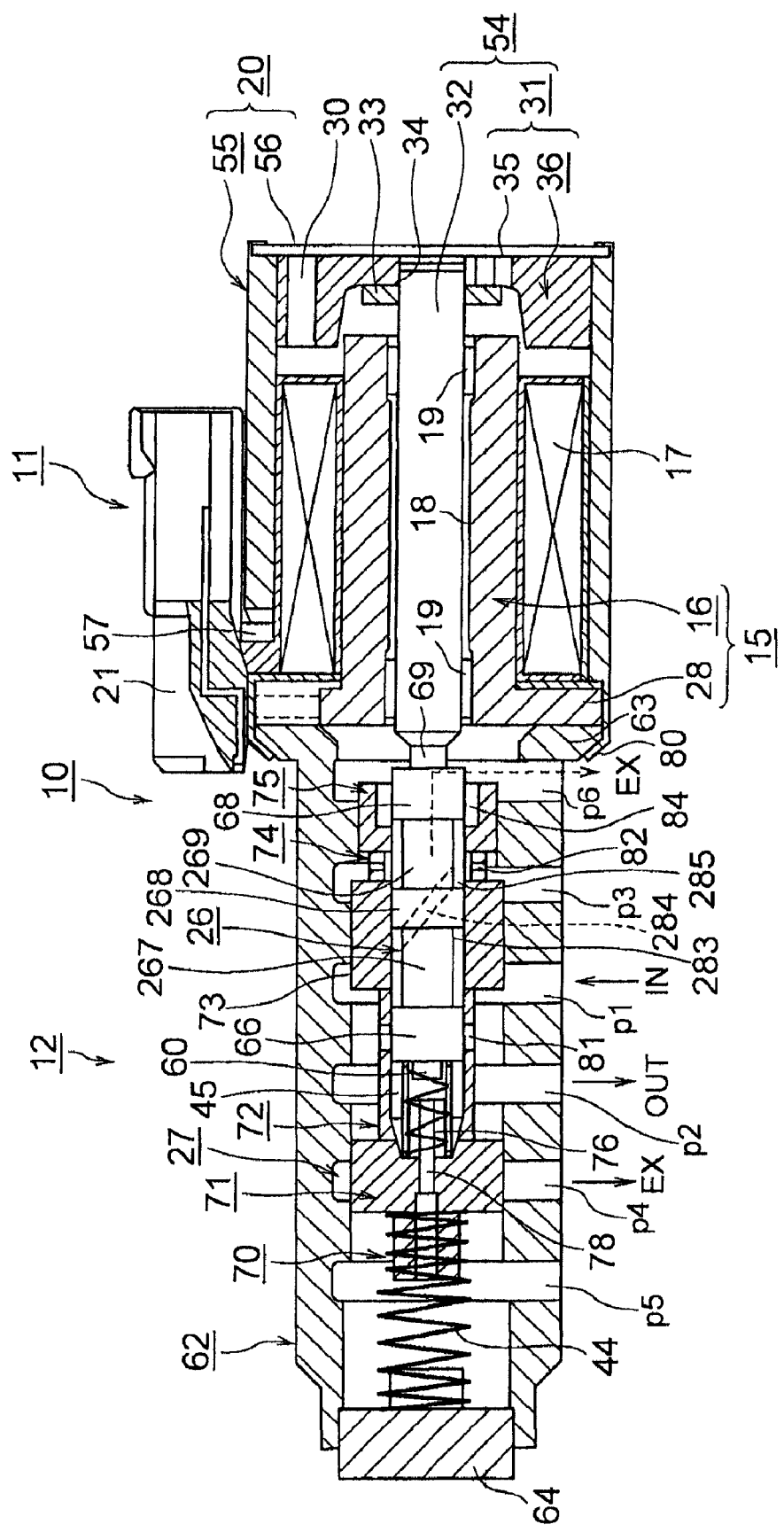
FIG. 7 is a diagram illustrating the initial state of a linear solenoid valve according to a third exemplary embodiment of the present invention.

FIG. 7 is a diagram illustrating the initial state of a linear solenoid valve according to the third embodiment of the present invention.

In this case, the inner spool 26 serving as a second spool, and also as the feedback pressure switching means includes the spring washer 60 to be inserted into the spring 45 serving as a second pressing member, which is formed on the front edge (left edge in the drawing), the middle-diameter land 66 formed adjacent to the rear side (rightward in the drawing) of the spring washer 60, a small-diameter groove 267 formed adjacent to the rear side of the land 66, a middle-diameter land 268 formed adjacent to the rear side of the groove 267, a middle-diameter groove 269 formed adjacent to the rear side of the land 268, the great-diameter land 68 formed adjacent to the rear side of the groove 269, and the small-diameter moving iron core contact portion 69 formed adjacent to the rear side of the land 68. A feedback oil channel 284 is formed passing through diagonally extending from the groove 267 to the groove 269. With the feedback oil channel 284, one end thereof is opened on the outer circumferential face of the groove 267, and the other end is opened on the outer circumferential face of the groove 269.

Also, the outer spool 27 serving as a first spool includes the spring washer 70 to be inserted into the spring 44 serving as a first pressing member, the great-diameter land 71 formed adjacent to the rear side of the spring washer 70, the small-diameter groove 72 formed adjacent to the rear side of the land 71, the great-diameter land 73 formed adjacent to the rear side of the groove 72, the small-diameter groove 74 formed adjacent to the rear side of the land 73, and the middle-diameter land 75 formed adjacent to the rear side of the groove 74.

Cylindrical feedback oil channels 283 and 285 are formed between the inner spool 26 and outer spool 27 along the outer circumferential face of the grooves 267 and 269. The cylindrical drain oil channel 84 is formed along the outer circumferential face of the land 68 such that the inner diameter is increased by a predetermined distance between the rear edge face (right edge face in the drawing) and the forward (leftward in the drawing) on the inside of the land 75 in the radial direction.

In this case, with the initial state that a current is not supplied to the terminal 21 from the control device 95 (see FIG. 2), in the regulating pressure valve unit 12 serving as a valve unit, the outer spool 27 is disposed on the hindmost position by the spring load f1 of the spring 44, and also the inner spool 26 is disposed on the hindmost position by the spring load f2 of the spring 45. At this time, the input port p1 and the output port p2 are opened, and the drain port p4 is closed by the land 71. Accordingly, the output pressure having the same value P1 (see FIG. 4) as the input pressure is output from the output port p2. Also, the first feedback opening 81 is closed by the land 66, the output port p2 is sealed from the feedback oil channel 283, the feedback oil channels 283 through 285 communicate with the drain oil channel 84, and the oil within the feedback oil channels 283 through 285 is sent to the drain oil channel 84 so as to be discharged from the drain port p6.

Next, upon a current being supplied to the coil 17 from the control device 95 via the terminal 21, the coil 17 sucks in the moving iron core 54 with predetermined suction, and thrust in proportion to the current is generated in the moving iron core 54. As a result, the thrust is directly transmitted to the inner spool 26, and the inner spool 26 is advanced (moved in the left direction in the drawing) against the spring load f2. Upon the spring washer 60 coming into contact with the spring washer 76, the first and second feedback openings 81 and 82 are opened, the output port p2 communicates with the feedback oil channels 283 through 285, further, the feedback oil channels 283 through 285 communicate with the feedback port p3, and the feedback oil channels 283 through 285 are sealed from the drain oil channel 84. In connection with this, the output pressure is supplied to the feedback port p3 via the first feedback opening 81, the feedback oil channels 283 through 285, and the second feedback opening 82, and the outer spool 27 is pressed forward by the feedback force. Note that a stopping portion for the inner spool 26 is made up of the spring washers 60 and 76.

Also, the spring washer 60 and moving iron core contact portion 69 are equal in the diameter and axial directional dimensions, the lands 66 and 68 are equal in the diameter and axial directional dimensions, further, the grooves 267 and 269 are equal in the diameter and axial directional dimensions, and the inner spool 26 has a symmetrical shape in the axial direction, thereby protecting the inner spool 26 from erroneous assembly.

Incidentally, in a state that the feedback oil channel 285 communicates with the drain oil channel 84, while the land 68 is completely separated from the inner circumferential face of the outer spool 27 so as not to be supported by the outer spool 27, the land 268 is retained by the outer spool 27. Accordingly, the inner spool 26 is supported in a sure manner by the outer spool 27 via the lands 66 and 268, thereby smoothly advancing or retreating (moving in the horizontal direction in the drawing) the inner spool 26.

Fourth Embodiment

Now, in the first embodiment, in the groove 72, the spring washer 76 to be inserted into the spring 45 is formed adjacent to the rear edge face of the land 71, facing the spring washer 60, and accordingly, the workability of the outer spool 27 deteriorates so as to increase the linear solenoid valve 10 in cost. Consequently, description will be made regarding a fourth exemplary embodiment of the present invention devised such that the workability of the outer spool 27 can be improved. Regarding the components having the same configurations as those of the first embodiment, the same reference numerals are applied thereto and description thereof omitted, and regarding the advantages owing to the same configurations as the first embodiment, the advantages of the first embodiment are applied to those of the present embodiment.

Figure 8:
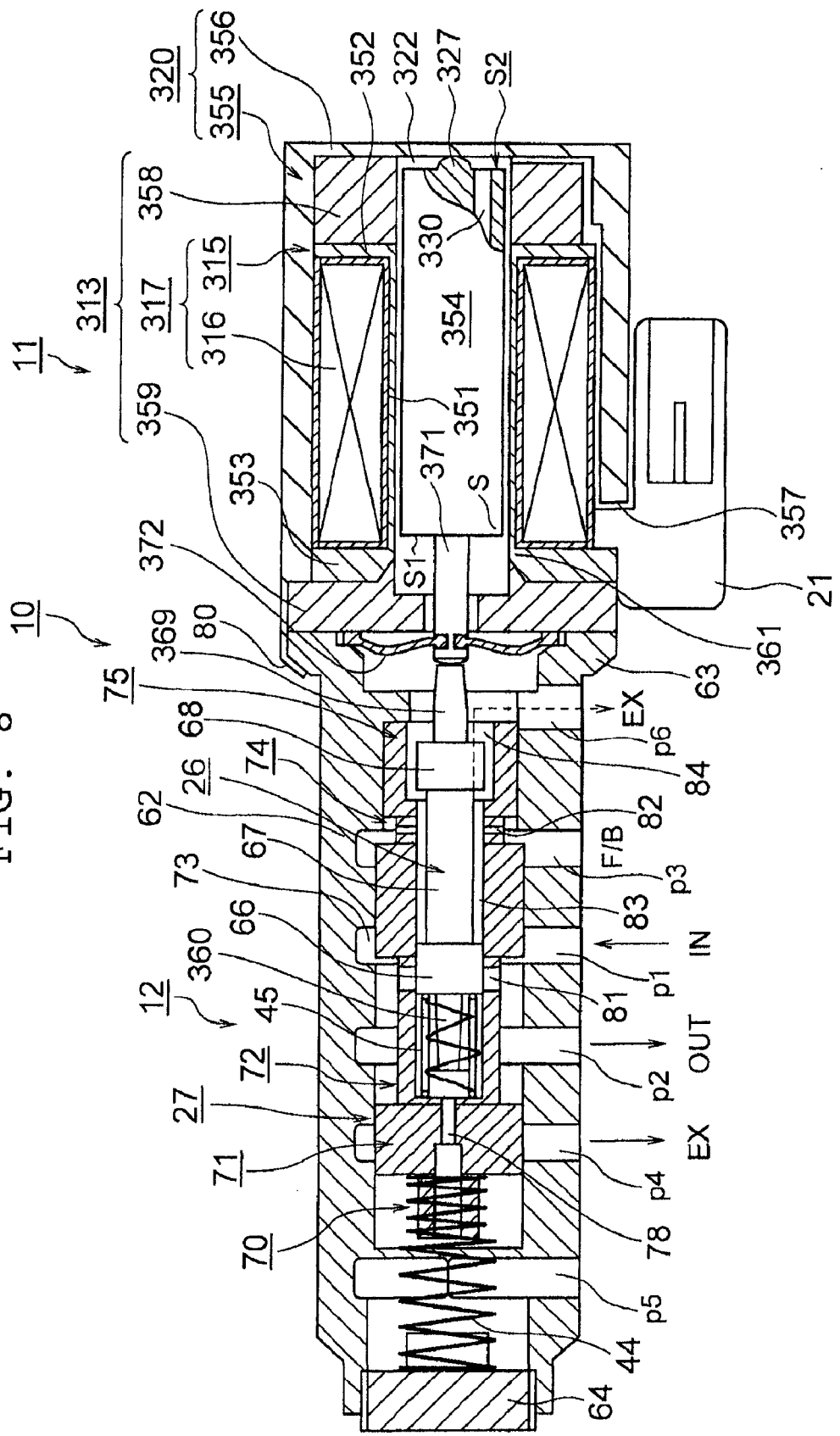
FIG. 8 is a diagram illustrating the initial state of a linear solenoid valve according to a fourth exemplary embodiment of the present invention.
Figure 9:
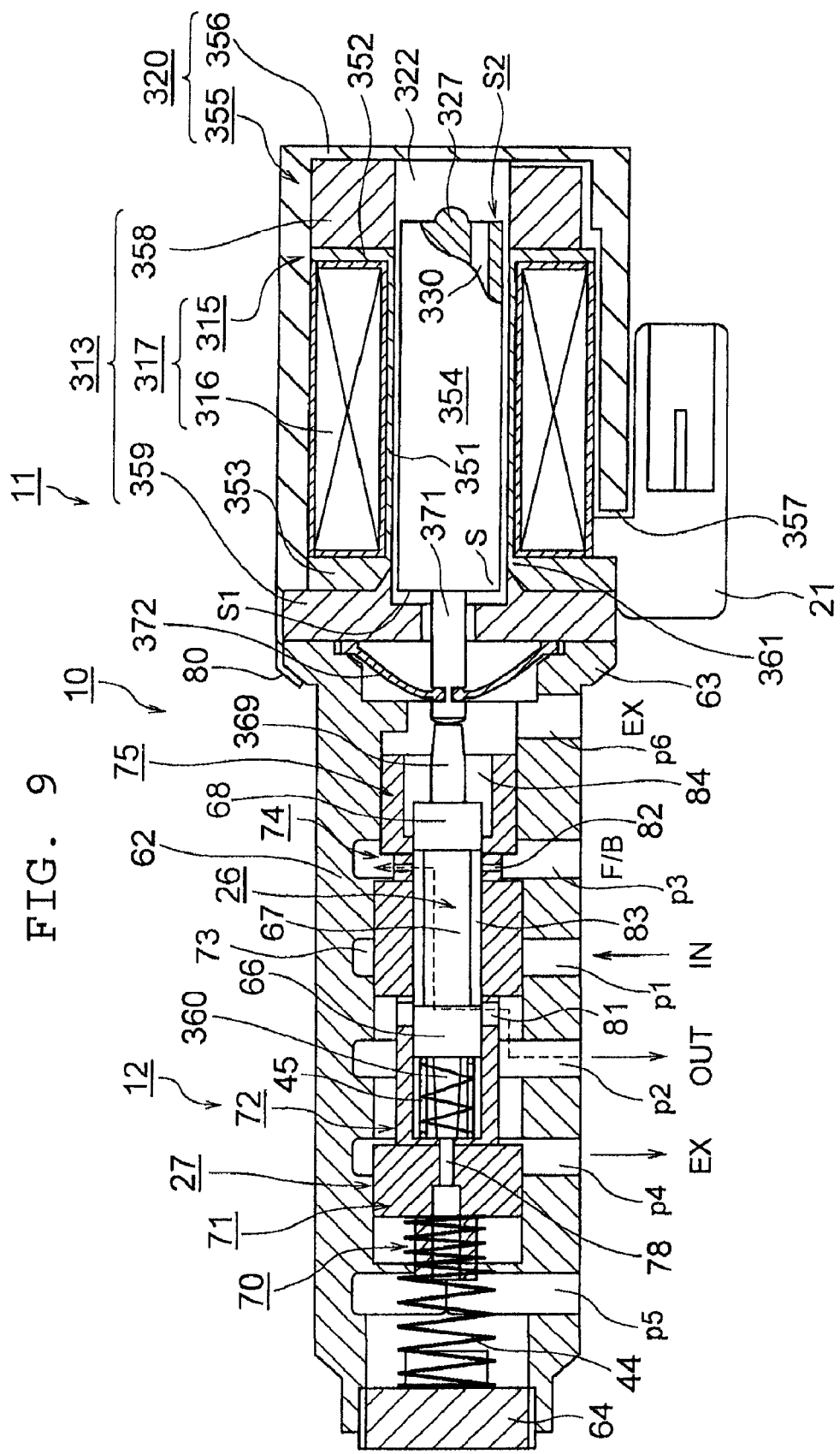
FIG. 9 is a diagram illustrating the working state of a linear solenoid valve according to the fourth embodiment of the present invention.

FIG. 8 is a diagram illustrating the initial state of a linear solenoid valve according to the fourth embodiment of the present invention, and FIG. 9 is a diagram illustrating the working state of the linear solenoid valve according to the fourth embodiment of the present invention.

In this case, the linear solenoid portion 11 serving as a solenoid portion includes a coil assembly 313, a plunger 354 disposed so as to advance and retreat (move in the horizontal direction in the drawings) as to the coil assembly 313, and a yoke 320 serving as a cylindrical chassis disposed so as to surround the coil assembly 313. Further, the coil assembly 313 includes a coil 317 formed by winding a winding wire 316 around a bobbin 315, a ring-shaped end portion 358 disposed adjacent to the rear edge (right edge in the drawings) of the coil 317 as a first end yoke, a ring-shaped end portion 359 disposed adjacent to the front edge (left edge in the drawings) of the coil 317 as a second end yoke, and the terminal 21 for supplying a current to the coil 317.

The coil assembly 313 is formed in a cylindrical shape excluding the portion of the terminal 21, a hollow portion 322 having the same diameter in the axial direction is formed within the coil assembly 313 (on the inside of the bobbin 315 and the end portions 358 and 359 in the radial direction), and the plunger 354 is fit into the hollow portion 322 so as to be slid. Accordingly, the plunger 354 is supported by the coil assembly 313 in a state that the plunger 354 is fit into the hollow portion 322.

The bobbin 315 is made up of a nonmagnetic member. As for a nonmagnetic member, nonmagnetic metal such as stainless steel (SUS) or the like, or synthetic resin can be employed, for example. The bobbin 315 includes a cylindrical portion 351, a ring-shaped flange portion 352 formed facing the outside in the radial direction at the rear edge of the cylindrical portion 351, and a ring-shaped flange portion 353 formed facing the outside in the radial direction at the front edge of the cylindrical portion 351, which has a cross-section in the shape of a square with one end open. The bobbin 315 and the end portions 358 and 359 are integrally assembled by means of welding, brazing, sintering bonding, adhesion, or the like.

The end portions 358 and 359 are made up of a magnetic member, i.e., a ferromagnetic substance. As for a ferromagnetic substance, soft magnetic iron may be employed, for example. As for soft magnetic iron, pure iron of 95% or more, preferably, around 99% or more (99% or more after rounding off at the first decimal place), i.e., substantially, pure iron is employed.

The yoke 320 includes a bottom portion 356 made up of a bottomed cylindrical member having a cylindrical portion 355 and a circle shape, which is formed integrally with plastic metal processing such as deep drawing, cold forging, or the like. A notched portion 357 is formed on a predetermined portion in the circumferential direction of the front edge of the cylindrical portion 355, and the terminal 21 is mounted on the coil assembly 313 via the notched portion 357.

The yoke 320 is made up of a magnetic member, i.e., a ferromagnetic substance. As for a ferromagnetic substance, low-carbon steel with reduced carbon content facilitating plastic metal processing, for example, the same soft magnetic iron as the end portions 358 and 359 is preferably employed.

In the yoke 320, the crimping portion 80 is formed on the front edge of the cylindrical portion 355, the coil assembly 313 is fit into the yoke 320, the sleeve 62 of the regulating pressure valve unit 12 serving as a valve unit is set, following which the linear solenoid portion 11 and the regulating pressure valve unit 12 are integrally assembled by crimping the crimping portion 80 and the flange portion 63 formed on the rear edge of the sleeve 62.

The plunger 354 of which the outer circumferential face has the same diameter in the axial direction is longer than the coil 317 in the axial direction. A contact rod 371 protruding forward (leftward in the drawings) on the center of the front edge face (left edge face in the drawings) S1 of the plunger 354 is formed integrally with the plunger 354. The rear edge of the inner spool 26 serving as a second spool, and also as feedback pressure switching means, comes into contact with the front edge of the contact rod 371. Note that a moving iron core is formed by the plunger 354 and contact rod 371.

A ring-shaped groove is formed on the outer circumferential face near the front edge of the contact rod 371, the inner circumferential edge of a ring-shaped thin plate material 372 made up of an elastic member is mounted on the groove, the outer circumferential edge of the thin plate material 372 is held between the flange portion 63 and the end portion 359. The thin plate material 372 segments the space within the outer spool 27 serving as a first spool and the hollow portion 322, thereby preventing iron powder generated within the outer spool 27 from intruding into the hollow portion 322.

A spherical contact portion 327 having a predetermined height is integrally formed on the rear edge face (right edge face in the drawings) S2 of the plunger 354. The surface of the contact portion 327 is subjected to surface processing, an outer layer made up of a nonmagnetic member is formed.

Also, an oil path 330 having a predetermined diameter in the axial direction is formed passing through the plunger 354, the front edge side and the rear edge side of the plunger 354 communicate via the oil path 330. Accordingly, along with the plunger 354 being advanced or retreated, the oil of the front edge side of the plunger 354 within the hollow portion 322 flows backward (rightward in the drawings), or the oil of the rear edge side of the plunger 354 within the hollow portion 322 flows forward.

Thus, the contact portion 327 is formed in the plunger 354, and also the outer layer made up of a nonmagnetic member is formed on the surface of the contact portion 327, thereby preventing magnetic flux from occurring between the yoke 320 and the contact portion 327, and separating magnetism.

Note that in the present embodiment, while the contact portion 327 has a spherical shape, various kinds of shapes may be assumed, such as cylindrical, prismatic, circular, or the like. Also, in the present embodiment, while the contact portion 327 is formed in the plunger 354, an arrangement may be made wherein the rear edge face S2 of the plunger 354 is flattened, and the contact portion is formed protruding toward the plunger 354 side in the yoke 320, or the contact portion is formed in the plunger 354 and the yoke 320.

Now, of the flange portions 352 and 353, the flange portion 353 disposed on the regulating pressure valve unit 12 side is formed thickly, and also the inner circumferential face of the flange portion 353 is formed in a tapered shape. That is to say, the inner diameter of the flange portion 353 is the greatest at the front edge of the flange portion 353, the farther backward, the smaller, and is equal to the inner diameter of the cylindrical portion 351 at the rear edge of the flange portion 353.

An edge portion 361 having a right triangle shape in a cross-section is formed protruding backward, which has the outer circumferential face in a tapered shape corresponding to the inner circumferential face of the flange portion 353 near the inner circumferential edge of the end portion 359, and the inner circumferential face of the flange portion 353 comes into contact with the outer circumferential face of the edge portion 361. Thus, the outer diameter of the edge portion 361 is the greatest at the front edge of the winding wire 316, the farther backward, the smaller, and is equal to the inner diameter of the end portion 359. In this case, the edge portion 361 is formed such that the further backward the region thereof is, the thinner the portion thereof is, and accordingly, magnetic saturation is formed in the edge portion 361.

Note that in the present embodiment, while the outer circumferential face of the edge portion 361 and the inner circumferential face of the flange portion 353 are formed in a tapered shape, an arrangement may be made wherein the outer circumferential face and the inner circumferential face are bent in a convex or concave shape, or are formed of multistage inclined planes with different tilt angles.

The plunger 354 is made up of a ferromagnetic substance as well as the end portions 358 and 359, and the yoke 320, as for a ferromagnetic substance, soft magnetic iron or the like may be employed, for example.

In the meantime, at the regulating pressure valve unit 12, the inner spool 26 includes a spring washer 360 to be inserted into the spring 45 serving as a second pressing member, which is formed on the front edge, the great-diameter land 66 formed adjacent to the rear side of the spring washer 360, the middle-diameter groove 67 formed adjacent to the rear side of the land 66, the great-diameter land 68 formed adjacent to the rear side of the groove 67, and a small-diameter moving iron core contact portion 369 formed adjacent to the rear side of the land 68. The further forward the portion of the spring washer 360 is, the less the outer diameter thereof is. The further backward the region of the moving iron core contact portion 369 is, the less the outer diameter thereof is. Both have a tapered shape.

Also, the outer spool 27 includes the spring washer 70 to be inserted into the spring 44 serving as a first pressing member, which is formed on the front edge, the great-diameter land 71 formed adjacent to the rear side of the spring washer 70, the small-diameter groove 72 formed adjacent to the rear side of the land 71, the great-diameter land 73 formed adjacent to the rear side of the groove 72, the small-diameter groove 74 formed adjacent to the rear side of the land 73, and the middle-diameter land 75 formed adjacent to the rear side of the groove 74.

The drain opening 78 passing through in the axial direction is formed in the axial centers of the land 71 and spring washer 70, and the drain opening 78 has a chamber formed forward of the inner spool 26 within the outer spool 27 communicating with the outside of the sleeve 62.

Next, description will be made regarding operation of the linear solenoid valve 10 having the above-described configuration.

First, in the initial state that a current is not supplied to the terminal 21 from the control device 95 (see FIG. 2), as shown in FIG. 8, the contact portion 327 comes into contact with the bottom portion 356.

On the other hand, in the regulating pressure valve unit 12, the outer spool 27 is disposed on the hindmost position by the spring load f1 of the spring 44, and also the inner spool 26 is disposed on the hindmost position by the spring load f2 of the spring 45. At this time, the input port p1 and the output port p2 are opened, and the drain port p4 is closed by the land 71. Accordingly, the output pressure having the same value P1 (see FIG. 4) as the input pressure is output from the output port p2. Also, the first feedback opening 81 is closed by the land 66, the output port p2 is sealed from the feedback oil channel 83, the feedback oil channel 83 communicates with the drain oil channel 84, and the oil within the feedback oil channel 83 is sent to the drain oil channel 84 so as to be discharged (EX) from the drain port p6.

Next, upon a current being supplied to the coil 317 from the control device 95 via the terminal 21, while magnetic flux is generated, the bobbin 315 is made up of a nonmagnetic member, a magnetic path bypassing the bobbin 315 and returning to the yoke 320 through the yoke 320, the end portion 358, the plunger 354, and the end portion 359 is formed, and accordingly, a suction portion S is formed between the edge portion 361 in the magnetic path and the plunger 354.

The coil 317 sucks in the plunger 354 with predetermined suction, and thrust is generated in the plunger 354. As a result, the thrust is directly transmitted to the inner spool 26, the inner spool 26 is advanced (moved in the left direction in the drawings) against the spring load f2, and then the spring 45 is contracted. At this time, while the same thrust is transmitted to the outer spool 27, the spring constant of the spring 44 is sufficiently increased in comparison with the spring constant of the spring 45, and accordingly, the outer spool 27 does not advance, which is disposed almost the same hindmost position, the input port p1 and the output p2 are opened, the drain port p4 is closed by the land 71, and this state is maintained.

Accordingly, in the same way as with the first embodiment, in FIG. 4, as shown with Line L-1, the value P1 of the output pressure to be output from the output port p2 does not change. Subsequently, upon the current value reaching i1, and the spring washer 360 coming into contact with the bottom portion of the groove 72 as shown in FIG. 9, the first and second feedback openings 81 and 82 are opened, the output port p2 communicates with the feedback oil channel 83, further, the feedback oil channel 83 communicates with the feedback port p3, and the feedback oil channel 83 is sealed from the drain oil channel 84. In connection with this, the output pressure is supplied to the feedback port p3 serving as a feedback pressure acting portion via the first feedback opening 81, the feedback oil channel 83, and the second feedback opening 82, and the outer spool 27 is pressed forward by the feedback force. Note that the stopping portion for the inner spool 26 is made up of the spring washer 360 and bottom of the groove 72.

As a result, the space between the input port p1 and output port p2 is narrowed down by the front edge of the land 73, as shown with Line L-2, the output pressure rapidly decreases, and upon the current value reaching i2, the value of the output pressure reaches P2.

The thrust transmitted from the moving iron core 54 via the inner spool 26 and the spring 45, and the feedback force and the spring load f1 are applied to the outer spool 27, and the outer spool 27 is disposed on a position where the thrust, the feedback force, and the spring load f1 are balanced.

Subsequently, upon the current being increased from the value i2, the thrust to be applied to the outer spool 27 is increased, and the outer spool 27 is advanced. In connection with this, based on the stroke amount of the plunger 354 and the contact rod 371, the outer spool 27 is advanced integrally with the inner spool 26, the plunger 354, and the contact rod 371, the space between the input port p1 and the output p2 is narrowed down by the front edge of the land 73, as shown with Line L-3, the output pressure decreases in proportion to the current value. In this case, the ratio between the amount-of-change of the output pressure and the amount-of-change of the current is determined by the spring constants of the springs 44 and 45, area difference of the lands 73 and 75, and the like. Upon the current value being set to i5, the thrust to be applied to the outer spool 27 reaches the maximum, and the output pressure reaches the minimal value P3.

Thus, the present embodiment has a mechanism wherein the spring washer 360 comes into contact with the bottom of the groove 72 when the spring washer 360 advances, and no spring washer is formed on the outer spool 27 side, thereby improving workability of the outer spool 27. Thus, the linear solenoid valve 10 is reduced in costs.

Also, the spring washer 360 and moving iron core contact portion 369 are equal in the diameter and axial directional dimensions, the lands 66 and 68 are also equal in the diameter and axial directional dimensions, and the inner spool 26 has a symmetrical shape in the axial direction, thereby protecting the inner spool 26 from erroneous assembly.

Fifth Embodiment

Next, description will be made regarding a fifth exemplary embodiment of the present invention. Regarding the components having the same configurations as those of the third and fourth embodiments, the same reference numerals are applied thereto and description thereof omitted, and regarding the advantages owing to the same configurations as the third and fourth embodiments, the advantages of the third and fourth embodiments are applied to those of the present embodiment.

Figure 10:
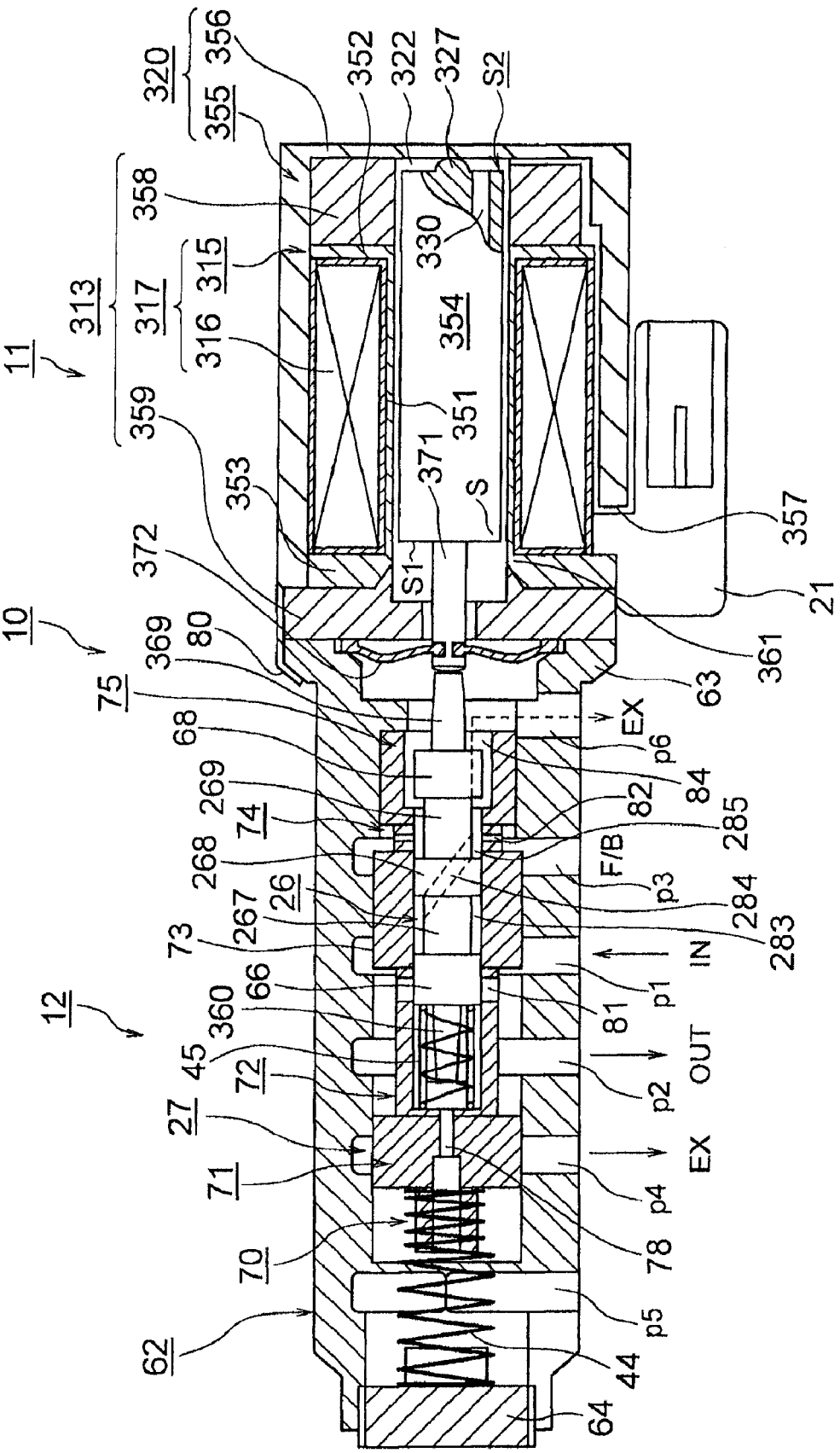
FIG. 10 is a diagram illustrating the initial state of a linear solenoid valve according to a fifth exemplary embodiment of the present invention.
Figure 11:
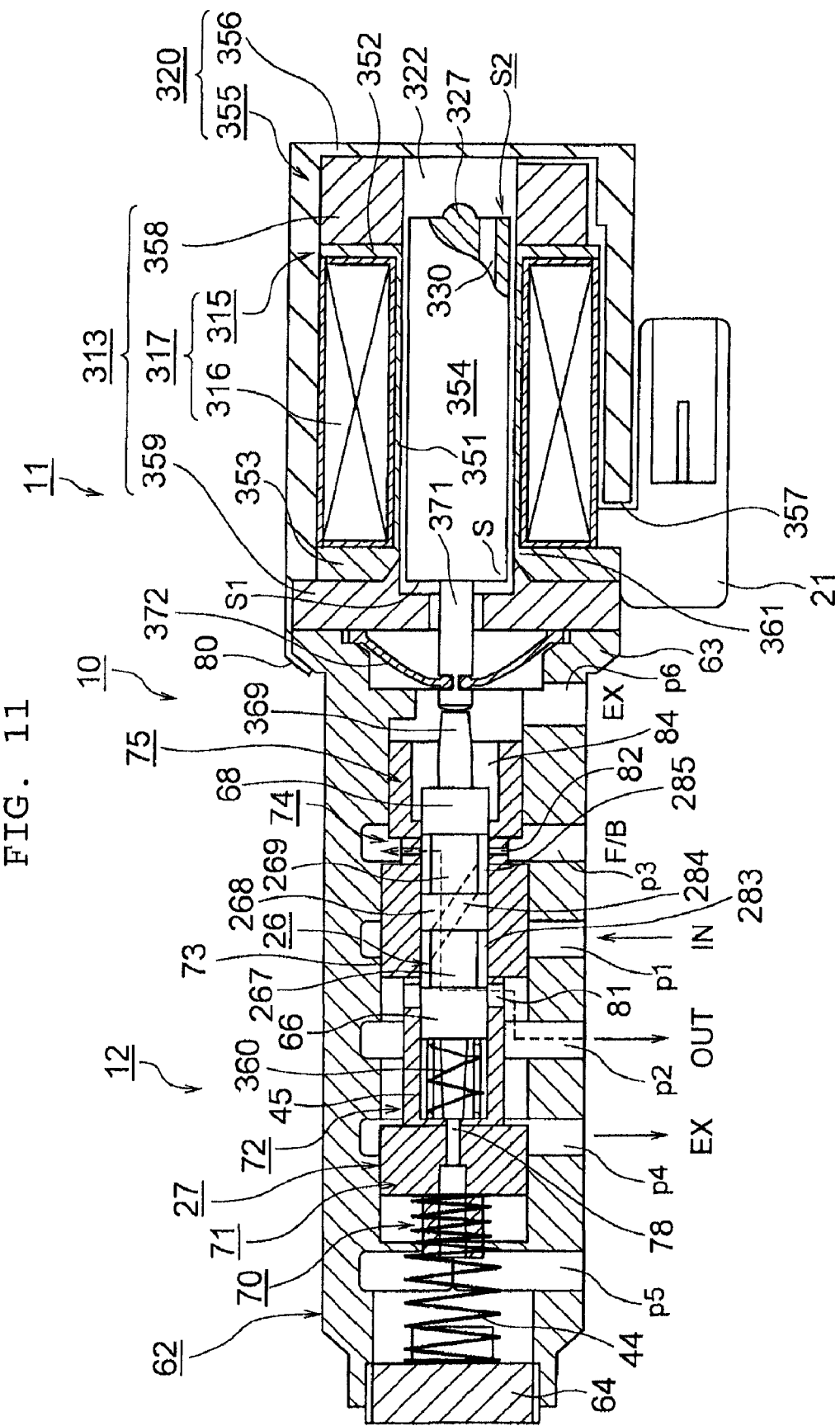
FIG. 11 is a diagram illustrating the working state of a linear solenoid valve according to the fifth embodiment of the present invention.

FIG. 10 is a diagram illustrating the initial state of a linear solenoid valve according to the fifth embodiment of the present invention, and FIG. 11 is a diagram illustrating the working state of the linear solenoid valve according to the fifth embodiment of the present invention.

In this case, the inner spool 26, serving as a second spool, and also as the feedback pressure switching means, includes the spring washer 360 to be inserted into the spring 45 serving as a second pressing member, which is formed on the front edge (left edge in the drawings), the middle-diameter land 66 formed adjacent to the rear side (rightward in the drawings) of the spring washer 360, the small-diameter groove 267 formed adjacent to the rear side of the land 66, the middle-diameter land 268 formed adjacent to the rear side of the groove 267, the middle-diameter groove 269 formed adjacent to the rear side of the land 268, the great-diameter land 68 formed adjacent to the rear side of the groove 269, and the small-diameter moving iron core contact portion 369 formed adjacent to the rear side of the land 68. The feedback oil channel 284 is formed diagonally passing through from the groove 267 to the groove 269. With the feedback oil channel 284, one end thereof is opened on the outer circumferential face of the groove 267, and the other end thereof is opened on the outer circumferential face of the groove 269.

Also, the outer spool 27 serving as a first spool includes the spring washer 70 to be inserted into the spring 44 serving as a first pressing member, the great-diameter land 71 formed adjacent to the rear side of the spring washer 70, the small-diameter groove 72 formed adjacent to the rear side of the land 71, the great-diameter land 73 formed adjacent to the rear side of the groove 72, the small-diameter groove 74 formed adjacent to the rear side of the land 73, and the middle-diameter land 75 formed adjacent to the rear side of the groove 74.

Next, description will be made regarding operation of the linear solenoid valve 10 having the above-described configuration.

First, with the initial state that a current is not supplied to the terminal 21 from the control device 95 (see FIG. 2), as shown in FIG. 10, in the regulating pressure valve unit 12 serving as a valve unit, the outer spool 27 is disposed on the hindmost position by the spring load f1 of the spring 44, and also the inner spool 26 is disposed on the hindmost position by the spring load f2 of the spring 45. At this time, the input port p1 and the output port p2 are opened, and the drain port p4 is closed by the land 71. Accordingly, the output pressure having the same value P1 (see FIG. 4) as the input pressure is output from the output port p2. Also, the first feedback opening 81 is closed by the land 66, the output port p2 is sealed from the feedback oil channel 283, the feedback oil channels 283 through 285 communicate with the drain oil channel 84, and the oil within the feedback oil channels 283 through 285 is sent to the drain oil channel 84 so as to be discharged (EX) from the drain port p6.

Next, upon a current being supplied to the coil 317 from the control device 95 via the terminal 21, the coil 317 sucks in the plunger 354 with predetermined suction, and thrust in proportion to the current is generated in the plunger 354. As a result, the thrust is transmitted to the inner spool 26, and the inner spool 26 is advanced (moved in the left direction in the drawings) against the spring load f2. As shown in FIG. 11, upon the spring washer 360 coming into contact with the bottom portion of the groove 72, the first and second feedback openings 81 and 82 are opened, the output port p2 communicates with the feedback oil channels 283 through 285, further, the feedback oil channels 283 through 285 communicate with the feedback port p3 serving as a feedback pressure acting portion, and the feedback oil channels 283 through 285 are sealed from the drain oil channel 84. In connection with this, the output pressure is supplied to the feedback port p3 via the first feedback opening 81, the feedback oil channels 283 through 285, and the second feedback opening 82, and the outer spool 27 is pressed forward (leftward in the drawings) by the feedback force. Note that a stopping portion for the inner spool 26 is made up of the spring washers 360 and the bottom of the groove 72.

Also, the spring washer 360 and moving iron core contact portion 369 are equal in the diameter and axial directional dimensions, the lands 66 and 68 are equal in the diameter and axial directional dimensions, further, the grooves 267 and 269 are equal in the diameter and axial directional dimensions, and the inner spool 26 has a symmetrical shape in the axial direction, thereby protecting the inner spool 26 from erroneous assembly.

Incidentally, the first through third embodiments have a mechanism wherein upon the spring washer 60 (see FIG. 1) coming into contact with the spring washer 76 by the inner spool 26 advancing, the regulating pressure valve unit 12 enters a locked state, and the first and second feedback openings 81 and 82 are opened. The fourth and fifth embodiments have a mechanism wherein upon the spring washer 360 coming into contact with the bottom portion of the groove 72 by the inner spool 26 advancing, the regulating pressure valve unit 12 enters a locked state, and the first and second feedback openings 81 and 82 are opened.

Sixth Embodiment

With the first through third embodiments, the drain opening 78 is sealed upon the spring washer 60 coming into contact with the spring washer 76 so as to have the inner spool 26 disposed at the foremost position, and the drain opening 78 is opened upon the spring washer 60 separating from the spring washer 76. On the other hand, with the fourth and fifth embodiments, the drain opening 78 is sealed upon the spring washer 360 coming into contact with the bottom portion of the groove 72 so as to have the inner spool 26 disposed at the foremost position, and the drain opening 78 is opened upon the spring washer 360 separating from the bottom portion of the groove 72. Consequently, operation of the inner spool 26 and the outer spool 27 enters an unstable state upon the drain opening 78 being opened or closed, resulting in deteriorating performance of the regulating pressure valve unit 12.

Accordingly, description will be made regarding a sixth exemplary embodiment of the present invention devised such that operation of the inner spool 26 and the outer spool 27 can be stabilized. Regarding the components having the same configurations as those of the first embodiment, the same reference numerals are applied thereto and description thereof omitted, and regarding the advantages owing to the same configurations as the first embodiment, the advantages of the first embodiment are applied to those of the present embodiment.

Figure 12:
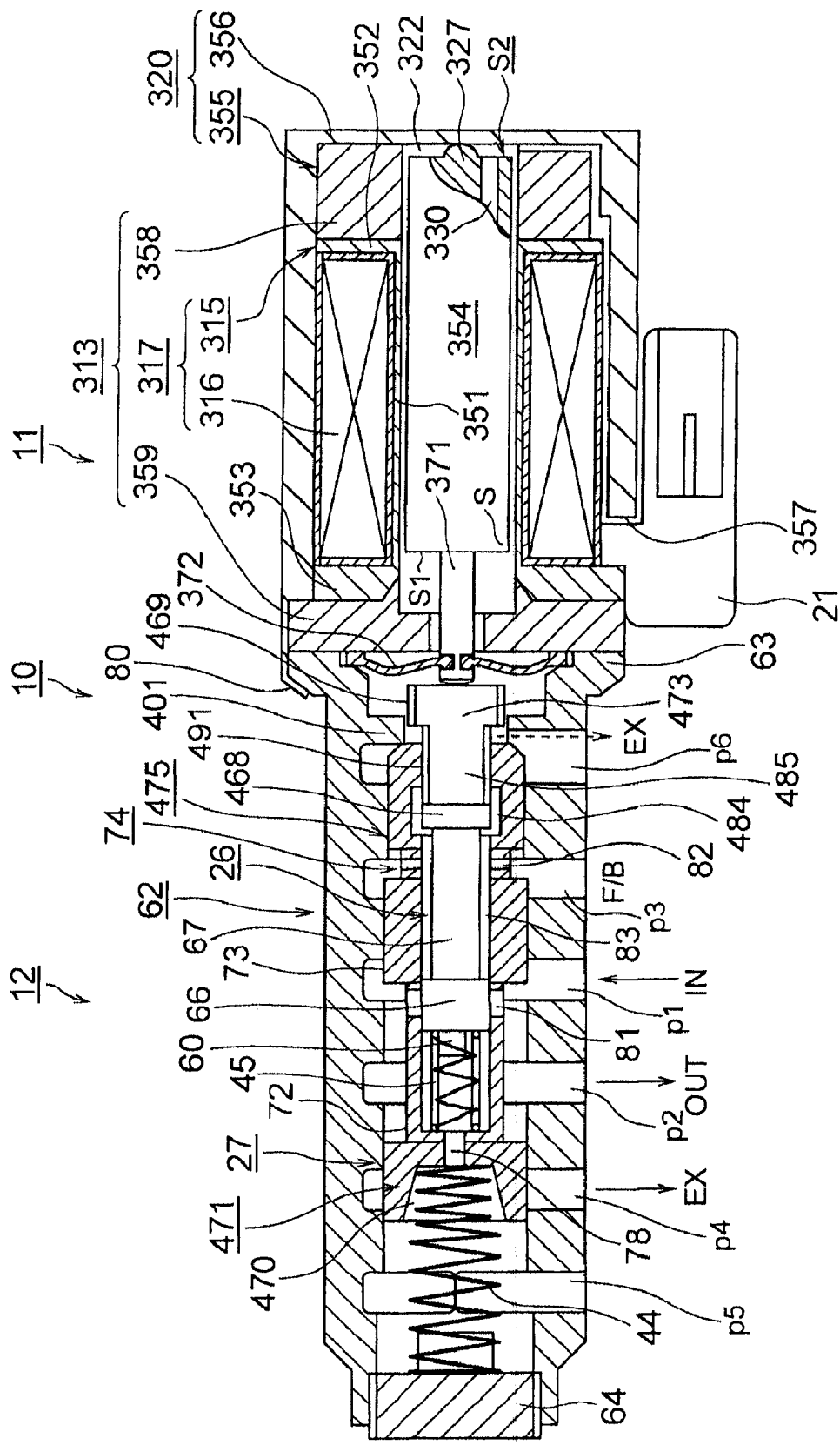
FIG. 12 is a diagram illustrating the initial state of a linear solenoid valve according to a sixth exemplary embodiment of the present invention.
Figure 13:
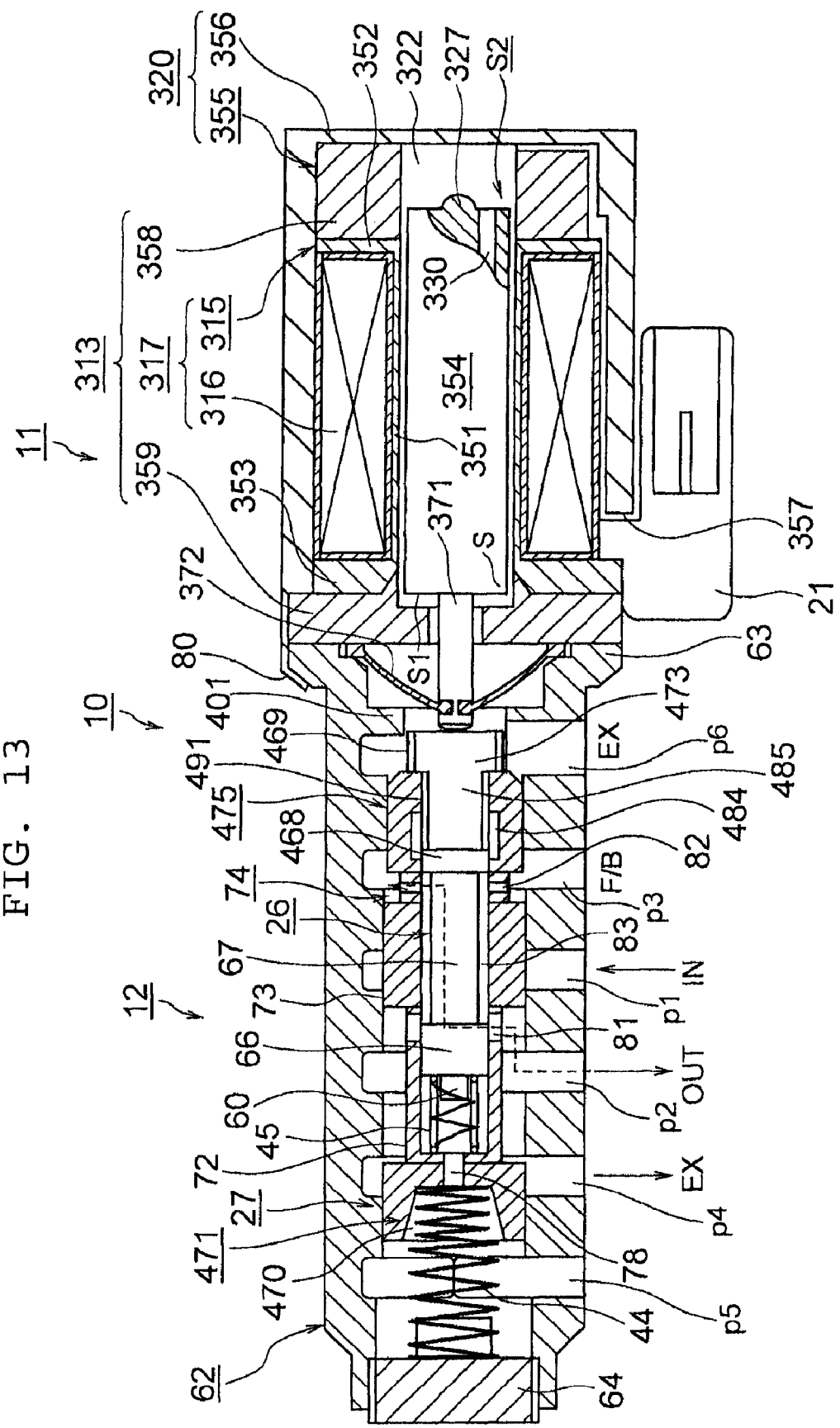
FIG. 13 is a diagram illustrating the working state of a linear solenoid valve according to the sixth embodiment of the present invention.
Figure 14A:
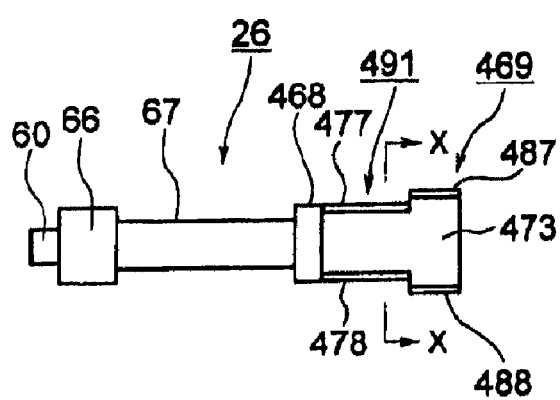
FIGS. 14A and 14B are diagrams illustrating an inner spool according to the sixth embodiment of the present invention.
Figure 14B:
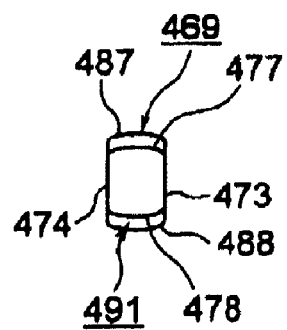

FIG. 12 is a diagram illustrating the initial state of a linear solenoid valve according to the sixth embodiment of the present invention, FIG. 13 is a diagram illustrating the working state of the linear solenoid valve according to the sixth embodiment of the present invention, and FIGS. 14A and 14B are diagrams illustrating an inner spool according to the sixth embodiment of the present invention. Note that FIG. 14A is a front view of the inner spool 26 serving as a second spool, and also as the feedback pressure switching means, and FIG. 14B is a cross-sectional view of the inner spool 26 along line X-X.

In this case, the inner spool 26 includes the spring washer 60 to be inserted into the spring 45 serving as a second pressing member, which is formed on the front edge (left edge in FIGS. 12 and 13), the great-diameter land 66 serving as a first supporting portion formed adjacent to the rear side (rightward in FIGS. 12 and 13) of the spring washer 60, the middle-diameter groove 67 formed adjacent to the rear side of the land 66, a great-diameter land 468 formed adjacent to the rear side of the groove 67, a great-diameter groove 491 serving as a second supporting portion formed adjacent to the rear side of the land 468, and a greatest-diameter moving iron core contact portion 469 serving as a first stopping portion for the inner spool 26 formed adjacent to the rear side of the groove 491. On the outer circumferential faces of the groove 491 and moving iron core contact portion 469, flat portions 473 and 474 are formed in parallel as a processed portion on at least one place in the circumferential direction, and two places in the present embodiment.

Also, the outer spool 27 serving as a first spool includes a great-diameter land 471 having a concave portion 470 receiving the spring 44 serving as a first pressing member, the small-diameter groove 72 formed adjacent to the rear side of the land 471, the great-diameter land 73 formed adjacent to the rear side of the groove 72, the small-diameter groove 74 formed adjacent to the rear side of the land 73, and a middle-diameter land 475 formed adjacent to the rear side of the groove 74.

The sleeve 62 includes a ring-shaped protrusion 401 serving as a second stopping portion for the outer spool 27, which is formed protruding inward in the radial direction near the rear edge (right edge in FIGS. 12 and 13). The inner diameter of the protrusion 401 is smaller than the outer diameter of the land 475. Accordingly, the outer spool 27 is stopped at a position where the rear edge of the land 475 comes into contact with the front edge of the protrusion 475, and is disposed at the hindmost position.

The groove 491 is slid as to the outer spool 27 upon the inner spool 26 advancing or retreating (moving in the horizontal direction in FIGS. 12 and 13). Because of this, the outer diameters of bow-shaped portions 477 and 478 other than the flat portions 473 and 474 in the groove 491 are somewhat smaller than the inner diameter of the inner circumferential face of the land 475.

The outer diameters of bow-shaped portions 487 and 488 other than the flat portions 473 and 474 in the moving iron core contact portion 469 are greater than the outer diameter of the land 475. Accordingly, the inner spool 26 is stopped as to the outer spool 27 at a position where the front edge of the moving iron core contact portion 469 comes into contact with the rear edge of the land 475, and is disposed at the foremost position.

The cylindrical feedback oil channel 83 is formed between the inner spool 26 and outer spool 27 along the outer circumferential face of the groove 67, and a drain oil channel 485 is formed along the flat portions 473 and 474 in the groove 491 and the moving iron core contact portion 469. Note that in the drain oil channel 485, the portion along the outer circumferential face of the groove 491 and the portion along the outer circumferential face of the moving iron core contact portion 469 are divided into two portions outward of the flat portions 473 and 474, which have a crescent shape made up of an arc-shaped portion and a bowstring portion.

Inwards on the land 475 in the radial direction, the inner diameter thereof is increased by a predetermined amount, and a cylindrical drain oil channel 484 is formed along the outer circumferential face of the land 468.

Next, description will be made regarding operation of the linear solenoid valve 10 having the above-described configuration.

First, with the initial state that a current is not supplied to the terminal 21 from the control device 95 (see FIG. 2), in the regulating pressure valve unit 12 serving as a valve unit, as shown in FIG. 12, the outer spool 27 is disposed on the hindmost position by the spring load f1 of the spring 44, and also the inner spool 26 is disposed on the hindmost position by the spring load f2 of the spring 45. At this time, the input port p1 and the output port p2 are opened, and the drain port p4 is closed by the land 471. Accordingly, the output pressure having the same value P1 (see FIG. 4) as the input pressure is output from the output port p2. Also, the first feedback opening 81 is closed by the land 66, the output port p2 is sealed from the feedback oil channel 83, the feedback oil channel 83 communicates with the drain oil channels 484 and 485, and the oil within the feedback oil channel 83 is sent to the drain oil channels 484 and 485 so as to be discharged (EX) from the drain port p6.

Next, upon a current being supplied to the coil 317 from the control device 95 via the terminal 21, the coil 317 sucks in the plunger 354 with predetermined suction, and thrust in proportion to the current is generated in the plunger 354. As a result, the thrust is directly transmitted to the inner spool 26, and the inner spool 26 is advanced (moved in the left direction in FIGS. 12 and 13) against the spring load f2. As shown in FIG. 13, upon the moving iron core contact portion 469 coming into contact with land 475, the first and second feedback openings 81 and 82 are opened, the output port p2 communicates with the feedback oil channel 83, further, the feedback oil channel 83 communicates with the feedback port p3 serving as a feedback pressure acting portion, and the feedback oil channel 83 is sealed from the drain oil channel 484. In connection with this, the output pressure is supplied to the feedback port p3 via the first feedback opening 81, the feedback oil channel 83, and the second feedback opening 82, and the outer spool 27 is pressed forward (leftward in FIGS. 12 and 13) by the feedback force.

Incidentally, in a state that the feedback oil channel 83 communicates with the drain oil channel 484, while the land 468 is completely separated from the inner circumferential face of the outer spool 27 so as not to be supported by the outer spool 27, the groove 491 is retained by the outer spool 27 in the bow-shaped portions 477 and 478. Accordingly, the inner spool 26 is supported in a sure manner by the outer spool 27 via the land 66 and the groove 491, thereby smoothly advancing or retreating the inner spool 26.

The inner spool 26 is disposed at the foremost position upon the moving iron core contact portion 469 coming into contact with the land 475, so a gap is formed between the spring washer 60 and the bottom portion of the groove 72 at the foremost position of the inner spool 26, and accordingly, the drain opening 78 can be opened on a full-time basis. Consequently, operation of the inner spool 26 and the outer spool 27 can be stabilized, thereby improving performance of the regulating pressure valve unit 12.

With the fourth and fifth embodiments, the moving iron core contact portion 369 (FIG. 11) has a tapered shape, so the outer diameter of the rear edge face of the moving iron core contact portion 369 is reduced, the contact area between the contact rod 371 and the moving iron core contact portion 369 is reduced by that reduction size. On the other hand, with the present embodiment, the outer diameter of the moving iron core contact portion 469 is greater than that of the groove 491, so the contact area between the contact rod 371 and the moving iron core contact portion 469 can be increased by that difference. Accordingly, the contact surface pressure between the contact rod 371 and the moving iron core contact portion 469 can be reduced, thereby improving durability of the regulating pressure valve unit 12.

Now, with the present embodiment, in the non-regulated region where the moving iron core contact portion 469 does not come into contact with the land 475, the outer spool 27 is disposed at the hindmost position, and a state that the land 475 comes into contact with the protrusion 401 is maintained, so amount-of-deflection of the spring 44 does not vary, and the spring load f1 of the spring 44 becomes constant. Accordingly, in the non-regulated region, when the inner spool 26 is advanced or retreated, the spring load f1 of the spring 44 does not affect the spring load f2 of the spring 45, so the spring load f2 when the spring 45 is contracted is equal to the spring load f2 when the spring 45 is extended, thereby preventing hysteresis from occurring over Line L-2, and accordingly, the properties of the linear solenoid valve 10 can be stabilized.

Incidentally, the end plate 64 serves as a spring load adjustment member for adjusting the spring load f1 of the spring 44. Accordingly, a male screw is formed on the outer circumferential face of the end plate 64, and a female screw is formed on the inner circumferential face of the front edge of the sleeve 62. Upon amount-of-screwing of the end plate 64 being changed by rotating the end plate 64 in the forward or backward direction, the spring load f1 of the spring 44 can be adjusted. With the present embodiment, the outer spool 27 is disposed at the hindmost position, the spring load f1 of the spring 44 can be adjusted in a state that the land 475 comes into contact with the protrusion 401, and accordingly, the spring 45 does not expand and contract along with expansion and contraction of the spring 44. Consequently, adjusted precision of the spring load f1 of the spring 44 can be improved.

In the event of switching the state of the linear solenoid valve 10 from the initial state to the working state, while the inner spool 26 has the spring 45 advanced while contracting the spring 45, the outer spool 27 is disposed at the hindmost position, so there is the need to contract the spring 44. Consequently, the period of time required for changing the state of the linear solenoid valve 10 from the initial state to the working state can be reduced, thereby improving response of the linear solenoid valve 10.

Seventh Embodiment

Now, while the feedback oil channel 83 is sealed from the drain oil channel 484 in a state that the linear solenoid valve 10 is disposed on a working position in the above embodiment, description will be made regarding a seventh exemplary embodiment of the present invention devised such that sealing properties can be improved at that time of sealing the feedback oil channel 83 from the drain oil channel 484. Regarding the components having the same configurations as those of the sixth embodiment, the same reference numerals are applied thereto and description thereof omitted, and regarding the advantages owing to the same configurations as the sixth embodiment, the advantages of the sixth embodiment are applied to those of the present embodiment.

Figure 15:
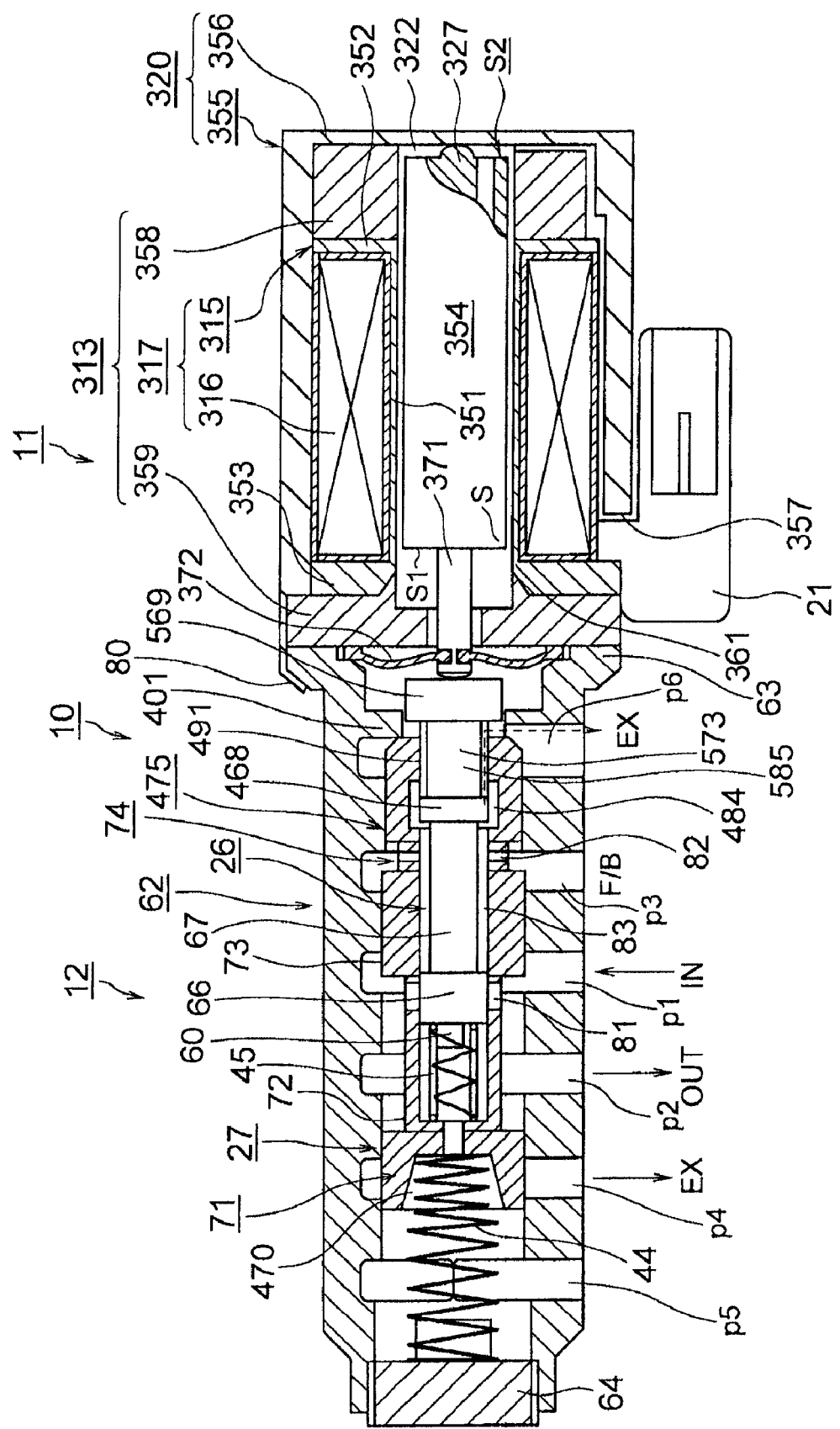
FIG. 15 is a diagram illustrating the initial state of a linear solenoid valve according to a seventh exemplary embodiment of the present invention.
Figure 16:
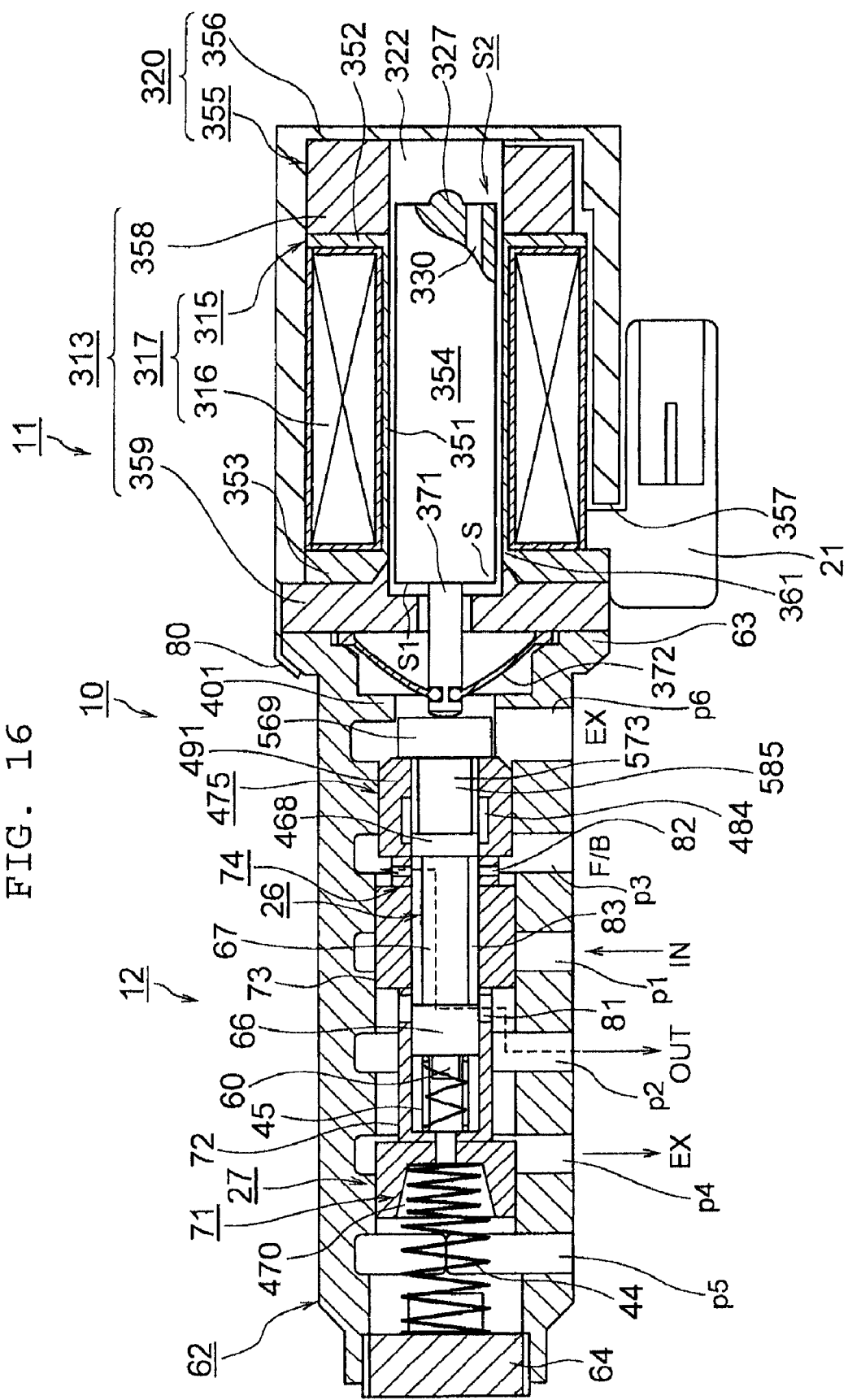
FIG. 16 is a diagram illustrating the working state of a linear solenoid valve according to the seventh embodiment of the present invention.

FIG. 15 is a diagram illustrating the initial state of a linear solenoid valve according to the seventh embodiment of the present invention, FIG. 16 is a diagram illustrating the working state of the linear solenoid valve according to the seventh embodiment of the present invention, and FIGS. 17A and 17B are diagrams illustrating an inner spool according to the seventh embodiment of the present invention. Note that FIG. 17A is a front view of the inner spool 26 serving as a second spool, and also as the feedback pressure switching means, and FIG. 17B is a cross-sectional view taken along Line Y-Y of the inner spool 26.

In this case, the inner spool 26 includes the spring washer 60 to be inserted into the spring 45 serving as a second pressing member, which is formed on the front edge (left edge in FIGS. 15 and 16), the great-diameter land 66 serving as a first supporting portion formed adjacent to the rear side (rightward in FIGS. 15 and 16) of the spring washer 60, the middle-diameter groove 67 formed adjacent to the rear side of the land 66, the great-diameter land 468 formed adjacent to the rear side of the groove 67, the great-diameter groove 491 serving as a second supporting portion formed adjacent to the rear side of the land 468, and a greatest-diameter moving iron core contact portion 569 serving as a first stopping portion for the inner spool 26 formed adjacent to the rear side of the groove 491. Regarding the groove 491, flat portions 573 and 574 are formed in parallel as a processed portion on at least one place in the circumferential direction, and two places in the present embodiment.

The sleeve 62 includes the ring-shaped protrusion 401 serving as a second stopping portion for the outer spool 27 serving as a first spool, which is formed protruding inward in the radial direction near the rear edge (right edge in FIGS. 15 and 16). The inner diameter of the protrusion 401 is smaller than the outer diameter of the land 475. Accordingly, the outer spool 27 is stopped at a position where the rear edge of the land 475 comes into contact with the front edge of the protrusion 401, and is disposed at the hindmost position.

The groove 491 is slid as to the outer spool 27 along with the inner spool 26 advancing or retreating (moving in the horizontal direction in FIGS. 15 and 16). Because of this, the outer diameters of the bow-shaped portions 477 and 478 other than the flat portions 573 and 574 in the groove 491 are somewhat smaller than the inner diameter of the inner circumferential face of the land 475.

The outer diameter of the moving iron core contact portion 569 is greater than the inner diameter of the inner circumferential face of the land 475. Accordingly, the inner spool 26 is stopped as to the outer spool 27 at a position where the front edge of the moving iron core contact portion 569 comes into contact with the rear edge of the land 475, and is disposed at the foremost position.

The cylindrical feedback oil channel 83 is formed between the inner spool 26 and outer spool 27 along the outer circumferential face of the groove 67, and a drain oil channel 585 is formed along the flat portions 573 and 574 in the groove 491 and the moving iron core contact portion 569. Note that in the drain oil channel 585, the portion along the outer circumferential face of the groove 491 and the portion along the outer circumferential face of the moving iron core contact portion 569 are divided into two portions outward of the flat portions 573 and 574, which have a crescent shape made up of an arc-shaped portion and a bowstring portion.

Inwards on the land 475 in the radial direction, the inner diameter thereof is increased by a predetermined amount, and the cylindrical drain oil channel 484 is formed along the outer circumferential face of the land 468.

Next, description will be made regarding operation of the linear solenoid valve 10 having the above-described configuration.

Upon a current being supplied to the coil 317 from the control device 95 (see FIG. 2) via the terminal 21, the coil 317 sucks in the plunger 354 with predetermined suction, and thrust in proportion to the current is generated in the plunger 354. As a result, the thrust is directly transmitted to the inner spool 26, and the inner spool 26 is advanced (moved in the left direction in FIGS. 15 and 16) against the spring load f2. As shown in FIG. 16, upon the moving iron core contact portion 569 coming into contact with land 475, the first and second feedback openings 81 and 82 are opened, the output port p2 communicates with the feedback oil channel 83, further, the feedback oil channel 83 communicates with the feedback port p3 serving as a feedback pressure acting portion, and the feedback oil channel 83 is sealed from the drain oil channel 484. In connection with this, the output pressure is supplied to the feedback port p3 via the first feedback opening 81, the feedback oil channel 83, and the second feedback opening 82, and the outer spool 27 is pressed forward (leftward in FIGS. 15 and 16) by the feedback force.

In this case, the moving iron core contact portion 569 comes into contact with the land 475 at the time of sealing the feedback oil channel 83 from the drain oil channel 484, so the drain oil channel 585 is sealed from the drain port p6. Note that a seal portion is made up of the moving iron core contact portion 569 and the land 475.

Accordingly, sealing properties can be improved at that time of sealing the feedback oil channel 83 from the drain oil channel 484, thereby stabilizing feedback pressure.

Eighth Embodiment

Next, description will be made regarding an eighth exemplary embodiment of the present invention devised. Regarding the components having the same configurations as those of the seventh embodiment, the same reference numerals are applied thereto and description thereof omitted, and regarding the advantages owing to the same configurations as the seventh embodiment, the advantages of the seventh embodiment are applied to those of the present embodiment.

Figure 18:
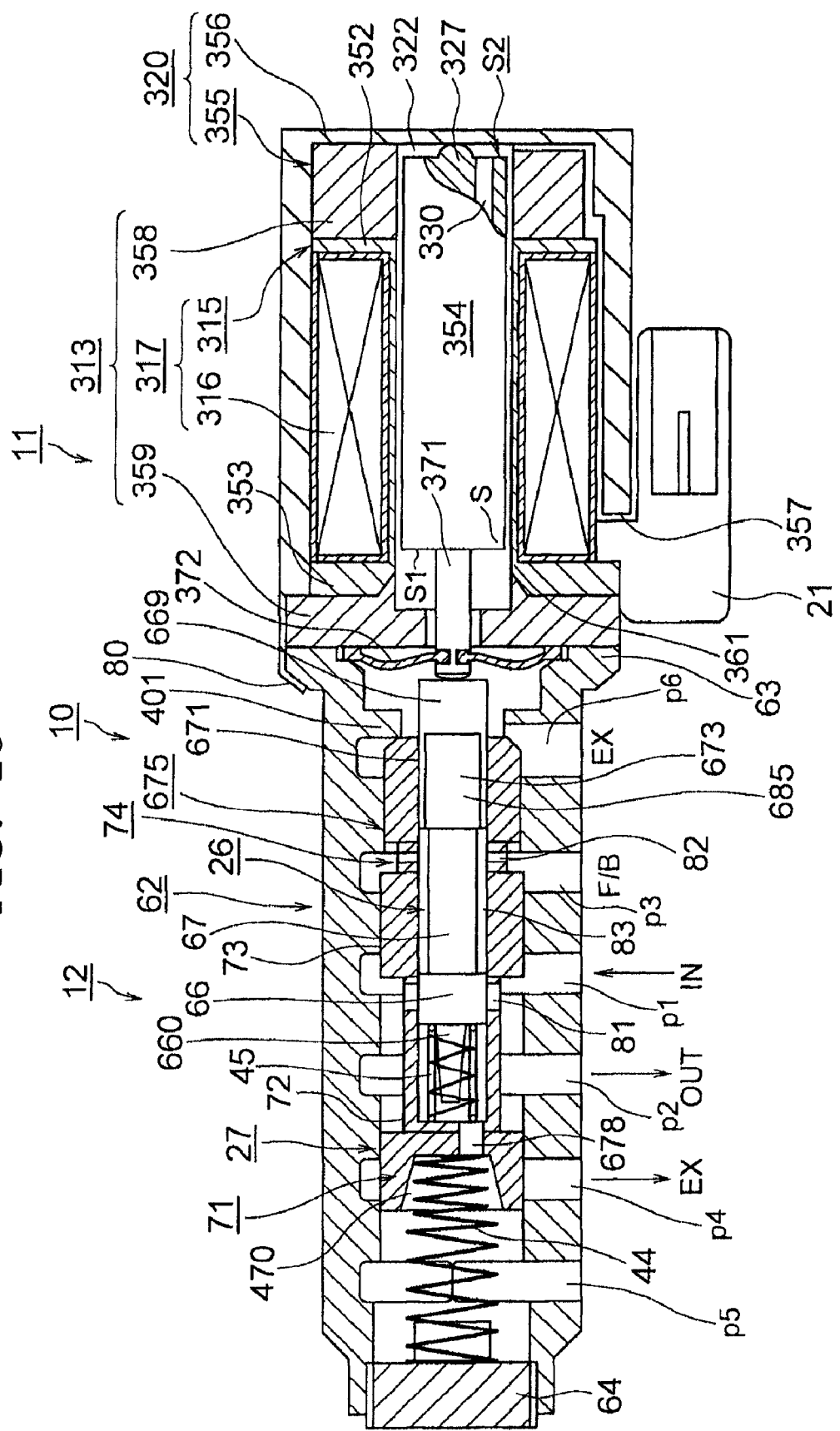
FIG. 18 is a diagram illustrating the initial state of a linear solenoid valve according to an eighth exemplary embodiment of the present invention.
Figure 19:
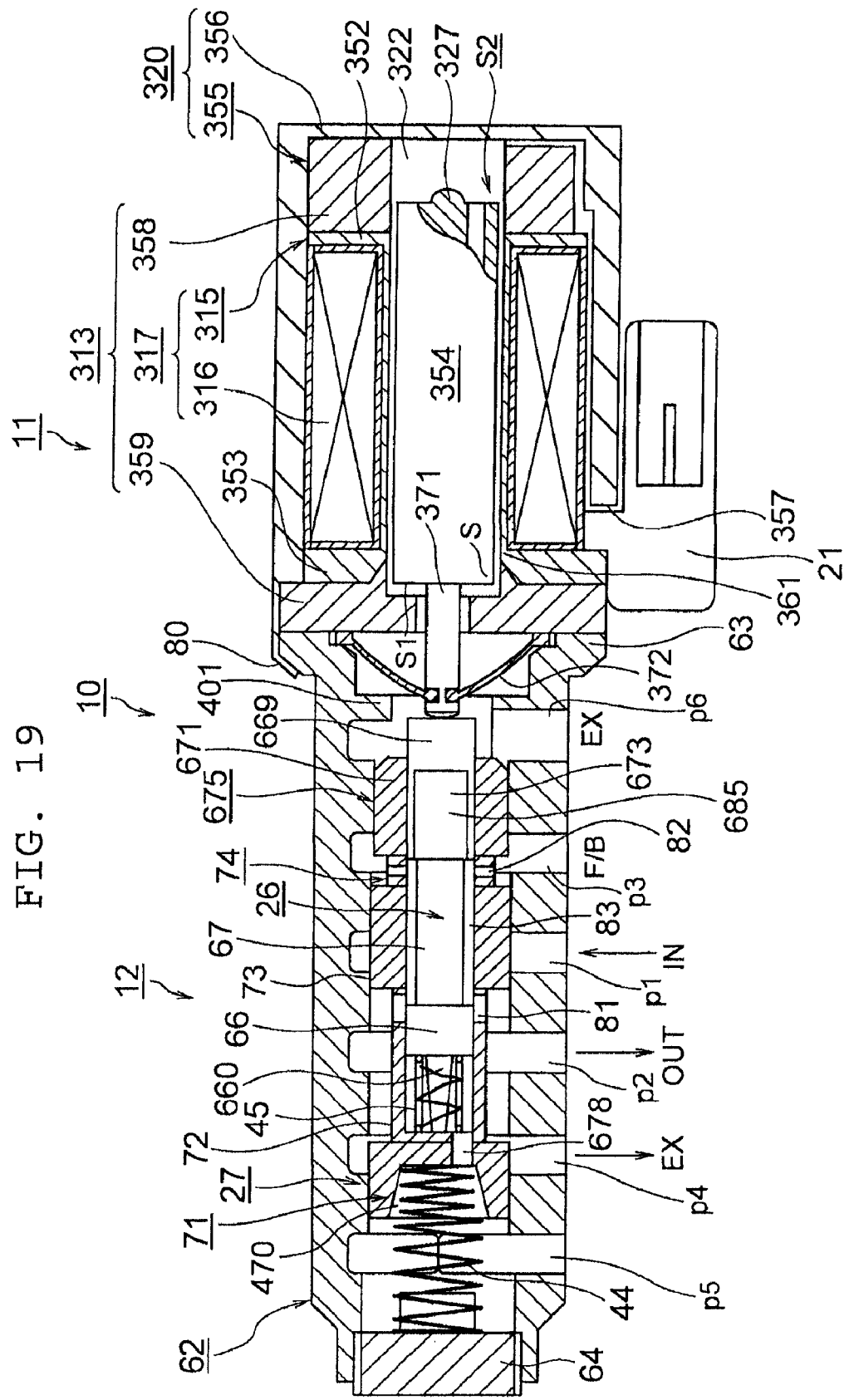
FIG. 19 is a diagram illustrating the working state of a linear solenoid valve according to the eighth embodiment of the present invention.
Figure 20A:
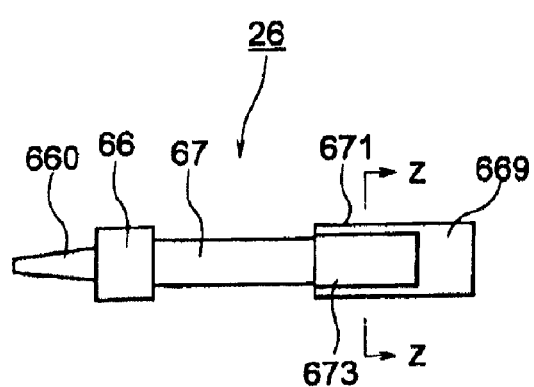
FIGS. 20A and 20B are diagrams illustrating an inner spool according to the eighth embodiment of the present invention.
Figure 20B:
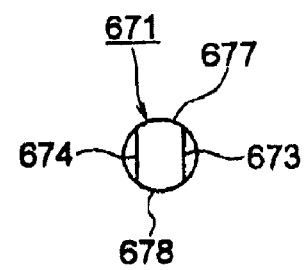

FIG. 18 is a diagram illustrating the initial state of a linear solenoid valve according to the eighth embodiment of the present invention, FIG. 19 is a diagram illustrating the working state of the linear solenoid valve according to the eighth embodiment of the present invention, and FIGS. 20A and 20B are diagrams illustrating the inner spool according to the eighth embodiment of the present invention. Note that FIG. 20A is a front view of the inner spool 26 serving as a second spool, and also as the feedback pressure switching means, and FIG. 20B is a cross-sectional view taken along Line Z-Z of the inner spool 26.

In this case, the inner spool 26 includes a spring washer 660 to be inserted into the spring 45 serving as a second pressing member, which is formed at the center of the front edge (left edge in FIGS. 18 and 19), the great-diameter land 66 serving as a first supporting portion formed adjacent to the rear side (rightward in FIGS. 18 and 19) of the spring washer 660, the middle-diameter groove 67 formed adjacent to the rear side of the land 66, a great-diameter groove 671 serving as a second supporting portion formed adjacent to the rear side of the groove 67, and a greatest-diameter moving iron core contact portion 669 serving as a seal portion formed adjacent to the rear side of the groove 671. On the outer circumferential face of the groove 671, flat portions 673 and 674 are formed in parallel as a processed portion on at least one place in the circumferential direction; two places in the present embodiment.

The groove 671 is slid as to the outer spool 27 serving as the first spool along with the inner spool 26 advancing or retreating (moving in the horizontal direction in FIGS. 18 and 19). Because of this, the outer diameters of bow-shaped portions 677 and 678 other than the flat portions 673 and 674 in the groove 671 are somewhat smaller than the inner diameter of the inner circumferential face of a land 675.

The cylindrical feedback oil channel 83 is formed between the inner spool 26 and outer spool 27 along the outer circumferential face of the groove 67, and a drain oil channel 685 is formed along the flat portions 673 and 674 in the groove 671. Note that in the drain oil channel 685, the portion along the outer circumferential face of the groove 671 is divided into two portions outward of the flat portions 673 and 674, which have a crescent shape made up of an arc-shaped portion and a bowstring portion.

The outer diameter of the moving iron core contact portion 669 is somewhat smaller than the inner diameter of the inner circumferential face of the land 675, and the seal portion is made up of the moving iron core contact portion 669 and the land 675. Accordingly, when the linear solenoid valve 10 is disposed at a working position, the drain oil channel 685 is sealed from the drain port p6.

Thus, the outer diameter of the groove 671 at other than the flat portions 673 and 674 can be equal to the outer diameter of the moving iron core contact portion 669, thereby improving workability of the inner spool 26. Accordingly, the linear solenoid valve 10 is reduced in costs.

Now, the more forward (leftward in FIGS. 18 and 19) the region of the spring washer 660 is, the less the outer diameter thereof is, and the spring washer 660 has a tapered shape. A drain opening 678 which subjects the axial center to decentering, passing through in the axial direction is formed near the outer circumferential edges of the land 71 and groove 72. The drain opening 678 communicates a chamber formed forward of the inner spool 26 in the outer spool 27 with the outside of the sleeve 62.

In this case, while the spring washer 660 is formed in the axial center of the inner spool 26, the drain opening 678 is formed so as to subject the axial center to decentering, so even if the spring washer 660 comes into contact with the bottom portion of the groove 72, and the inner spool 26 is disposed at the foremost position, the drain opening 678 is never sealed. Accordingly, operation of the inner spool 26 and the outer spool 27 can be stabilized, thereby improving performance of the regulating pressure valve unit 12 serving as a valve unit. Note that a stopping portion for the inner spool 26 is made up of the spring washer 660 and the bottom portion of the groove 72.

Ninth Embodiment

Next, description will be made regarding a ninth exemplary embodiment of the present invention devised. Regarding the components having the same configurations as those of the sixth embodiment, the same reference numerals are applied thereto and description thereof omitted, and regarding the advantages owing to the same configurations as the sixth embodiment, the advantages of the sixth embodiment are applied to those of the present embodiment.

Figure 21:
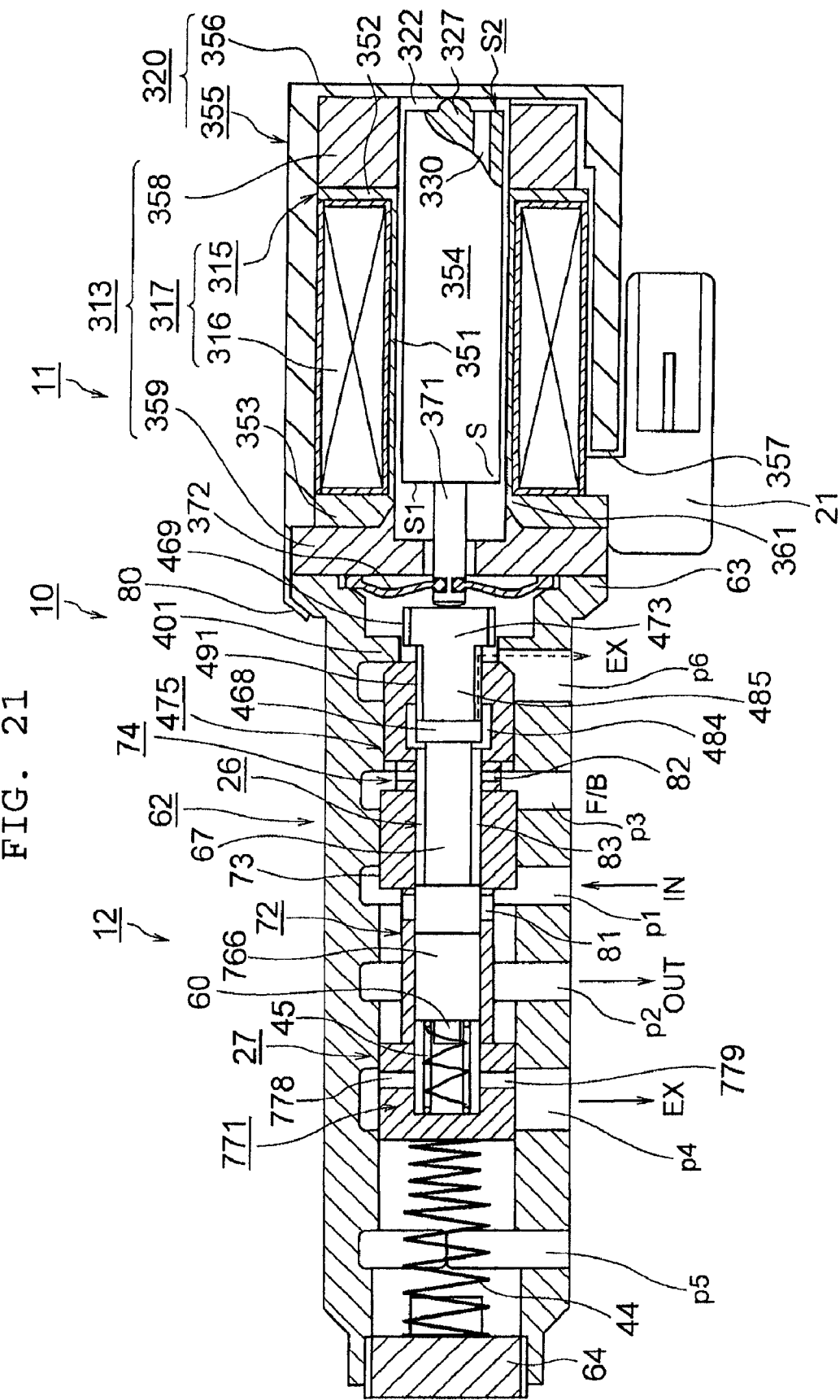
FIG. 21 is a diagram illustrating the initial state of a linear solenoid valve according to a ninth exemplary embodiment of the present invention.
Figure 22:
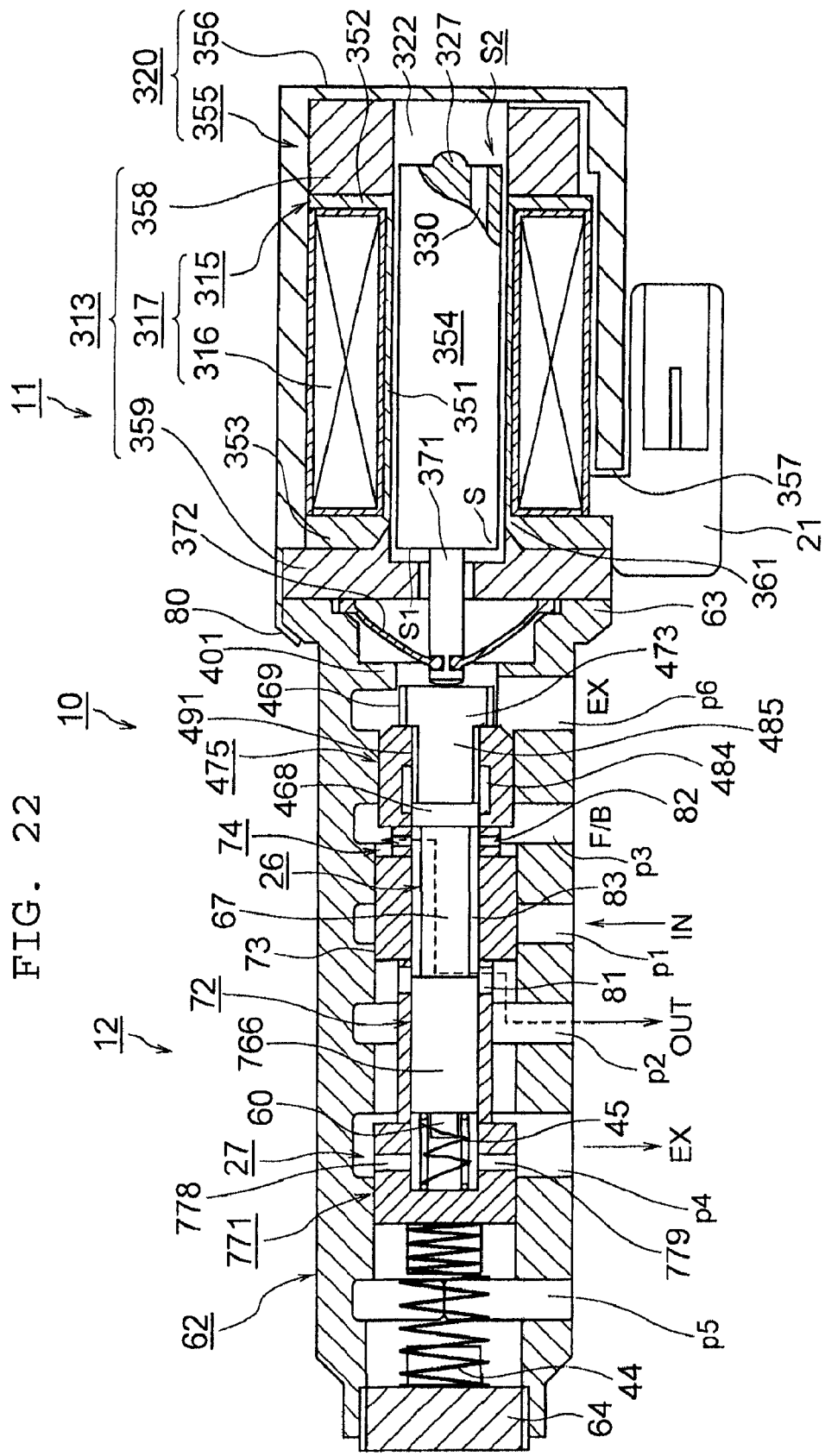
FIG. 22 is a diagram illustrating the working state of a linear solenoid valve according to the ninth embodiment of the present invention.

FIG. 21 is a diagram illustrating the initial state of a linear solenoid valve according to the ninth embodiment of the present invention, FIG. 22 is a diagram illustrating the working state of the linear solenoid valve according to the ninth embodiment of the present invention.

In this case, the inner spool 26 serving as a second spool, and also as the feedback pressure switching means includes the spring washer 60 to be inserted into the spring 45 serving as a second pressing member, which is formed on the front edge (left edge in the drawings), a great-diameter land 766 serving as a first supporting portion formed adjacent to the rear side (rightward in the drawings) of the spring washer 60, the middle-diameter groove 67 formed adjacent to the rear side of the land 766, the great-diameter land 468 formed adjacent to the rear side of the groove 67, the great-diameter groove 491 serving as a second supporting portion formed adjacent to the rear side of the land 468, and the greatest-diameter moving iron core contact portion 469 serving as a first stopping portion for the inner spool 26 formed adjacent to the rear side of the groove 491. On the outer circumferential faces of the groove 491 and moving iron core contact portion 469, the flat portions 473 and 474 (FIGS. 14A and 14B) are formed in parallel as a processed portion on at least one place in the circumferential direction, and two places in the present embodiment.

The outer spool 27 serving as a first spool includes a great-diameter land 771 formed so as to come contact with the spring 44 serving as a first pressing member, the small-diameter groove 72 formed adjacent to the rear side of the land 771, the great-diameter land 73 formed adjacent to the rear side of the groove 72, the small-diameter groove 74 formed adjacent to the rear side of the land 73, and the middle-diameter land 475 formed adjacent to the rear side of the groove 74.

Multiple drain openings, first and second drain openings 778 and 779 in the present embodiment, are formed passing through generally at the center of the side wall of the land 771 in the axial direction. The first and second drain openings 778 and 779 communicate a chamber formed forward of the inner spool 26 within the outer spool 27 with the outside of the sleeve 62 via the drain port p4. Note that the drain openings 778 and 779 are formed at positions symmetric with respect to a point centered in the axial center, thereby preventing the inner spool 26 from receiving the force in the radial direction when oil is discharged.

In this case, the first and second drain openings 778 and 779 are formed in the radial direction, so the first and second drain openings 778 and 779 are not sealed regardless of the inner spool 26 advancing or retreating (moving in the horizontal direction in the drawings). Accordingly, operation of the inner spool 26 and the outer spool 27 can be stabilized, thereby improving performance of the regulating pressure valve unit 12 serving as a valve unit.

Tenth Embodiment

Next, description will be made regarding a tenth exemplary embodiment of the present invention. Regarding the components having the same configurations as those of the sixth embodiment, the same reference numerals are applied thereto and description thereof omitted, and regarding the advantages owing to the same configurations as the sixth embodiment, the advantages of the sixth embodiment are applied to those of the present embodiment.

Figure 23:
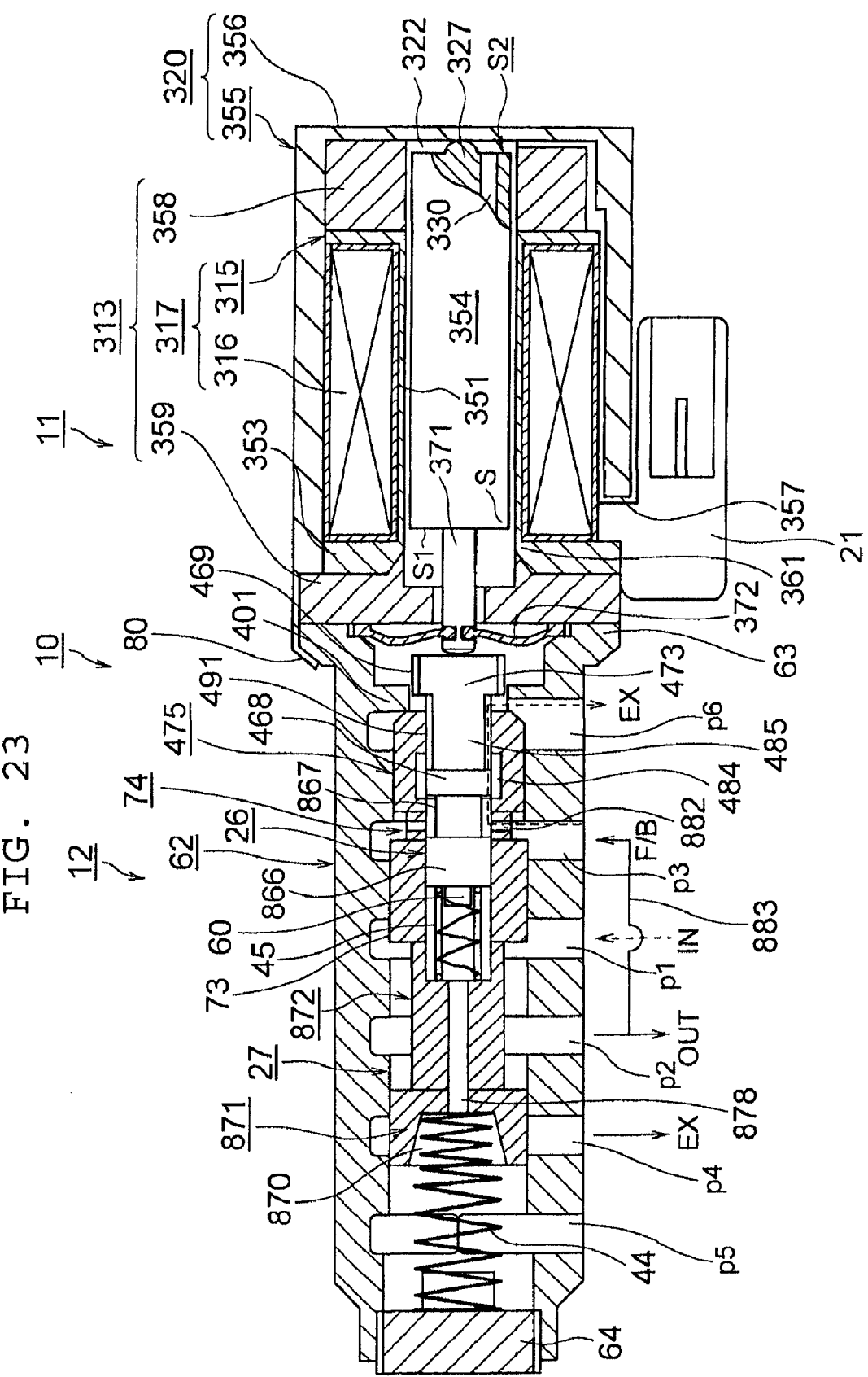
FIG. 23 is a diagram illustrating the initial state of a linear solenoid valve according to a tenth exemplary embodiment of the present invention.
Figure 24:
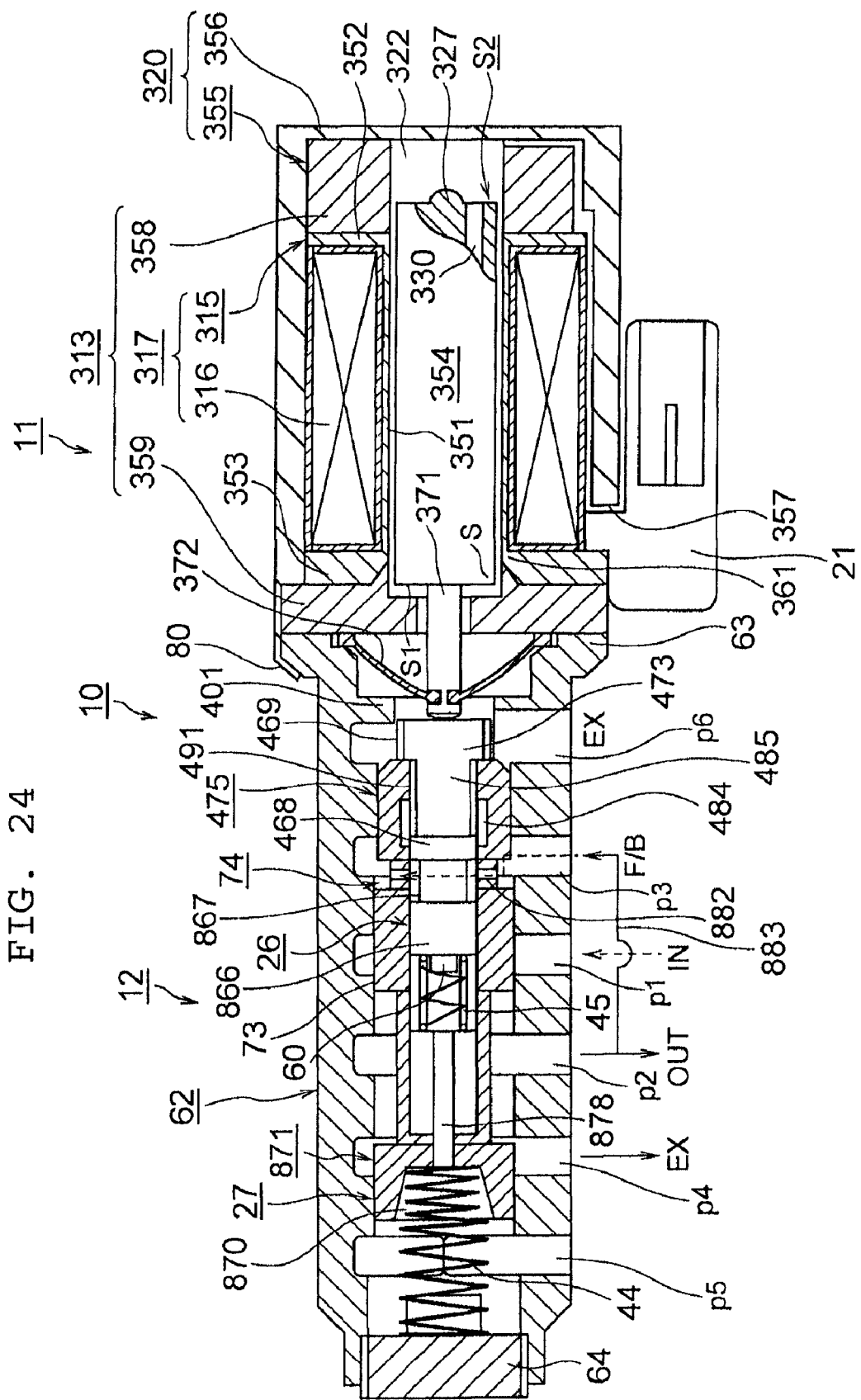
FIG. 24 is a diagram illustrating the working state of a linear solenoid valve according to the tenth embodiment of the present invention.

FIG. 23 is a diagram illustrating the initial state of a linear solenoid valve according to the tenth embodiment of the present invention, FIG. 24 is a diagram illustrating the working state of the linear solenoid valve according to the tenth embodiment of the present invention.

In this case, the inner spool 26 serving as a second spool, and also as the feedback pressure switching means includes the spring washer 60 to be inserted into the spring 45 serving as a second pressing member, which is formed on the front edge (left edge in the drawings), a great-diameter land 866 serving as a first supporting portion formed adjacent to the rear side (rightward in the drawings) of the spring washer 60, a middle-diameter groove 867 formed adjacent to the rear side of the land 867, the great-diameter land 468 formed adjacent to the rear side of the groove 867, the great-diameter groove 491 serving as a second supporting portion formed adjacent to the rear side of the land 468, and the greatest-diameter moving iron core contact portion 469 serving as a first stopping portion for the inner spool 26 formed adjacent to the rear side of the groove 491. On the outer circumferential faces of the groove 491 and moving iron core contact portion 469, the flat portions 473 and 474 (FIGS. 14A and 14B) are formed in parallel as a processed portion on at least one place in the circumferential direction, and two places in the present embodiment.

The outer spool 27 serving as a first spool includes a great-diameter land 871 having a concave portion 870 for receiving the spring 44, which is formed on the front edge, serving as a first pressing member, a small-diameter groove 872 formed adjacent to the rear side of the land 871, the great-diameter land 73 formed adjacent to the rear side of the groove 872, the small-diameter groove 74 formed adjacent to the rear side of the land 73, and the middle-diameter land 475 formed adjacent to the rear side of the groove 74.

A drain opening 878 passing through in the axial direction is formed in the axial centers of the land 871 and groove 872, and the drain opening 878 communicates a chamber formed forward of the inner spool 26 within the outer spool 27 with the outside of the sleeve 62.

Moreover, a feedback oil channel 883 is formed between the outer circumferential face of the sleeve 62 and an unshown valve body from the output port p2 to the feedback port p3 serving as a feedback pressure acting portion, and also a feedback opening 882 passing through in the radial direction is formed at a predetermined portion of the groove 74.

The drain oil channel 485 is formed between the inner spool 26 and outer spool 27 along the flat portions 473 and 474 of the groove 491 and the moving iron core contact portion 469. Note that in the drain oil channel 485, the portion along the outer circumferential faces of the groove 491 and the moving iron core contact portion 469 is divided into two portions outward of the flat portions 473 and 474, which have a crescent shape made up of an arc-shaped portion and a bowstring portion.

Inwards on the land 475 in the radial direction, the inner diameter thereof is increased by a predetermined amount, and the cylindrical drain oil channel 484 is formed along the outer circumferential face of the land 468.

The feedback port p3 communicates with the output port p2 via the feedback oil channel 883. The output pressure is supplied to the feedback port p3 as feedback pressure. The feedback port p3 generates pressing force corresponding to the area difference of the lands 73 and 475, and presses the outer spool 27 forward (leftward in the drawings) with the pressing force.

Next, description will be made regarding operation of the linear solenoid valve 10 having the above-described configuration.

First, in the initial state that a current is not supplied to the terminal 21 from the control device 95 (see FIG. 2), as shown in FIG. 23, the plunger 354 is disposed at the hindmost position in the linear solenoid portion 11 serving as a solenoid portion, and the rear edge face (right edge face in the drawings) of the plunger 354 comes into contact with the bottom portion 356. On the other hand, in the regulating pressure valve unit 12 serving as a valve unit, the outer spool 27 is disposed on the hindmost position by the spring load f1 of the spring 44, and also the inner spool 26 is disposed on the hindmost position by the spring load f2 of the spring 45. At this time, the input port p1 and the output port p2 are opened, and the drain port p4 is closed by the land 871. Accordingly, the output pressure having the same value P1 (see FIG. 4) as the input pressure is output from the output port p2.

While the oil discharged from the output port p2 is sent to the feedback port p3 via the feedback oil channel 883, the feedback port p3 communicates with the drain port p6 via the feedback opening 882, the drain oil channels 484 and 485, and accordingly, the oil of the feedback port p3 is discharged (EX) from the drain port p6.

Next, upon a current being supplied to the coil 317 from the control device 95 via the terminal 21, the coil 317 sucks in the plunger 354 with predetermined suction, and thrust in proportion to the current is generated in the plunger 354. As a result, the thrust is directly transmitted to the inner spool 26, and the inner spool 26 is advanced (moved in the left direction in the drawings) against the spring load f2. As shown in FIG. 24, upon the moving iron core contact portion 469 coming into contact with the land 475, the feedback port p3 is sealed from the drain oil channel 484 by the land 468. In connection with this, the output pressure is supplied to the feedback port p3 via the feedback oil channel 883, and the outer spool 27 is pressed forward by the feedback force.

With the present embodiment, the feedback channel 883 is formed between the outer circumferential face of the sleeve 62 and an unshown valve body, so there is no need to form a feedback oil channel within the inner spool 26, and all that is necessary is to form the one feedback opening 882 in the outer spool 27, thereby not only reducing the processed amount of the inner spool 26 and the outer spool 27, but also reducing the inner spool 26 in the axial directional dimensions.

Eleventh Embodiment

Now, while description has been made with regard to an arrangement wherein the output pressure is changed in the non-regulated pressure region and in the regulated pressure region with the two spools of the inner spool 26 and the outer spool 27 in the above-described embodiments, description will now be made regarding an eleventh exemplary embodiment of the present invention devised such that the output pressure is changed in the non-regulated pressure region and in the regulated pressure region with one spool. Regarding the components having the same configurations as those of the fourth embodiment, the same reference numerals are applied thereto and description thereof omitted, and regarding the advantages owing to the same configurations as the fourth embodiment, the advantages of the fourth embodiment are applied to those of the present embodiment.

Figure 25:
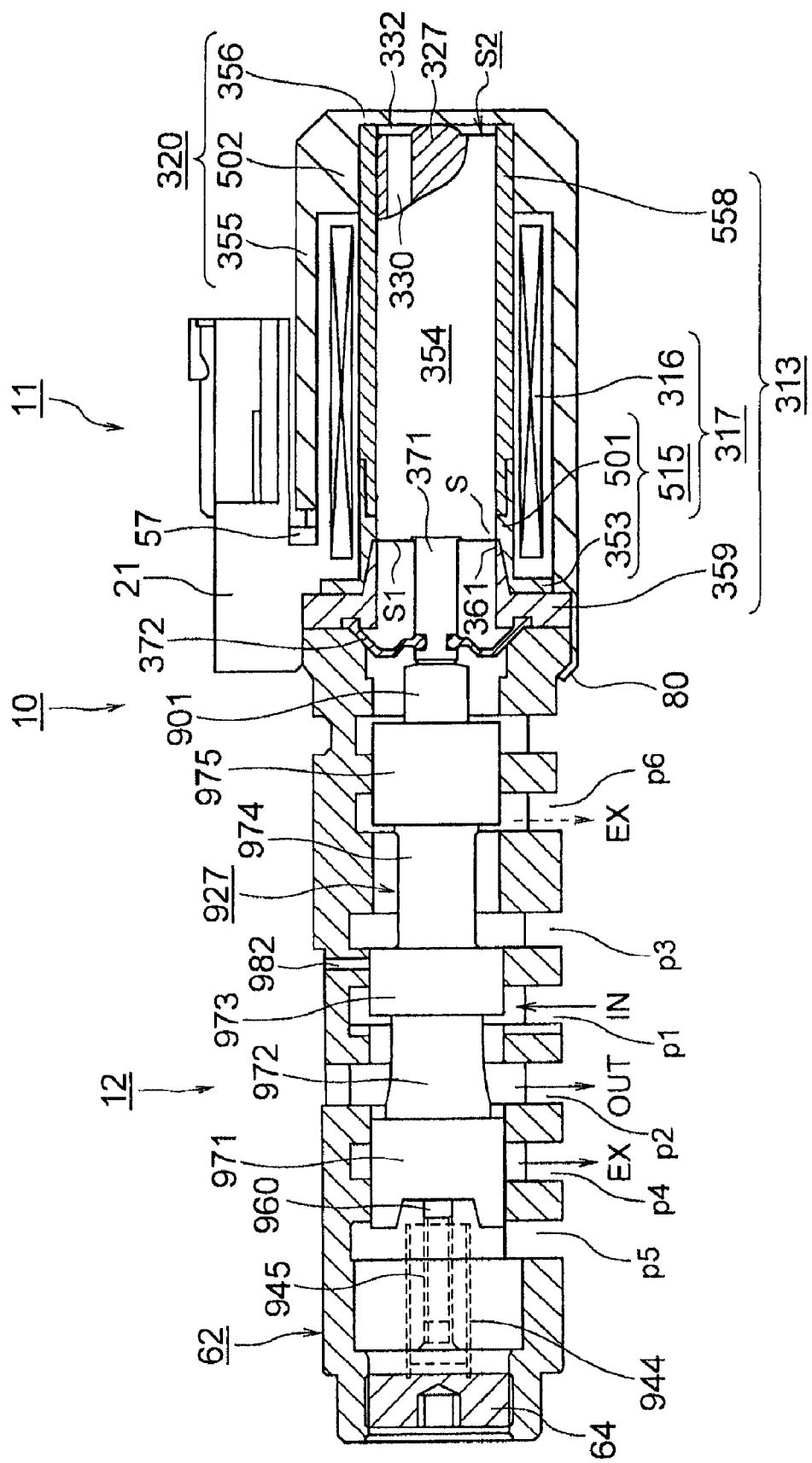
FIG. 25 is a diagram illustrating the initial state of a linear solenoid valve according to an eleventh exemplary embodiment of the present invention.
Figure 26:
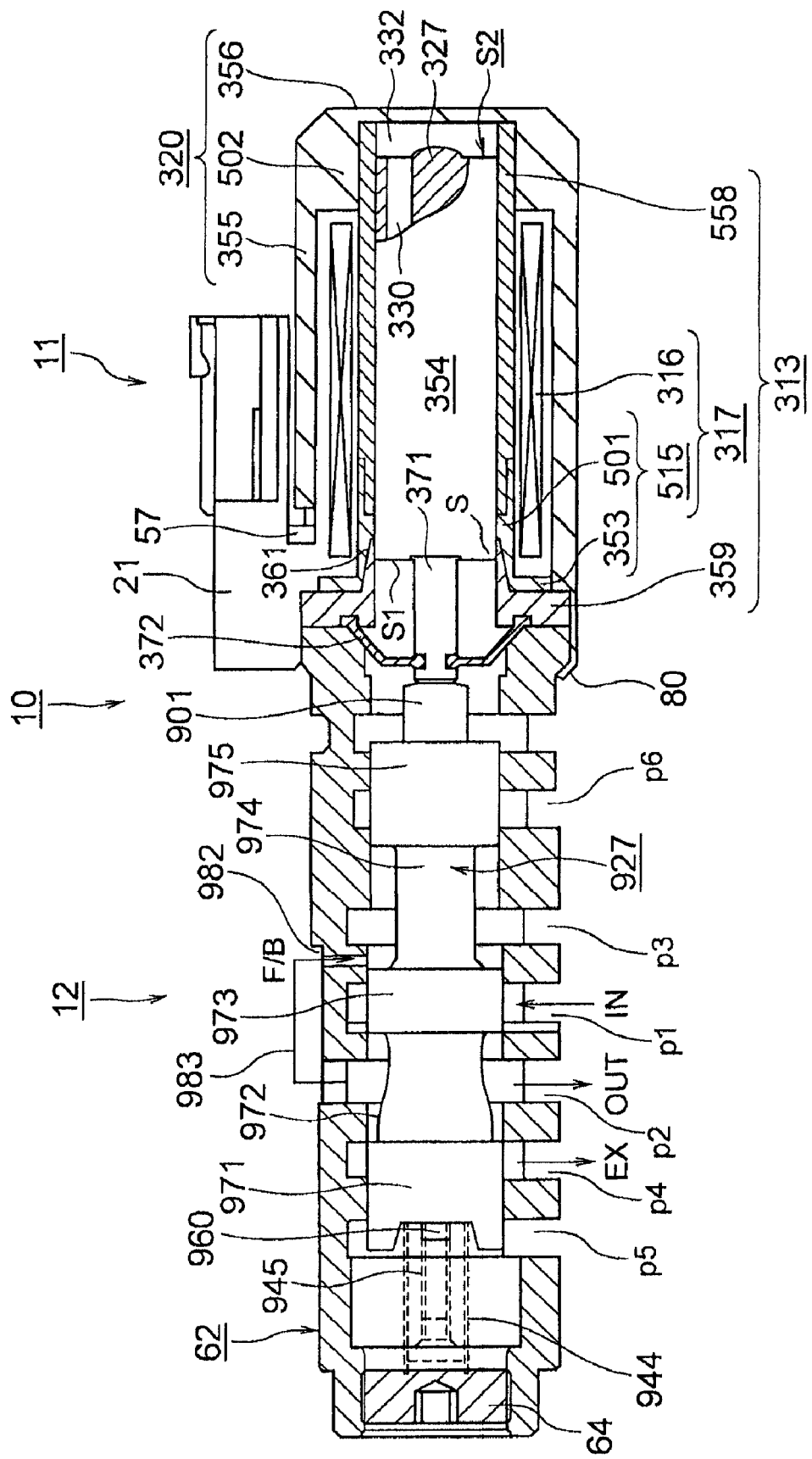
FIG. 26 is a diagram illustrating the working state of a linear solenoid valve according to the eleventh embodiment of the present invention.
Figure 29:
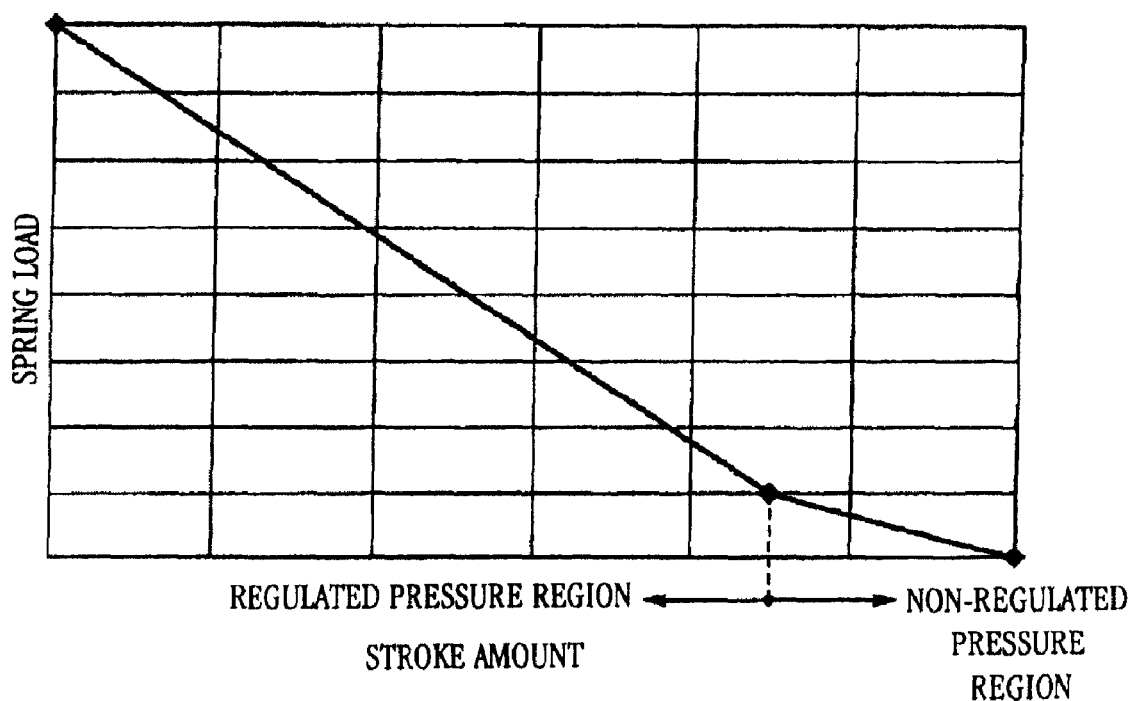
FIG. 29 is a diagram illustrating the spring properties of a linear solenoid valve according to the eleventh embodiment of the present invention.

FIG. 25 is a diagram illustrating the initial state of a linear solenoid valve according to the eleventh embodiment of the present invention, FIG. 26 is a diagram illustrating the working state of the linear solenoid valve according to the eleventh embodiment of the present invention, FIG. 27 is a diagram illustrating the output properties of the linear solenoid valve according to the eleventh embodiment of the present invention, FIG. 28 is a diagram illustrating the suction properties of the linear solenoid valve according to the eleventh embodiment of the present invention, and FIG. 29 is a diagram illustrating the spring properties of the linear solenoid valve according to the eleventh embodiment of the present invention. Note that FIG. 27 assigns current values to the horizontal axis, and output pressure to the vertical axis, FIG. 28 assigns stroke amount to the horizontal axis, and suction to the vertical axis, and FIG. 29 assigns stroke amount to the horizontal axis, and spring load to the vertical axis.

In this case, the linear solenoid portion 11 serving as a solenoid portion includes the coil assembly 313, the plunger 354 disposed so as to advance and retreat (move in the horizontal direction in FIGS. 25 and 26) as to the coil assembly 313, and the yoke 320 serving as a cylindrical chassis disposed so as to surround the coil assembly 313. Further, the coil assembly 313 includes the coil 317 formed by winding the winding wire 316 around a bobbin 515, a cylindrical end portion 558 serving as a first end yoke disposed adjacent to the coil 317 inward of the coil 317 in the radial direction, and also extending from a predetermined portion of the coil 317, from near the center of the coil 317 in the present embodiment backwards (rightward in FIGS. 25 and 26), a ring-shaped end portion 359 disposed adjacent to the front edge (left edge in FIGS. 25 and 26) of the coil 317 as a second end yoke, and the terminal 21 for supplying a current to the coil 317.

The bobbin 515 includes a cylindrical portion 501, and the ring-shaped flange portion 353 formed outward of the front edge of the cylindrical portion 501 in the radial direction.

The yoke 320 includes the bottom portion 356 made up of a bottomed cylindrical member having the cylindrical portion 355 and a circle shape, and a ring-shaped connecting portion 502 formed protruding inward of the cylindrical portion 355 in the radial direction at the connected portion between the cylindrical portion 355 and the bottom portion 356.

On the other hand, the regulating pressure valve unit 12 serving as a valve unit includes the sleeve 62, a spool 927 disposed so as to advance and retreat as to the sleeve 62, the slip-out-preventing end plate 64, which is fixed on the front edge of the sleeve 62, for preventing the spool 927 from slipping from the sleeve 62, and springs 944 and 945 serving as first and second pressing members disposed between the end plate 64 and the front edge of the spool 927, i.e., the linear solenoid valve unit 11 and the edge portion in the opposite side of the linear solenoid valve unit 11. The springs 944 and 945 are disposed in parallel as to the axial direction, which have a different spring constant and a different length each other. Note that the two springs may be disposed in serial as to the axial direction.

The spool 927 includes a spring washer 960 to be inserted into the spring 944, a great-diameter land 971 formed adjacent to the rear side of the spring washer 960, which selectively comes into contact with the spring 944, and always comes into contact with the spring 945, a small-diameter groove 972 formed adjacent to the rear side of the land 971, a great-diameter land 973 formed adjacent to the rear side of the groove 972, a small-diameter groove 974 formed adjacent to the rear side of the land 973, a middle-diameter land 975 formed adjacent to the rear side of the groove 974, and a moving iron core contact portion 901 formed adjacent to the rear side of the land 975.

The spring 944 is set so as to be shorter than the spring 945 in a state that the spring 944 is not contracted. With the initial state of the linear solenoid valve 10 and in the non-regulated region of output pressure, the front edge of the spring 944 is fixed to the end plate 64, the rear edge thereof is separated from the land 971, the front edge of the spring 945 is fixed to the end plate 64, and the rear edge of thereof comes into contact with the land 971. With the working state of the linear solenoid valve 10 and in the regulated region of output pressure, the front edges of the springs 944 and 945 are fixed to the end plate 64, and the rear edges thereof come into contact with the land 971.

In the non-regulated region of output pressure, the spring 944 presses the spool 927 toward the linear solenoid portion 11 side with spring load f11 serving as first pressing force. In the regulated region of output pressure, the springs 944 and 945 press the spool 927 toward the linear solenoid portion 11 side with spring load f12 serving as second pressing force.

Moreover, a feedback oil channel 983 is formed between the outer circumferential face of the sleeve 62 and an unshown valve body from the output port p2 to the feedback port p3 serving as a feedback pressure acting portion, and also a feedback opening 982 passing through in the radial direction is formed at a portion adjacent to the feedback port p3 in the sleeve 62.

In this case, the springs 944 and 945 make up feedback pressure switching means for switching between whether or not feedback pressure is applied to the spool 927 within the spool 927.

Next, description will be made regarding operation of the linear solenoid valve 10 having the above-described configuration.

First, in the initial state that a current is not supplied to the terminal 21 from the control device 95, as shown in FIG. 25, the contact portion 327 comes into contact with the bottom portion 356.

On the other hand, in the regulating pressure valve unit 12, the spool 927 is disposed on the hindmost position by the spring load f11 of the spring 944. At this time, the input port p1 and the output port p2 are opened, and the drain port p4 is closed by the land 971. Accordingly, the output pressure having the same value P1 as the input pressure is output from the output port p2. Also, the feedback port p3 communicates with the drain port p6, so the oil of the feedback port p3 is discharged (EX) from the drain port p6.

Next, upon a current being supplied to the coil 317 from the control device 95 via the terminal 21, while magnetic flux is generated, the bobbin 515 is made up of a nonmagnetic member, a magnetic path bypassing the bobbin 515 and returning to the yoke 320 through the yoke 320, the end portion 558, the plunger 354, and the end portion 359 is formed, and accordingly, a suction portion S is formed between the edge portion 361 in the magnetic path and the plunger 354.

The coil 317 sucks in the plunger 354 with predetermined suction, and thrust is generated in the plunger 354. As a result, the thrust is directly transmitted to the spool 927, the spool 927 is advanced (moved in the left direction in FIGS. 25 and 26) against the spring load f11, and the spring 945 is compressed.

Accordingly, in FIG. 27, as shown with Line L-11, the value P1 of the output pressure to be output from the output port p2 does not change. Subsequently, upon the current value reaching i11, and the front edge of the spring 945 coming into contact with the land 971 as shown in FIG. 26, the feedback opening 982 is opened, the output port p2 communicates with the feedback port p3 via the feedback oil channel 983 and the feedback opening 982, and also the feedback port p3 is sealed from the drain port p6. In connection with this, the output pressure is supplied to the feedback port p3 via the feedback oil channel 983 and the feedback opening 982, and the spool 927 is pressed forward (leftward in FIGS. 25 and 26) by the feedback force.

As a result, the space between the input port p1 and output port p2 is narrowed down by the front edge of the land 973, as shown with Line L-12, the output pressure rapidly decreases, and the value of the output pressure reaches P2.

The thrust transmitted from the plunger 354, the feedback force, and the spring load f12 are applied to the spool 927, and the spool 927 is disposed on a position where the thrust, the feedback force, and the spring load f12 are balanced.

Subsequently, upon the current being further increased from the value i11, the thrust to be applied to the spool 927 is increased, and the spool 927 is advanced. In connection with this, based on the stroke amount of the plunger 354, the spool 927 is advanced integrally with the plunger 354, the space between the input port p1 and the output p2 is narrowed down by the front edge of the land 973, as shown with Line L-13, the output pressure decreases in proportion to the current value. In this case, the ratio between the amount-of-change of the output pressure and the amount-of-change of the current is determined by the spring constants of the springs 944 and 945, area difference of the lands 973 and 975, and the like. Upon the current value being set to i12, the thrust to be applied to the spool 927 reaches the maximum, and the output pressure reaches the minimal value P3.

With the linear solenoid valve 10 having the above-described configuration, in the event that the output pressure is applied to the non-regulated region, if the stroke of the plunger 354 is great, and the closer to the hindmost position the plunger 354 is, the smaller suction is, on the other hand, if the stroke of the plunger 354 is small, and the closer to the foremost position the plunger 354 is, the greater suction is. However, in the event that the output pressure is applied to the regulated region, suction becomes constant regardless of the stroke of the plunger 354. Note that the greater the current to be supplied to the contact rod 371 is, the greater suction is, on the other hand, the smaller the current is, the smaller suction is. Note that Line L-21 indicates the stroke of the spool 927 in the event that the output pressure is applied to the regulated region.

Also, the output properties and suction properties of the linear solenoid valve 10 according to the first through tenth embodiments are the same as those of the linear solenoid valve 10 according to the eleventh embodiment.

The spring load of the springs 944 and 945 has spring load properties such as shown in FIG. 29. In the event that the output pressure is applied to the non-regulated region, the inclination of the spring load f11 applied to the spool 927 becomes small, on the other hand, in the event that the output pressure is applied to the regulated region, the inclination of the spring load f12 applied to the spool 927 becomes great.

Twelfth Embodiment

Now, while the output pressure is changed in the non-regulated pressure region and in the regulated pressure region with the springs 944 and 945 in the eleventh embodiment, description will now be made regarding a twelfth exemplary embodiment of the present invention devised such that the output pressure is changed in the non-regulated pressure region and in the regulated pressure region based on the current and stroke properties of the linear solenoid portion 11. Regarding the components having the same configurations as those of the eleventh embodiment, the same reference numerals are applied thereto and description thereof omitted, and regarding the advantages owing to the same configurations as the eleventh embodiment, the advantages of the eleventh embodiment are applied to those of the present embodiment.

Figure 30:
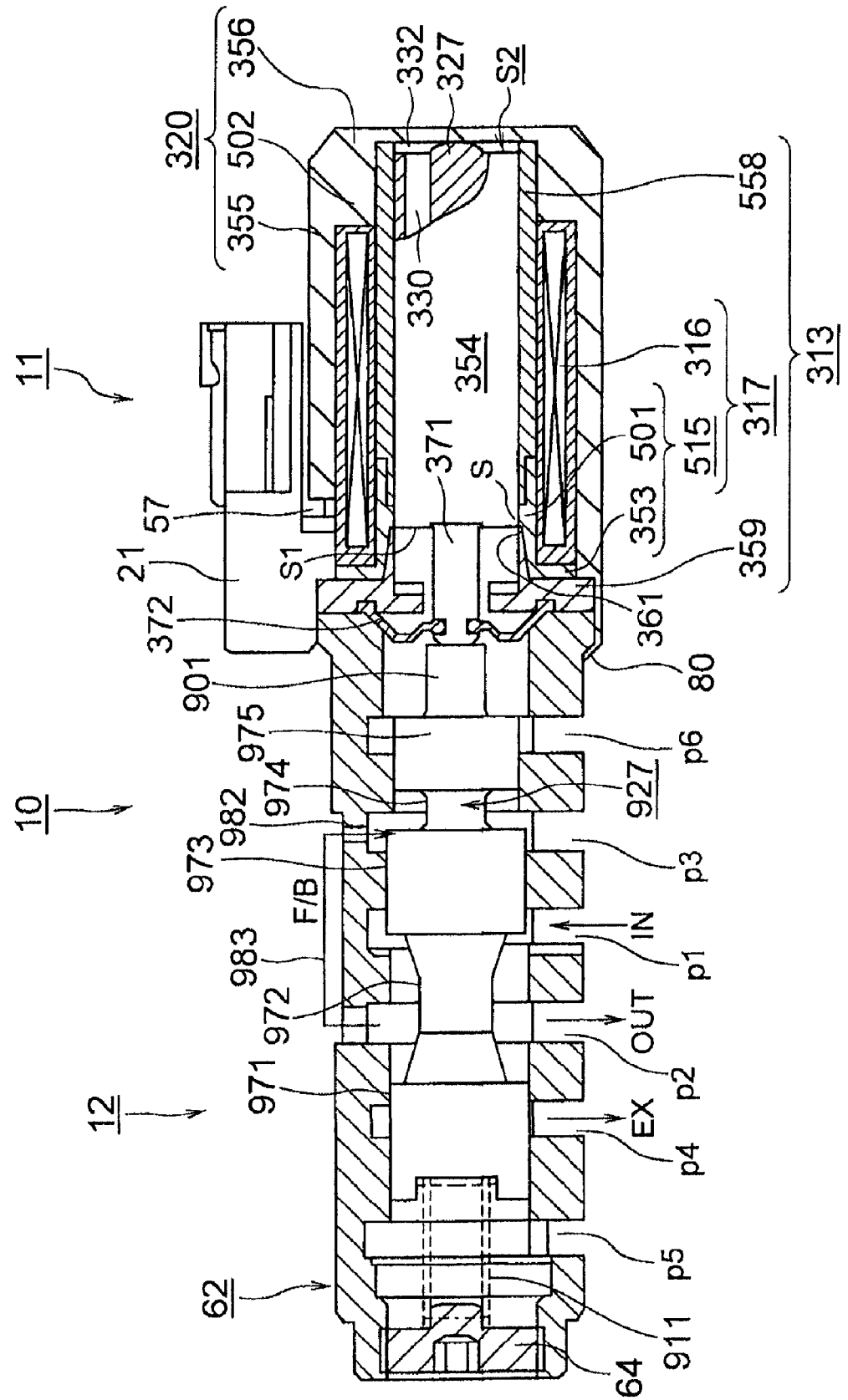
FIG. 30 is a diagram illustrating the initial state of a normally-opened-type linear solenoid valve according to a twelfth exemplary embodiment of the present invention.
Figure 31:
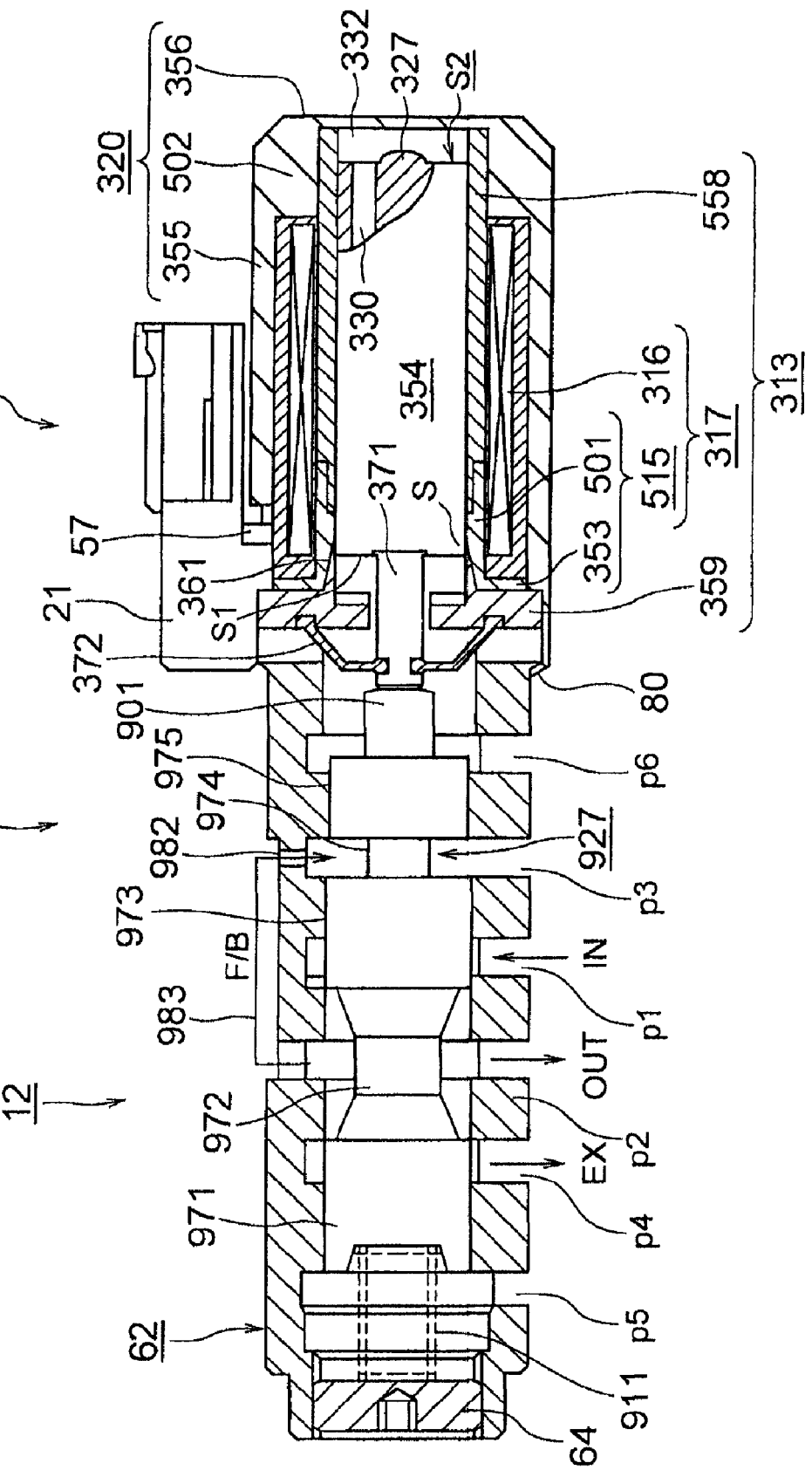
FIG. 31 is a diagram illustrating the working state of a normally-opened-type linear solenoid valve according to the twelfth embodiment of the present invention.
Figure 32:
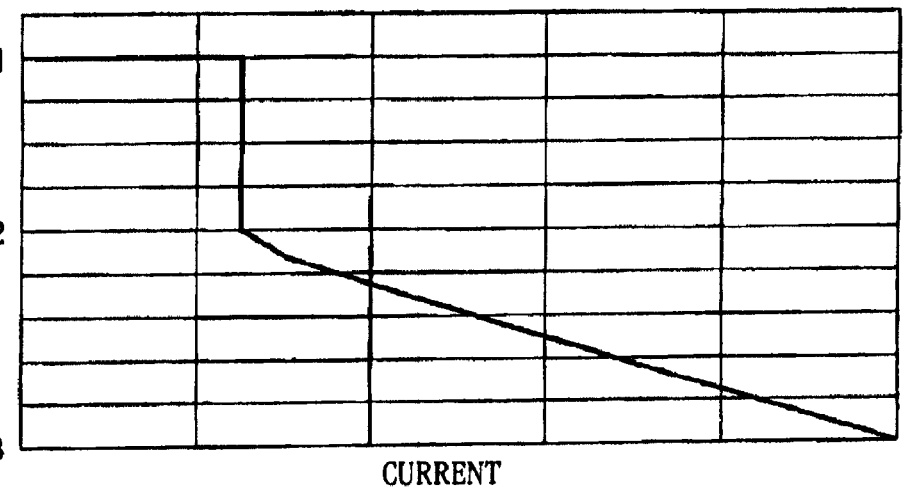
FIG. 32 is a diagram illustrating the output pressure properties of a normally-opened-type linear solenoid valve according to the twelfth embodiment of the present invention.
Figure 33:
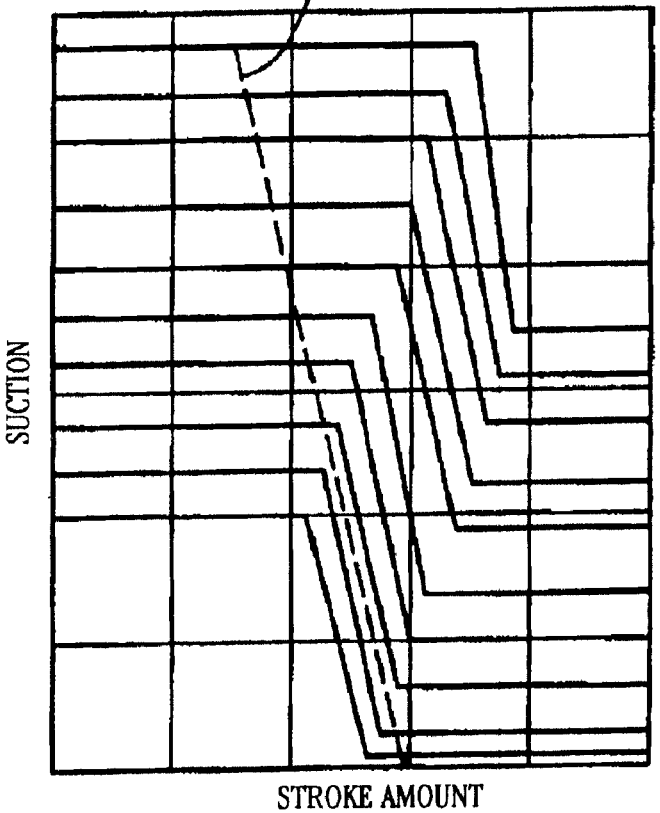
FIG. 33 is a diagram illustrating the suction properties of a normally-opened-type linear solenoid valve according to the twelfth embodiment of the present invention.
Figure 34:
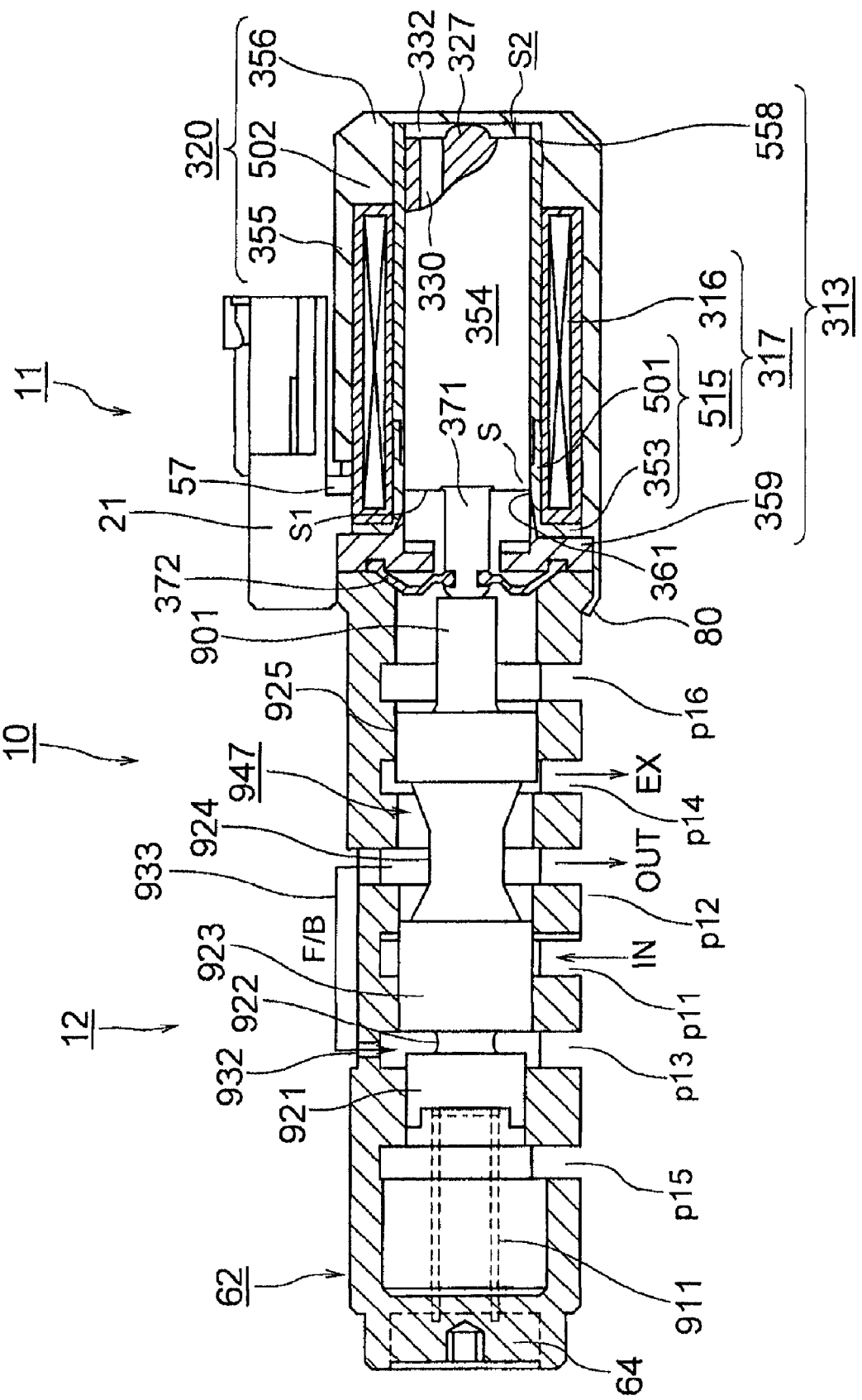
FIG. 34 is a diagram illustrating the initial state of a normally-closed-type linear solenoid valve according to the twelfth embodiment of the present invention.
Figure 35:
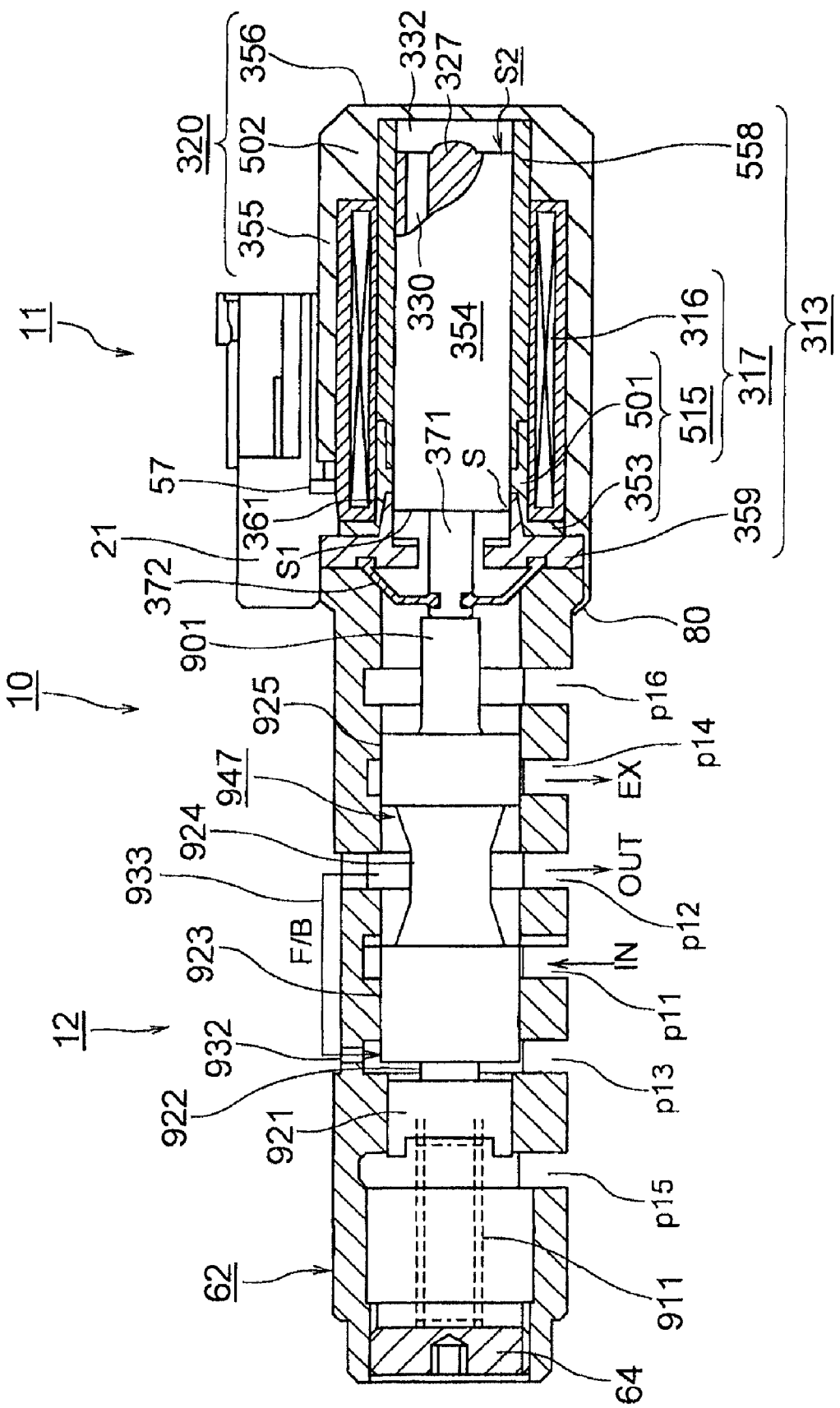
FIG. 35 is a diagram illustrating the working state of a normally-closed-type linear solenoid valve according to the twelfth embodiment of the present invention.
Figure 36:
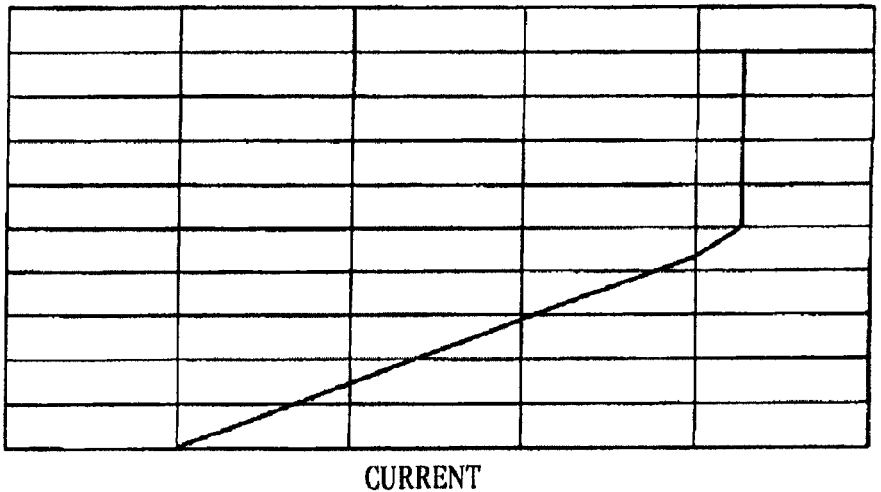
FIG. 36 is a diagram illustrating the output pressure properties of a normally-closed-type linear solenoid valve according to the twelfth embodiment of the present invention.
Figure 37:
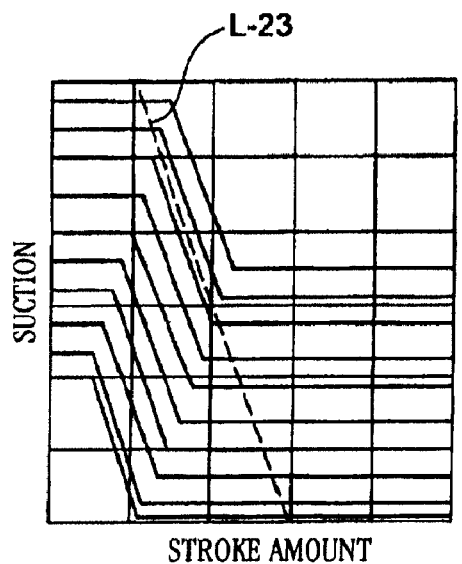
FIG. 37 is a diagram illustrating the suction properties of a normally-closed-type linear solenoid valve according to the twelfth embodiment of the present invention.

FIG. 30 is a diagram illustrating the initial state of a normally-opened-type linear solenoid valve according to the twelfth embodiment of the present invention, FIG. 31 is a diagram illustrating the working state of the normally-opened-type linear solenoid valve according to the twelfth embodiment of the present invention, FIG. 32 is a diagram illustrating the output properties of the normally-opened-type linear solenoid valve according to the twelfth embodiment of the present invention, FIG. 33 is a diagram illustrating the suction properties of the normally-opened-type linear solenoid valve according to the twelfth embodiment of the present invention, FIG. 34 is a diagram illustrating the initial state of a normally-closed-type linear solenoid valve according to the twelfth embodiment of the present invention, FIG. 35 is a diagram illustrating the working state of the normally-closed-type linear solenoid valve according to the twelfth embodiment of the present invention, FIG. 36 is a diagram illustrating the output properties of the normally-closed-type linear solenoid valve according to the twelfth embodiment of the present invention, and FIG. 37 is a diagram illustrating the suction properties of the normally-closed-type linear solenoid valve according to the twelfth embodiment of the present invention. Note that FIGS. 32 and 36 assign current values to the horizontal axis, and output pressure to the vertical axis, FIGS. 33 and 37 assign stroke amount to the horizontal axis, and suction to the vertical axis.

In this case, with the normally-opened-type linear solenoid valve 10, the regulating pressure valve unit 12 serving as a valve unit includes the sleeve 62, a spool 927 disposed so as to advance and retreat (move in the horizontal direction in FIGS. 30, 31, 34, and 35) as to the sleeve 62, the slip-out-preventing end plate 64, which is fixed on the front edge of the sleeve 62 (left edge in FIGS. 30, 31, 34, and 35), for preventing the spool 927 from slipping from the sleeve 62, and a spring 911 serving as a pressing member disposed between the end plate 64 and the front edge of the spool 927.

In the initial state wherein a current is not supplied to the terminal 21 from the control device 95 (see FIG. 2), the input port p1 and the output port p2 are opened, and the output pressure having the same value P1 as the input pressure is output from the output port p2.

With the normally-opened-type linear solenoid valve 10, the input port p1, output port p2, feedback port p3 serving as a feedback pressure acting portion, and drain ports p4 through p6 are formed in the same arrangement as the fourth embodiment. With the normally-closed-type linear solenoid valve 10, an input port p1, output port p12, feedback port p13 serving as a feedback pressure acting portion, and drain ports p14 through p16 are formed.

The spool 927 includes the great-diameter land 971 formed coming into contact with the spring 911, the small-diameter groove 972 formed adjacent to the rear side (rightward in FIGS. 30, 31, 34, and 35) of the land 971, the great-diameter land 973 formed adjacent to the rear side of the groove 972, the small-diameter groove 974 formed adjacent to the rear side of the land 973, the middle-diameter land 975 formed adjacent to the rear side of the groove 974, and the moving iron core contact portion 901 formed adjacent to the rear side of the land 975.

Moreover, the feedback oil channel 983 is formed between the outer circumferential face of the sleeve 62 and an unshown valve body from the output port p2 to the feedback port p3, and also the feedback opening 982 passing through in the radial direction is formed at a portion adjacent to the feedback port p3 in the sleeve 62.

On the other hand, with the normally-closed-type linear solenoid valve 10, the regulating pressure valve unit 12 includes the sleeve 62, the spool 947 disposed so as to advance and retreat as the sleeve 62, the slip-out-preventing end plate 64, which is fixed on the front edge of the sleeve 62, for preventing the spool 947 from slipping from the sleeve 62, and the spring 911 serving as a pressing member disposed between the end plate 64 and the spool 947.

In this case, in the initial state that a current is supplied to the terminal 21 from the control device 95, the input port p11 and the output port p12 are opened, and the output pressure having the same value P1 as the input pressure is output from the output port p12.

The spool 947 includes a middle-diameter land 921 formed coming into contact with the spring 911, a small-diameter groove 922 formed adjacent to the rear side of the land 921, a great-diameter land 923 formed adjacent to the rear side of the groove 922, a small-diameter groove 924 formed adjacent to the rear side of the land 923, a great-diameter land 925 formed adjacent to the rear side of the groove 924, and the moving iron core contact portion 901 formed adjacent to the rear side of the land 925.

Moreover, a feedback oil channel 933 is formed between the outer circumferential face of the sleeve 62 and an unshown valve body from the output port p12 to the feedback port p13, and also a feedback opening 932 passing through in the radial direction is formed at a portion adjacent to the feedback port p13 in the sleeve 62.

With the normally-opened-type and normally-closed-type linear solenoid valves 10 having the above-described configuration, in the event that the output pressure is applied to the non-regulated region, suction becomes constant by a predetermined value regardless of the stroke of the plunger 354. In the event that the output pressure is applied to the regulated region, suction becomes constant by the value greater than the value regardless of the stroke of the plunger 354. Note that the greater the current to be supplied to the contact rod 371 is, the greater suction is, on the other hand, the smaller the current is, the smaller suction is. Note that Lines L-22 and L-23 indicate the stroke of the spools 927 and 947 in the event that the output pressure is applied to the regulated region.

Thirteenth Embodiment

Next, description will be made regarding a thirteenth exemplary embodiment of the present invention. Regarding the components having the same configurations as those of the fourth embodiment, the same reference numerals are applied thereto and description thereof omitted, and regarding the advantages owing to the same configurations as the fourth embodiment, the advantages of the fourth embodiment are applied to those of the present embodiment.

Figure 38:
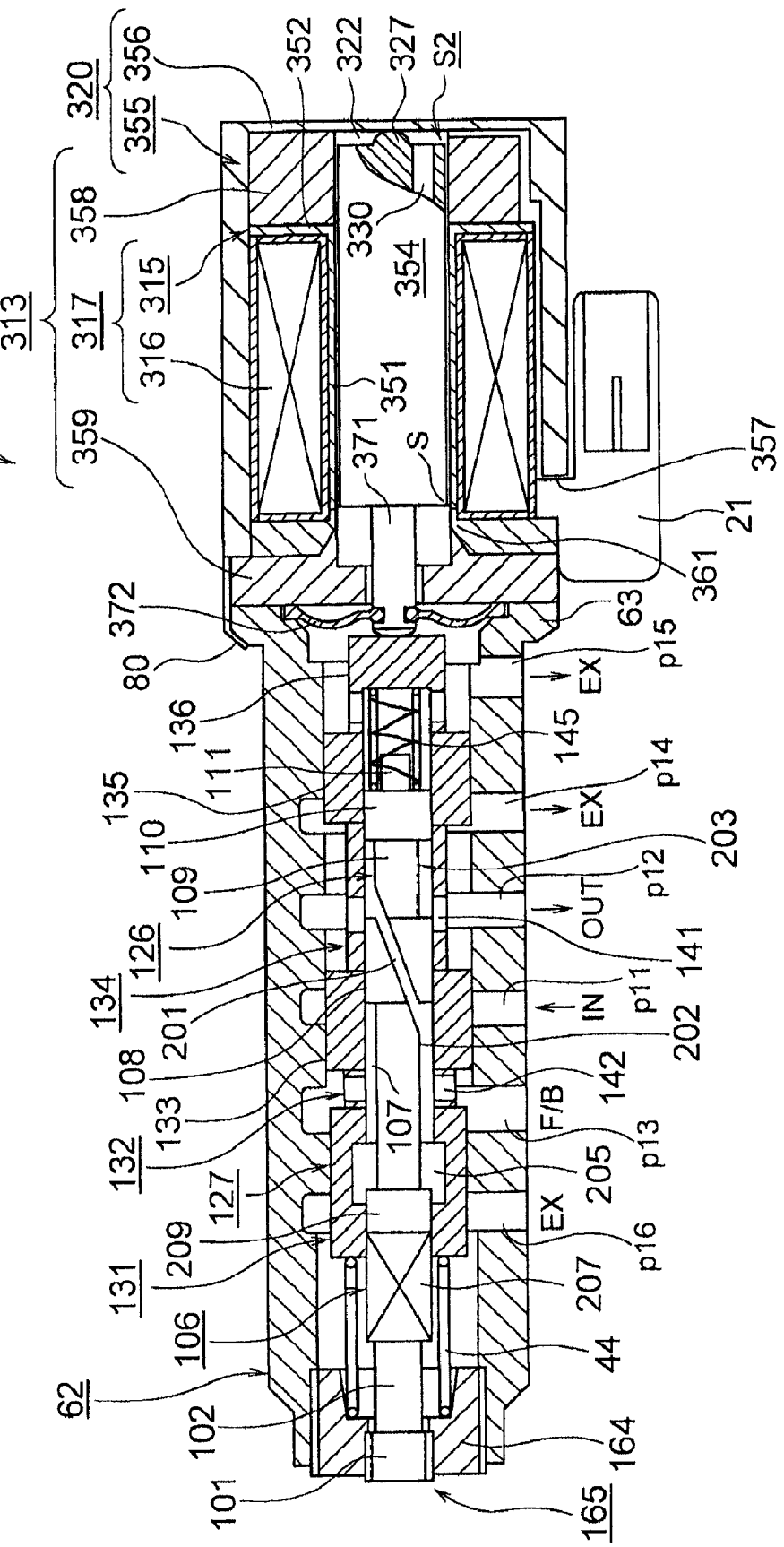
FIG. 38 is a diagram illustrating the initial state of a normally-closed-type linear solenoid valve according to the thirteenth exemplary embodiment of the present invention.
Figure 39:
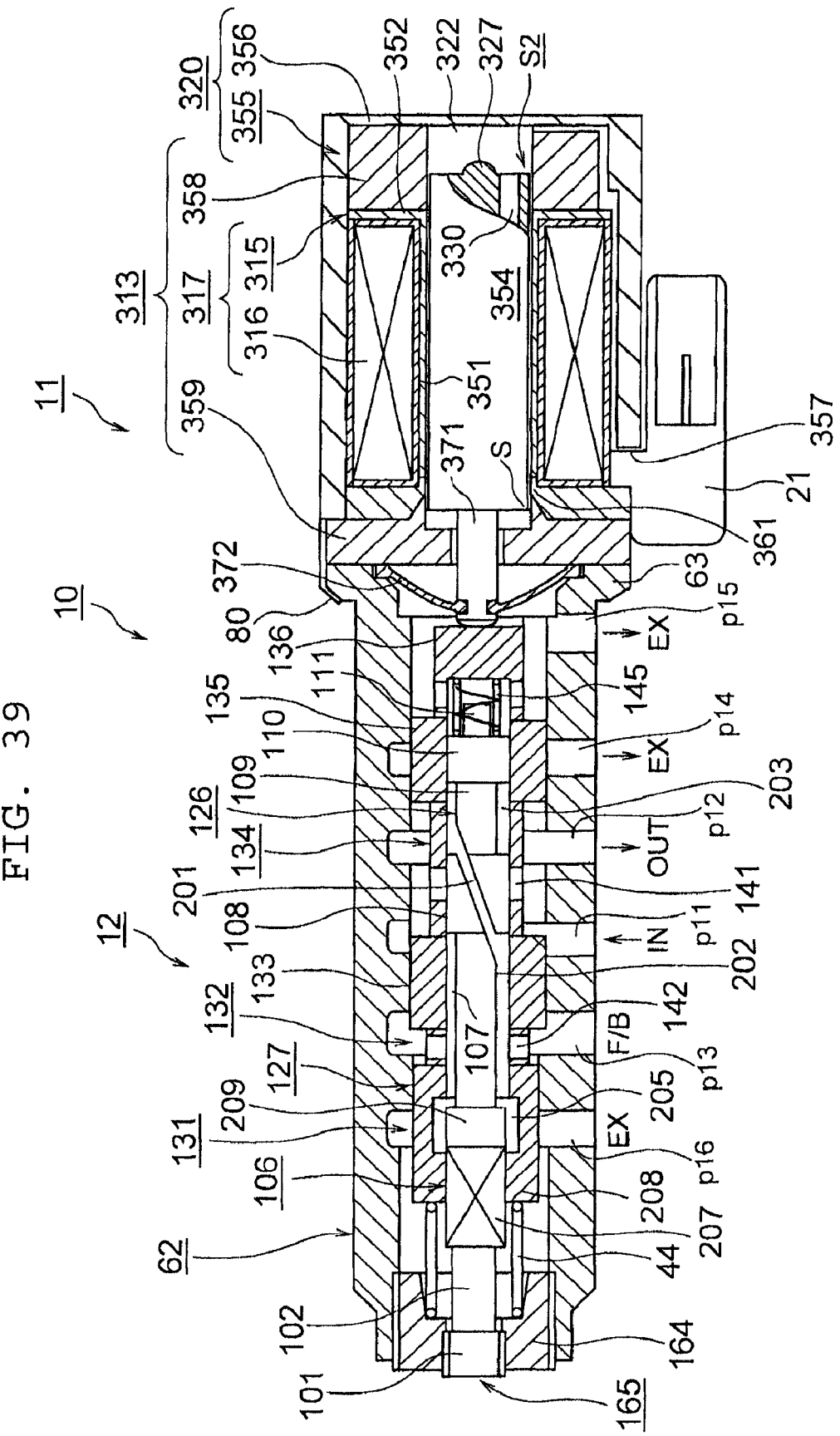
FIG. 39 is a diagram illustrating the working state of a normally-closed-type linear solenoid valve according to the thirteenth embodiment of the present invention.

FIG. 38 is a diagram illustrating the initial state of a normally-closed-type linear solenoid valve according to the thirteenth embodiment of the present invention, FIG. 39 is a diagram illustrating the working state of the normally-closed-type linear solenoid valve according to the thirteenth embodiment of the present invention.

In this case, the regulating pressure valve unit 12 serving as a valve unit includes the sleeve 62, an inner spool 126, an outer spool 127, a first slip-out-preventing end plate 164, which is fixed on the front edge (left edge in the drawings) of the sleeve 62, for preventing the outer spool 127 from slipping from the sleeve 62, the spring 44 serving as a first pressing member for pressing the outer spool 127 toward the linear solenoid portion 11 side serving as a solenoid portion with the spring load f1 serving as first spring load, a aligning spring 145 serving as a second pressing member for pressing the inner spool 126 toward the opposite side of the linear solenoid portion 11 within the outer spool 127 with the spring load f2 serving as second pressing force, and a second end plate 165 disposed between the inner spool 126 and the outer spool 127 inward of the first end plate 164 in the radial direction.

Note that a first spool is made up of the outer spool 127, and a second spool is made up of the inner spool 126. The first end plate 164 makes up a pressing adjustment member for adjusting the spring load f1, and is screwed to the sleeve 62 for that purpose. The second end plate 165 includes a screw portion 101, and a contact portion 102 having the diameter smaller than the screw portion 101. The rear edge (right edge in the drawings) of the contact portion 102 comes into contact with the front edge of the inner spool 126. The second end plate 165 makes up a pressing adjustment member for adjusting the spring load f2, and also makes up a positioning adjustment member for adjusting the position of the inner spool 126. The first end plate 164 is screwed to the edge portion opposite to the linear solenoid portion 11 in the sleeve 62 for that purpose.

The inner spool 126 is pressed against the second end plate 165 inward of the outer spool 127 in the radial direction with the spring load f2 of the spring 145, and is always disposed at a predetermined position. The inner spool 126 includes a great-diameter land 106 formed on the front edge so as to come into contact with the contact portion 102, a small-diameter groove 107 formed adjacent to the rear side (rightward in the drawings) of the land 106, a great-diameter land 108 formed adjacent to the rear side of the groove 107, a small-diameter groove 109 formed adjacent to the rear side of the land 108, a great-diameter land 110 formed adjacent to the rear side of the groove 109, and a spring washer 111 to be inserted into the spring 145 formed adjacent to the rear side of the land 110. A feedback oil channel 201 is formed passing through diagonally from the groove 107 to the groove 109, one end thereof is opened on the outer circumferential face of the groove 107, and the other end thereof is opened on the outer circumferential face of the groove 109.

Also, the outer spool 127 is disposed on the inside of the sleeve 62 in the radial direction so as to advance and retreat (move in the horizontal direction in the drawings), and also so as to relatively move and also slide as to the sleeve 62. The outer spool 127 includes a great-diameter land 131 formed on the front edge so as to come into contact with the spring 44, a small-diameter groove 132 formed adjacent to the rear side of the land 131, a great-diameter land 133 formed adjacent to the rear side of the groove 132, a small-diameter groove 134 formed adjacent to the rear side of the land 133, a great-diameter land 135 formed adjacent to the rear side of the groove 134, and a small-diameter moving iron core contact portion 136 formed adjacent to the rear side of the land 135.

Also, first and second feedback openings 141 and 142 passing through in the radial direction are formed at predetermined portions of the grooves 132 and 134 of the outer spool 127.

Cylindrical feedback oil channels 202 and 203 are formed between the inner spool 126 and outer spool 127 along the outer circumferential faces of the grooves 107 and 109. Inwards on the land 131 in the radial direction, the inner diameter thereof is increased by a predetermined amount, and a cylindrical drain oil channel 205 is formed along the outer circumferential face of the land 106. On the outer circumferential face of the land 106, flat portions 207 are formed in parallel as a processed portion on at least one place in the circumferential direction, and two places in the present embodiment. A drain oil channel 208 is formed between the inner circumferential face of the land 131 and the flat portions 207 along each flat portion 207. Note that a round portion 209 is formed on the portion backward of the flat portions 207 of the land 106.

The sleeve 62 includes the input portion p11 for receiving supply of input pressure, which is supplied (IN) from the regulator valve, the output port p12 for generating output pressure as control pressure, and outputting (OUT) the control pressure to the oil pressure servo, the feedback port p13 serving as a feedback pressure acting portion which is sealed hermetically, and the drain ports p14 through p16. The feedback port p13 communicates with the output port p12 via the first and second feedback openings 141 and 142, and the feedback oil channels 201 through 203. Upon the output pressure being supplied to the feedback port p13, the feedback port p13 generates pressing force corresponding to area difference of the lands 131 and 133, and presses the outer spool 127 backward with the generated pressing force.

Consequently, the outer spool 127 receives the thrust which is generated and directly transmitted by the plunger 354, the pressing force owing to the spring load f1 of the spring 44, the pressing force owing to the spring load f2 of the spring 145, and the pressing force owing to the feedback pressure, and advances or retreats integrally with the plunger 354 in a state that the moving iron core contact portion 136 comes into contact with the contact rod 371.

In connection with the thrust being changed, upon the outer spool 127 being moved relatively as to the inner spool 126, the communication state between the feedback oil channels 201 through 203 and the input port p11 and the drain oil channels 205 and 208 is switched. The inner spool 126 makes up feedback pressure switching means for switching whether to apply the feedback pressure on the outer spool 127 within the outer spool 127.

With the present embodiment, while the feedback port p13 is formed as a feedback pressure acting portion, a pressure chamber may be formed for applying the feedback pressure on the outer spool 127 instead of the feedback port p13.

Next, description will be made regarding operation of the linear solenoid valve 10 having the above-described configuration. First, in the initial state that a current is not supplied to the terminal 21 from the control device 95 (see FIG. 2), as shown in FIG. 38, the contact portion 327 comes into contact with the bottom portion 356.

On the other hand, in the regulating pressure valve unit 12, the outer spool 127 is disposed on the hindmost position by the spring load f1 of the spring 44. At this time, the input port p11 and the output port p12 are closed by the land 133, and the drain oil channel 205 is closed by the round portion 209 of the land 106. Accordingly, the output pressure is zero so as not to be output from the output port p12.

Next, upon a current being supplied to the coil 317 from the control device 95 via the terminal 21, the coil 317 sucks in the plunger 354 with predetermined suction, and generates thrust by the plunger 354. As a result, the thrust is transmitted to the outer spool 127, the outer spool 127 is advanced (moved in the left direction in the drawings) against the spring load f1, and then the spring 44 is contracted. In connection with this, the spring 145 is also contracted.

Subsequently, upon the current being increased, the input port p11 communicates with the output port p12 upon the outer spool 127 advancing, and the output port p12 communicates with the feedback port p13 via the first feedback opening 141, the feedback oil channels 203, 201, and 202, and the second feedback opening 142. During this, the drain oil channel 205 is still closed by the round portion 209 of the land 106.

Accordingly, the output pressure is supplied to the feedback port p13 via the first feedback opening 141, the feedback oil channels 203, 201, and 202, and the second feedback opening 142, and the outer spool 127 is pressed backward with feedback force. As a result, the space between the input port p11 and output port p12 is narrowed down by the rear edge of the land 133, the output pressure becomes a value proportional to the value of the current, and is applied to the regulated region.

The thrust transmitted from the plunger 354, the feedback force, and the spring load f1 are applied to the outer spool 127, and the outer spool 127 is disposed on a position where the thrust, the feedback force, and the spring load f1 are balanced.

Subsequently, upon the current being further increased, the thrust to be applied to the outer spool 127 is increased, and the outer spool 127 is further advanced. In connection with this, based on the stroke amount of the plunger 354, the outer spool 127 is advanced integrally with the plunger 354, the space between the input port p11 and output p12 is opened by the front edge of the land 133, and the output pressure increases in proportion to the current value. In this case, the ratio between the amount-of-change of the output pressure and the amount-of-change of the current is determined by the spring constant of the spring 44, area difference of the lands 131 and 133, and the like.

Subsequently, upon the current value being further increased, the thrust to be applied to the outer spool 127 reaches the maximum, and the outer spool 127 is further advanced. In connection with this, the first feedback opening 141 is closed by the land 108 so as to be sealed from the feedback oil channel 203. Consequently, the pressing force owing to the feedback pressure is eliminated, so the outer spool 127 is further advanced. During this, the gap between the input port p11 and the land 133 reaches the maximum, the input pressure input to the input port p11 is output from the output port p12 without decompression, and the output pressure is applied to the non-regulated region.

The drain oil channel 205 communicates with the drain port p16 via the drain oil channel 208, so the oil of the feedback port p13 is discharged (EX) from the drain port p16 via the drain oil channels 205 and 208.

With the above-described embodiments, while description has been made regarding the case wherein the sleeve 62 is formed separately from the unshown valve body, an arrangement may be made wherein each sleeve is formed integrally with the valve body. In this case, a predetermined sleeve hole is formed on the valve body, the spool is inserted into the sleeve hole, following which the linear solenoid valve unit 11 is mounted on the valve body, and is fixed with pins or the like, thereby forming a linear solenoid valve.

It should be noted that the present invention by no means restricted to these embodiments; rather, various modifications may be made without departing from the spirit and scope of the present invention, which are also encompassed in the technical scope of the present invention.

What is claimed is:

1. A pressure control valve comprising:
    a sleeve in which an input port, an output port, and a drain port are formed; and
    a linear solenoid portion which generates thrust;
    said sleeve includes,
        a first spool, which is disposed within said sleeve so as to advance and retreat, and which receives a transmission of said thrust, regulates an input pressure that is input to said input port and outputs an output pressure from the output port, and
        a second spool, which is disposed within said sleeve and said first spool so as to advance and retreat, and which receives a transmission of said thrust and applies said output pressure as a feedback pressure on the first spool;
    wherein said second spool includes a great-diameter land, which functions as a first supporting portion against said first spool; and a middle-diameter moving iron core contact portion, which functions as a second supporting portion against said first spool;
    wherein, on the outer circumferential face of the moving iron core contact portion, flat portions are formed in parallel on at least one place in the circumferential direction.

2. A pressure control valve according to claim 1, said linear solenoid portion further comprising a current-supplied portion for receiving a supply of current and generating thrust; and a moving portion which is moved by said thrust.

3. A pressure control valve according to claim 2, wherein said thrust is directly transmitted from said moving portion to the second spool, and transmitted to the first spool by way of the second spool and a second pressing member for pressing the second spool toward a side opposite said linear solenoid portion.

4. A pressure control valve according to claim 3, wherein said second spool has a symmetrical shape in an axial direction.

5. A pressure control valve according to claim 4, further comprising a first pressing member for pressing said first spool toward said linear solenoid portion, wherein a pressing force caused by the first pressing member for pressing said first spool toward said linear solenoid portion, and a feedback force caused by said thrust and said feedback pressure, oppose one another.

6. A pressure control valve according to claim 5, wherein a first pressing force adjustment member for adjusting a pressing force caused by the first pressing member for pressing said first spool toward said linear solenoid portion is disposed at a side of the sleeve opposite said linear solenoid portion.

7. A pressure control valve according to claim 6, wherein another pressing member is disposed between said first and second spools, and another pressing force adjustment member for adjusting a pressing force caused by said another pressing member is disposed in said sleeve on the side opposite the linear solenoid portion, and on the inside of said first pressing force adjustment member in the radial direction.

8. A pressure control valve according to claim 3, further comprising a first pressing member for pressing said first spool toward said linear solenoid portion, wherein a pressing force caused by the first pressing member for pressing said first spool toward said linear solenoid portion, and feedback force caused by said thrust and said feedback pressure, oppose one another.

9. A pressure control valve according to claim 8, wherein a first pressing force adjustment member for adjusting a pressing force caused by the first pressing member for pressing said first spool toward said linear solenoid portion is disposed at a side of the sleeve opposite said linear solenoid portion.

10. A pressure control valve according to claim 9, wherein another pressing member is disposed between said first and second spools, and another pressing force adjustment member for adjusting a pressing force caused by said another pressing member is disposed in said sleeve on a side opposite the linear solenoid portion, and on the inside of said first pressing force adjustment member in the radial direction.

11. A pressure control valve according to claim 2, wherein said thrust is directly transmitted from said moving portion to the first spool.

12. A pressure control valve according to claim 11, further comprising a pressing member for pressing said first spool toward said linear solenoid portion, wherein a feedback force caused by a pressing force of the pressing member and said feedback pressure, and said thrust, oppose one another.

13. A pressure control valve according to claim 12, wherein a first pressing force adjustment member for adjusting a pressing force caused by the pressing member for pressing said first spool toward said linear solenoid portion is disposed at a side of the sleeve opposite said linear solenoid portion.

14. A pressure control valve according to claim 13, wherein another pressing member is disposed between said first and second spools, and another pressing force adjustment member for adjusting a pressing force caused by said another pressing member is disposed in said sleeve on the side opposite the linear solenoid portion, and on the inside of said first pressing force adjustment member in the radial direction.

15. A pressure control valve according to claim 2, wherein said second spool has a symmetrical shape in an axial direction.

16. A pressure control valve according to claim 15, further comprising a first pressing member for pressing said first spool toward said linear solenoid portion, wherein a pressing force caused by the first pressing member, and a feedback force caused by said thrust and said feedback pressure, oppose one another.

17. A pressure control valve according to claim 16, wherein a first pressing force adjustment member for adjusting a pressing force caused by the pressing member for pressing said first spool toward said linear solenoid portion is disposed at a side of the sleeve opposite said linear solenoid portion.

18. A pressure control valve according to claim 17, wherein another pressing member is disposed between said first and second spools, and another pressing force adjustment member for adjusting pressing force caused by said another pressing member is disposed in said sleeve on the side opposite the linear solenoid portion, and on the inside of said first pressing force adjustment member in the radial direction.

19. A pressure control valve according to claim 2, further comprising a first pressing member for pressing said first spool toward said linear solenoid portion, wherein a pressing force caused by the first pressing member, and a feedback force caused by said thrust and said feedback pressure, oppose one another.

20. A pressure control valve according to claim 19, wherein a pressing force adjustment member for adjusting a pressing force caused by the pressing member for pressing said first spool toward said linear solenoid portion is disposed at a side of the sleeve opposite said linear solenoid portion.

* * * * *